(12) United States Patent
Phan

(10) Patent No.: US 8,860,642 B2
(45) Date of Patent: Oct. 14, 2014

(54) DISPLAY AND WEIGHTED DOT RENDERING METHOD

(75) Inventor: Gia Chuong Phan, Shatin (CN)

(73) Assignee: VP Assets Limited, Shatin (HK)

( * ) Notice: Subject to any disclaimer, the term of this patent is extended or adjusted under 35 U.S.C. 154(b) by 0 days.

(21) Appl. No.: 13/176,524

(22) Filed: Jul. 5, 2011

(65) Prior Publication Data

US 2011/0279493 A1 Nov. 17, 2011

Related U.S. Application Data

(60) Division of application No. 11/012,202, filed on Dec. 16, 2004, now abandoned, which is a continuation-in-part of application No. 10/727,545, filed on Dec. 5, 2003, now Pat. No. 7,091,986, which is a continuation-in-part of application No. 10/339,491, filed on Jan. 10, 2003, now Pat. No. 7,215,347, which is a continuation-in-part of application No. 09/151,287, filed on Sep. 11, 1998, now Pat. No. 6,661,429.

(30) Foreign Application Priority Data

Sep. 13, 1997 (DE) .................................. 197 41 132

(51) Int. Cl.
*G09G 3/36* (2006.01)
*H04N 9/30* (2006.01)
*G09G 3/20* (2006.01)

(52) U.S. Cl.
CPC ......... *H04N 9/30* (2013.01); *G09G 2340/0457* (2013.01); *G09G 2300/0809* (2013.01); *G09G 2300/0452* (2013.01); *G09G 3/20* (2013.01); *G09G 3/3607* (2013.01)
USPC ............. 345/88; 345/589; 345/600; 345/613; 345/690; 345/694; 345/698

(58) Field of Classification Search
None
See application file for complete search history.

(56) References Cited

U.S. PATENT DOCUMENTS

| 4,564,915 A | 1/1986 | Evans et al. |
| 4,754,202 A * | 6/1988 | Havel .......................... 315/169.1 |

(Continued)

FOREIGN PATENT DOCUMENTS

| DE | 36 06 404 A1 | 9/1986 |
| EP | 0 273 995 A1 | 7/1988 |

(Continued)

*Primary Examiner* — Jesus Hernandez
(74) *Attorney, Agent, or Firm* — Birch, Stewart, Kolasch & Birch, LLP

(57) ABSTRACT

The invention relates to a display and a weighted dot rendering method. The display comprises a plurality of pixel groups, each pixel group comprising a plurality of dots arranged in a predetermined identical matrix form, each pixel group having at least one first color dot, at least one second color dot and at least one third color dot, the pixel groups arranged in a matrix manner so as to form the display, wherein each color dot has a plurality of sides adjacent to the other dots with different color, and each color dot represents a luminance and a chrominance of a corresponding full color pixel data by grouping with neighboring dots to form a plurality of overlapping full color dynamics pixel groups. In contrast with conventional RGB stripe arrangement which has high spatial frequency in X axe but 0 spatial frequency in Y axe, the arrangements of the invention have good spatial frequency in both axes, thus giving a higher visual perception of high resolution after performing weighted dot rendering methods of the invention where each dot in the displays represent the luminance and chrominance of each corresponding RGB pixel by forming with neighboring dots overlapping dynamic pixels.

84 Claims, 46 Drawing Sheets

(56) References Cited

U.S. PATENT DOCUMENTS

| | | | |
|---|---|---|---|
| 4,771,279 A * | 9/1988 | Hannah | 345/559 |
| 4,853,592 A | 8/1989 | Strathman | |
| 5,113,274 A * | 5/1992 | Takahashi et al. | 349/109 |
| 5,132,674 A | 7/1992 | Bottorf | |
| 5,311,337 A | 5/1994 | McCartney, Jr. | |
| 5,341,153 A | 8/1994 | Benzschawel et al. | |
| 5,530,570 A | 6/1996 | Terumoto | |
| 5,559,529 A | 9/1996 | Maher | |
| 5,847,684 A | 12/1998 | Strik | |
| 5,929,843 A * | 7/1999 | Tanioka | 345/600 |
| 6,219,025 B1 | 4/2001 | Hill et al. | |
| 6,239,783 B1 | 5/2001 | Hill et al. | |
| 6,252,613 B1 | 6/2001 | Borel et al. | |
| 6,326,981 B1 | 12/2001 | Mori et al. | |
| 6,587,120 B2 | 7/2003 | Kasai et al. | |
| 6,661,429 B1 | 12/2003 | Phan | |
| 6,714,206 B1 * | 3/2004 | Martin et al. | 345/589 |
| 7,110,012 B2 | 9/2006 | Messing et al. | |
| 7,151,517 B2 | 12/2006 | Lee | |
| 7,268,753 B2 | 9/2007 | Lee et al. | |
| 7,286,136 B2 * | 10/2007 | Phan | 345/589 |
| 2003/0218618 A1 | 11/2003 | Phan | |
| 2004/0061710 A1 * | 4/2004 | Messing et al. | 345/698 |
| 2004/0114046 A1 * | 6/2004 | Lee et al. | 348/279 |
| 2004/0150651 A1 | 8/2004 | Phan | |
| 2006/0044294 A1 * | 3/2006 | Damera-Venkata | 345/204 |

FOREIGN PATENT DOCUMENTS

| | | |
|---|---|---|
| EP | 0 637 009 A2 | 2/1995 |
| EP | 0 738 089 A1 | 10/1996 |
| EP | 0 903 717 A2 | 3/1999 |
| FR | 2 742 910 A1 | 6/1997 |

\* cited by examiner

FIG. 11 (PRIOR ART)

|   | 1 | 2 | 3 | 4 |
|---|---|---|---|---|
| 9 | B | G | B | G |
| 8 | G | R | G | R |
| 7 | R | B | R | B |
| 6 | B | G | B | G |
| 5 | G | R | G | R |
| 4 | R | B | R | B |
| 3 | B | G | B | G |
| 2 | G | R | G | R |
| 1 | R | B | R | B |

DISPLAY AND WEIGHTED DOT RENDERING METHOD

CROSS-REFERENCE TO RELATED APPLICATIONS

This is a divisional of U.S. patent application Ser. No. 11/012,202, filed Dec. 16, 2004, now abandoned which is a continuation-in-part of U.S. patent application Ser. No. 10/727,545, filed on Dec. 5, 2003, now U.S. Pat. No. 7,091,986, issued Aug. 15, 2006, which is a continuation-in-part of U.S. patent application Ser. No. 10/339,491, filed on Jan. 10, 2003, now U.S. Pat. No. 7,215,347, issued May 8, 2007, which is a continuation-in-part of U.S. patent application Ser. No. 09/151,287, filed Sep. 11, 1998, now U.S. Pat. No. 6,661,429, issued Dec. 9, 2003, and claims priority under 35 U.S.C. §119 and 37 C.F.R. §1.55(a) to German Application No. 197 41 132.0, filed Sep. 13, 1997. The contents of these applications are incorporated in part herein.

BACKGROUND OF THE INVENTION

1. Field of the Invention

The invention relates to a display and a weighted dot rendering method.

2. Description of the Related Art

In known display of the kind used in video, film and computer technology, so-called pixels are arranged along horizontally and/or vertically extending lines. The pixels generally consist of so-called dots representing the three basic colours red, green and blue. Dots are sources of luminous radiation the light of which is mixed to generate luminous mixed colours in a process referred to as additive mixing.

In computer monitors and television receivers the display is divided into a plurality of pixels arranged on a fixed grid or raster. Each pixel is controlled individually, with the pixels addressed from left to right and from the top to the bottom, for instance, as is customary practice for CRT screens.

EP 0 637 009 A2 discloses a method of controlling active LCD displays in which the dots are arranged in a mutually offset pattern to form a delta shape, with the dots of each colour group vertically interconnected by a control line. Horizontal control is effected pixelwise, meaning that the three dots of each RGB pixel are addressed at the same time. Further, each dot comprises a memory element and a switching element, whereby RGB data can be transmitted using synchronizing information, as is the case in conventional monitors, for example.

DE 36 06 404 A1 discloses a method of generating picture elements on a colour display, as well as a colour display. The method uses a light gate array of which the light gates are addressable individually by means of control circuitry in such a manner that the desired colour intensity is obtained by controlling the transmission properties of the respective light gate. Light sources are disposed behind the light gate to provide at least two primary colours and are switched in alternating light cycles at a repetition rate of at least 25 Hz, with the light gates being controlled synchronously therewith. Because of the inertia of the human eye, it is possible for a gate to display the desired colour.

One drawback of this kind of display is that the number of pixels is limited by the fixed grid, which limits the resolution and the picture sharpness as well. The finer the grid, the higher the resolution. The fineness of the grid itself is limited by manufacturing technology, however, because the cathode ray tubes that are used for the displays comprise so-called shadow masks having holes therein which cannot be reduced to whatever size unless one puts up with considerable expenditures.

U.S. Pat. No. 6,252,613 discloses a pixel addressing method using at least 2 scanning lines to address a pixel. This method increases the vertical spatial frequency comparing with conventional RGB stripe display and it does increase the overall resolution by a factor 1.5. The drawback is that it still applies rigid pixel addressing method which limits the display further to improve its both horizontal and vertical resolution.

Likewise, in LCD displays, the integration of a great number of thin film transistors (TFT) is extremely expensive and very prone to produce major amounts of rejects. In Plasma (PDP) or in FED displays, the technical and economical manufactured size of a RGB pixel is physically limited by the mass production technology itself and further reduction of the RGB pixel size for higher resolution cannot be achieved without huge manufacturing equipment cost and over proportional scraps which are economically not viable.

In LED displays, the placement of the LEDs is complicated and expensive as their space demand is predetermined by their shape.

The concept of using overlapping pixels by sharing dots with neighboring pixels to create a perceived higher resolution was disclosed in the U.S. Pat. No. 6,661,429, entitled "Dynamic Pixel Resolution for Displays Using Spatial Elements". In the U.S. patent Publication No. 2003/0218618, which is a continuation-in-part of the U.S. Pat. No. 6,661,429, and entitled "Dynamic Pixel Resolution, Brightness and Contrast for Displays Using Spatial Elements," this method was further elaborated to use time sequential overlapping of frames to reach a perceived higher resolution by the human vision. In the U.S. patent Publication No. 2004/0150651, which is a continuation-in-part of the U.S. patent Publication No. 2003/0218618, and entitled "Dynamic Pixel Resolution, Brightness and Contrast for Displays Using Spatial Elements," weighted dot rendering method was applied to replace the time sequential method for reaching the same overlapping pixels effects.

SUMMARY OF THE INVENTION

One objective of the present invention is to provide a display. The display comprises a plurality of pixel groups, each pixel group comprising a plurality of dots arranged in a predetermined identical matrix form, each pixel group having at least one first color dot, at least one second color dot and at least one third color dot, the pixel groups arranged in a matrix manner so as to form the display, wherein each color dot has a plurality of sides adjacent to the other dots with different color, and each color dot represents a luminance and a chrominance of a corresponding full color pixel data by grouping with neighboring dots to form a plurality of overlapping full color dynamic pixel groups.

Another objective of the present invention is to provide a method for converting a first data of a first arrangement to a second data of a second arrangement. The first arrangement (first static pixel) has a plurality of RGB groups, each RGB group has three color dots and three first data representing three color dots, and each RGB group has a corresponding coordinate value. The second arrangement (second static pixel) has a plurality of dots, each dot has a corresponding coordinate value and a second data representing the dot. The method of the invention comprises the steps of: determining a selected dot of the second arrangement (second static pixel); obtaining a corresponding coordinate value of the selected dot; determining a selected RGB group according to the corresponding coordinate value; obtaining the first data of the selected RGB group; and calculating the second data according to the first data of the selected RGB group.

Therefore, In contrast with conventional RGB stripe arrangement which has high spatial frequency in X axis but 0 spatial frequency in Y axis, the arrangements of the invention have good spatial frequency in both axes, thus giving a higher visual perception of high resolution after performing weighted dot rendering methods of the invention where each dot in the displays represent the luminance and chrominance of each corresponding RGB pixel by forming with neighboring dots overlapping dynamic pixels. Since our human vision is more sensitive for luminance and less sensitive for chrominance, if each dot is small enough or the viewing distance is far enough so that we cannot see each Red, Green or Blue dot, in this case it is unnecessary to place in each position on the display a full RGB like in the case of conventional RGB stripe display but we can use the pixel arrangement in connection with weighted dot rendering methods to reach the same luminance and chrominance using only one single dot at a certain position and not a full RGB pixel and this concept is named as Visual Perception Technology.

According to the arrangement and method of the invention, the principle of Visual Perception Technology (VP) consists of:

A display with a special pixel arrangement where 2 same color dots can not be adjacent each other in the X and Y axes and each dot is grouped and shared with neighboring dots to create overlapping dynamic pixels.

The resolution of the display is express in dots and not in pixels. For example a VP display of 1920×VP×1080 has the same perceived resolution as a conventional 1920×RGB×1080 whereas VP=1 dot and RGB=1 pixel=3 dots A weighted dot rendering method is applied on the VP display to "compress" each frame of X×RGB×Y data to be displayed into a X×VP×Y resolution VP display.

The invention investigates further different weighted dot rendering methods with its typical rendering parameter sets. The arrangements of the invention are further claimed for pixel groups with three colors and four colors.

It is the object of the present invention to provide a display of the aforesaid kind which has a higher optical resolution for a given grid.

It is another object of the present invention to provide methods which enables an enhanced resolution to be obtained for dot-addressed displays.

It is another objective of the present invention to form pixel groups of quad pixels of 4 dots arranged in a matrix of 2×2 to represent the three primary colors Red, Green and Blue, wherein same color dot cannot be adjacent in the X and Y axis, and wherein the area of the first color dot is the same as that of the third color dot, the area of two second color dots is the same as that of the third color dot. A weighted dot rendering method is applied in this display to create a perceived high resolution display.

It is another objective of the present invention to form pixels group of quad pixels of 4 dots arranged in a matrix of 2×2 to represent the three primary colors Red, Green, Blue and a forth color White, wherein same color dot can not be adjacent in the X and Y axis. A weighted dot rendering method is applied in this display to create a perceived high resolution display.

It is another objective of the present invention to perform a color correction and enhancement method to match the chrominance showed in the 4 colors quad pixels groups display with the chrominance of the input data.

The invention relates to a display comprising pixels and dots, as well as methods of controlling said display.

BRIEF DESCRIPTION OF THE DRAWING

Further advantageous measures are described in the dependent claims. The invention is shown in the attached drawing and is described hereinafter in greater detail.

FIG. 1A-1 to 1A-3 show the overlapping full color dynamic pixel groups according to the arrangement of FIG. 1A;

FIG. 3A-1 shows the overlapping full color dynamic pixel groups according to the arrangement of FIG. 3A;

FIG. 4A-1 shows the overlapping full color dynamic pixel groups according to the arrangement of FIG. 4A;

FIG. 5A-1 shows the overlapping full color dynamic pixel groups according to the arrangement of FIG. 5A;

FIG. 8A-1 to 8F-1 show the overlapping full color dynamic pixel groups according to the arrangement of FIG. 8A to 8F;

FIG. 9A-1 to 9I-1 show the overlapping full color dynamic pixel groups according to the arrangement of FIG. 9A to 9I;

FIG. 9J-1 to 9J-2 shows the overlapping full color dynamic pixel groups according to the arrangement of FIG. 9J;

FIG. 11 shows the conventional arrangement of RGB groups;

FIG. 12 shows each dot with corresponding coordinate values, according to the first embodiment of the invention;

FIG. 13A shows a selected dot of the second arrangement, according to the invention;

FIG. 13B shows the corresponding selected RGB group and the neighboring RGB group;

DETAILED DESCRIPTION OF THE INVENTION

Figure 1A:
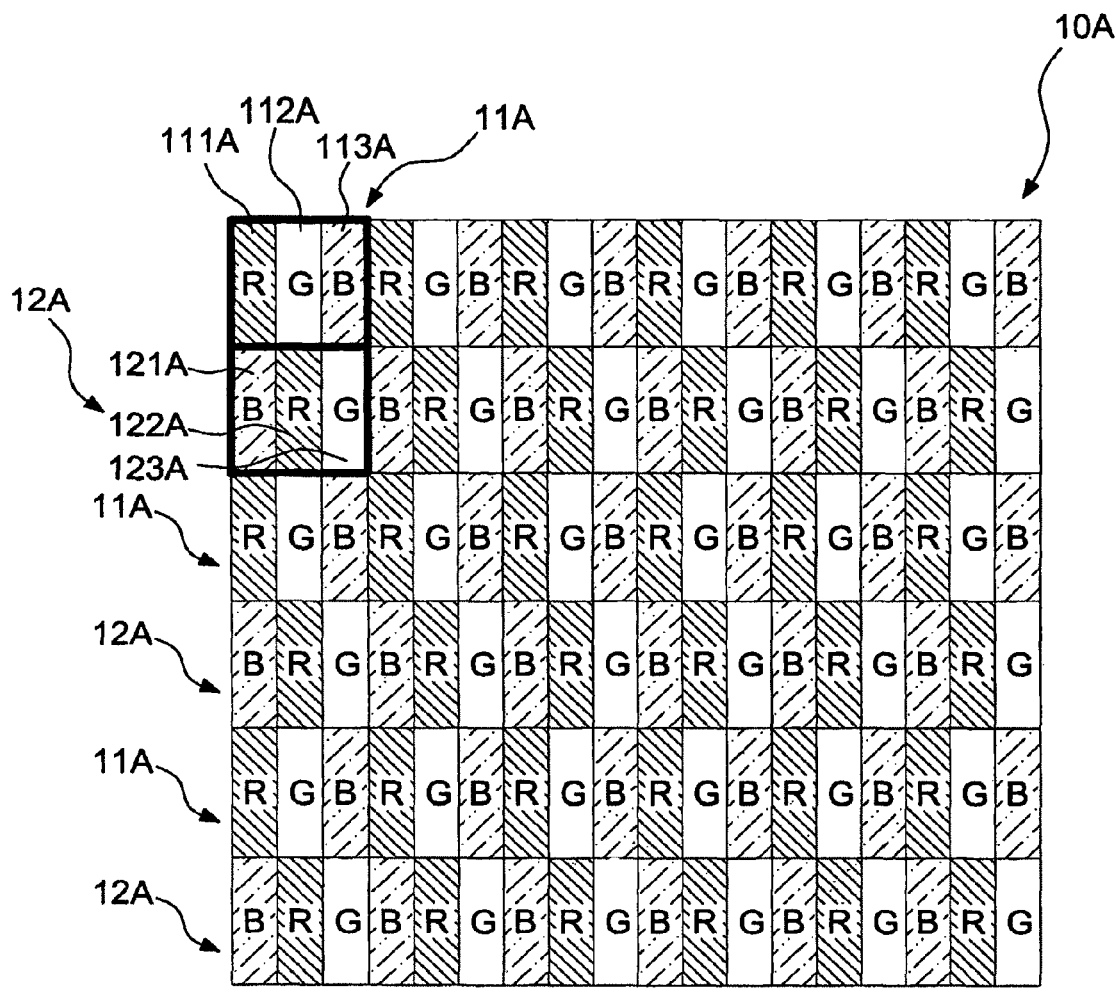
FIG. 1A shows an arrangement of stripe shaped pixel, according to a first embodiment of the invention.

Referring to FIG. 1A, according to a first embodiment of the invention, a display 10A comprises a plurality of first pixel groups 11A and a plurality of second pixel groups 12A. The first pixel groups 11A and the second pixel groups 12A are static pixel groups. Each first pixel group 11A comprises a plurality of dots arranged in a matrix form, and each first pixel group 11A has at least one first color dot, at least one second color dot and at least one third color dot, for example, each first pixel group 11A comprises a red dot 111A, a green dot 112A and a blue dot 113A in sequence arranged in a 3×1 matrix.

Each second pixel group 12A comprises a plurality of dots arranged in a matrix, and each second pixel group 12A has at least one first color dot, at least one second color dot and at least one third color dot, for example, each second pixel group 12A comprises a blue dot 121A, a red dot 122A and a green dot 123A in sequence arranged in a 3×1 matrix. The first pixel groups and the second pixel groups arranged in a matrix manner to form the display so that the same color dots are not adjacent in a X-axis direction and in a Y-axis direction. That is, for example, in the X-axis direction, the same red color dots 111A of the first pixel group 11A are not adjacent, and in the Y-axis direction, the red color dot 111A of the first pixel group 11A and the red color dot 122A of the second pixel group 12A are not adjacent. In the other word, each color dot has a plurality of sides adjacent to the other dots with different color. For example, the red color dot 122A has four sides adjacent to the blue color (B), three green color dots (G).

The first pixel groups 11A and the second pixel groups 12A are arranged alternately in the Y-axis direction. The first pixel groups 11A are disposed in odd row of the display 10A, for example, the first pixel groups 11A are disposed in first or third row of the display 10A, and the second pixel groups 12A are disposed in even row of the display 10A, for example, the second pixel groups 12A are disposed in second or fourth row of the display 10A. As shown in FIG. 1A, the dots of the first pixel groups 11A and the second pixel groups 12A are stripe shaped.

Figures 1, 1A:
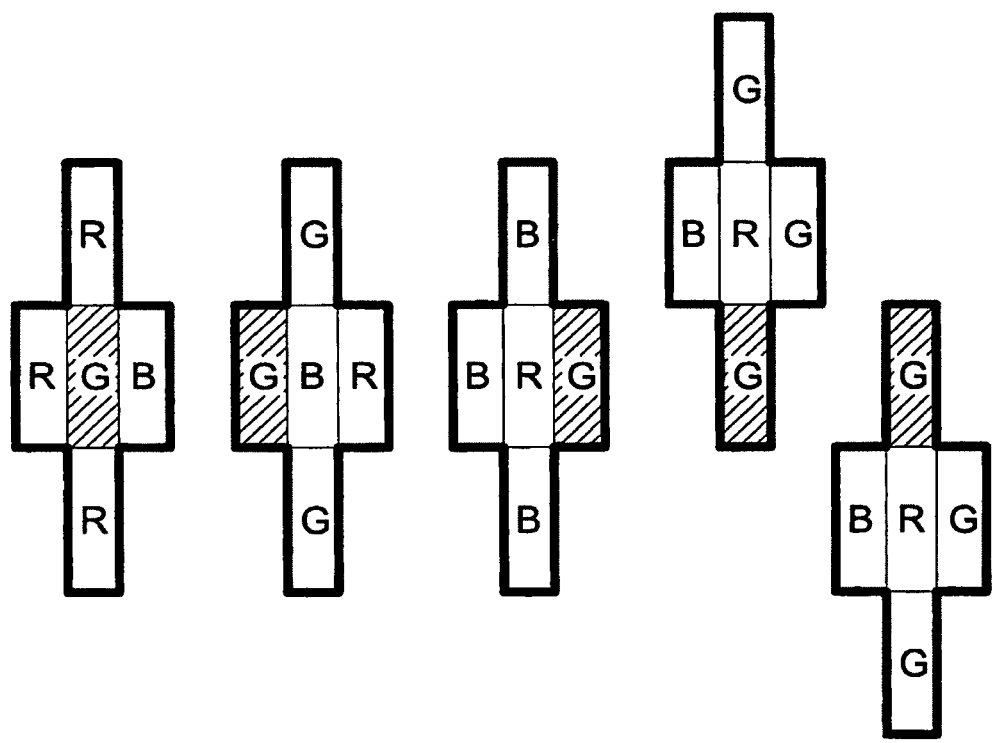

Referring to FIG. 1A-1, each color dot represents a luminance and a chrominance of a corresponding full color pixel data by grouping with neighboring dots to form a plurality of overlapping full color dynamic pixel groups. For example, a selected dot (G) is determined from the dots of the arrangement of FIG. 1A. The neighboring dots are selected from group of a left dot at the left of and adjacent to the selected dot along a X-axis direction, a right dot at the right of and adjacent to the selected dot along the X-axis direction, a forward dot at the front of and adjacent to the selected dot along a Y-axis direction, a backward dot at the back of and adjacent to the selected dot along the Y-axis direction, a next left dot at the left of and adjacent to the left dot along the X-axis direction, a next right dot at the right of and adjacent to the right dot along the X-axis direction, a next forward dot at the front of and adjacent to the forward dot along the Y-axis direction, a next backward dot at the back of and adjacent to the backward dot along the Y-axis direction, a left-forward dot adjacent to both the left dot and the forward dot, a left-backward dot adjacent to both the left dot and the backward dot, a right-forward dot adjacent to both the right dot and the forward dot, and a right-backward dot adjacent to both the right dot and the backward dot.

According to FIG. 1A-1, the selected dot (G) and four neighboring dots form an overlapping full color dynamic pixel group, and there are five overlapping full color dynamic pixel groups shown in FIG. 1A-1. A first overlapping full color dynamic pixel group comprises the selected dot (G), the left dot (R), the right dot (B), the forward dot (R) and the backward dot (R); a second overlapping full color dynamic pixel group comprises the selected dot (G), the right dot (B), the next right dot (R), the right-forward dot (G) and the right-backward dot (G); a third overlapping full color dynamic pixel group comprises the selected dot (G), the left dot (R), the next left dot (B), the left-forward dot (B) and the left-backward dot (B); a fourth overlapping full color dynamic pixel group comprises the selected dot (G), the left-forward dot (B), the right-forward dot (G), the forward dot (R) and the next forward dot (G); and a fifth overlapping full color dynamic pixel group comprises the selected dot (G), the left-backward dot (B), the right-backward dot (G), the backward dot (R) and the next backward dot (G).

Figures 1, 1A, 2:
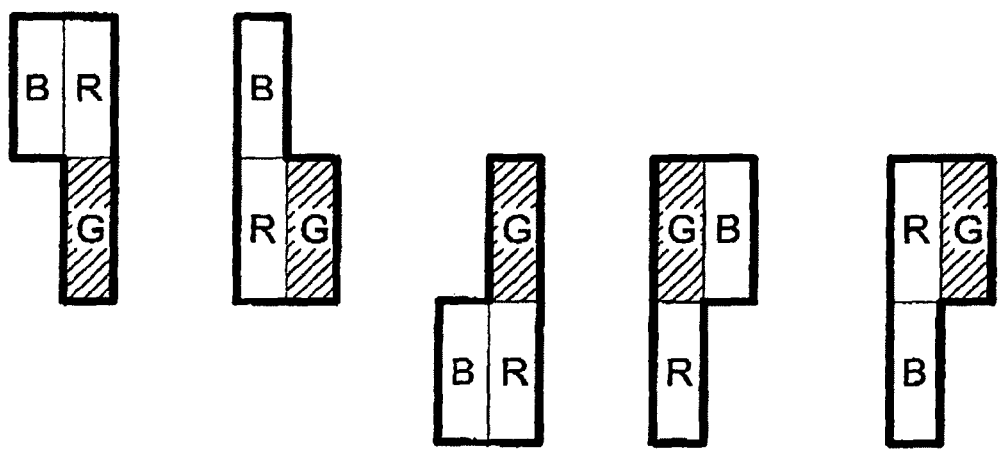
Figures 1, 1A, 2, 3:
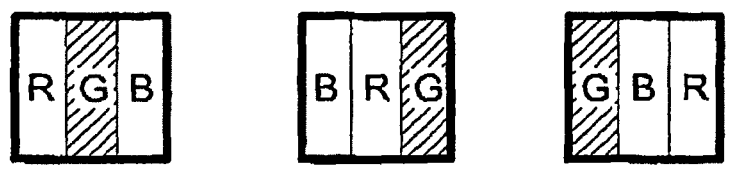

According to FIG. 1A-2, the selected dot (G) and two neighboring dots form an overlapping full color dynamic pixel group, and there are five overlapping full color dynamic pixel groups shown in FIG. 1A-2. A first overlapping full color dynamic pixel group comprises the selected dot (G), the forward dot (R) and the left-forward dot (B); a second overlapping full color dynamic pixel group comprises the selected dot (G), the left dot (R) and the left-forward dot (B); a third overlapping full color dynamic pixel group comprises the selected dot (G), the backward dot (R) and the left-backward dot (B); a fourth overlapping full color dynamic pixel group comprises the selected dot (G), the right dot (B) and the backward dot (R); and a fifth overlapping full color dynamic pixel group comprises the selected dot (G), the left dot (R) and the left-backward dot (B).

According to FIG. 1A-3, the selected dot (G) and two neighboring dots form an overlapping full color dynamic pixel group, and there are three overlapping full color dynamic pixel groups shown in FIG. 1A-3. A first overlapping full color dynamic pixel group comprises the selected dot (G), the left dot (R) and the right dot (B); a second overlapping full color dynamic pixel group comprises the selected dot (G), the right dot (B) and the next right dot (R); a third overlapping full color dynamic pixel group comprises the selected dot (G), the left dot (R) and the next left dot (B).

Figure 1B:
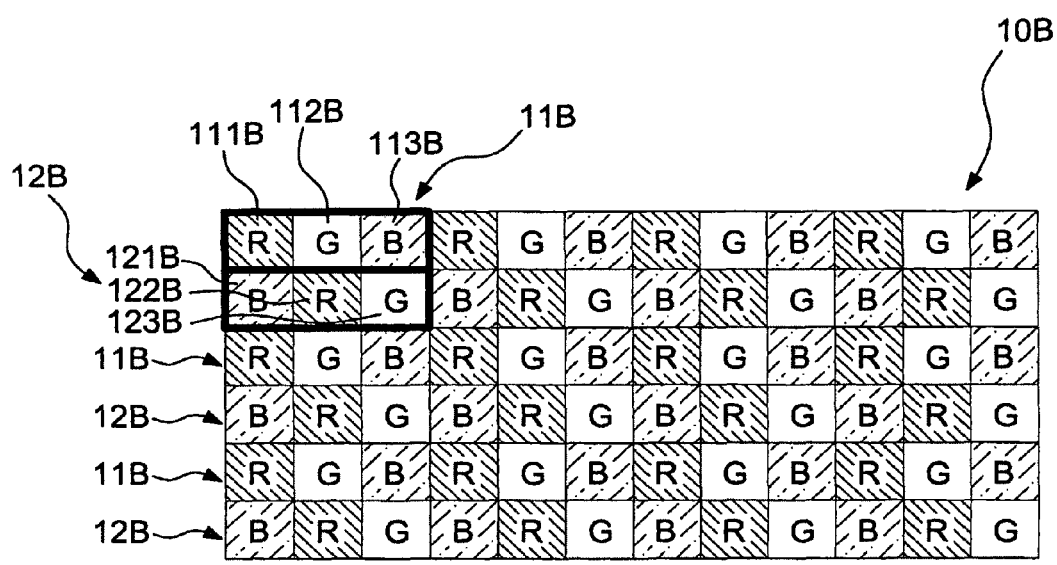
FIG. 1B shows an arrangement of quadrate shaped pixel, according to a first embodiment of the invention.

Referring to FIG. 1B, according to a first embodiment of the invention, a display 10B comprises a plurality of first pixel groups 11B and a plurality of second pixel groups 12B. Each first pixel group 11B and second pixel groups 12B comprises a plurality of dots arranged in a matrix form, and the arrangement of dots of the first pixel group 11B and the second pixel group 12B is the same as that of dots of the first pixel groups 11A and the second pixel groups 12A of the display 10A as shown in FIG. 1A. The first pixel group 11B comprises a red dot 111B, a green dot 112B and a blue dot 113B in sequence arranged in a 3×1 matrix. The second pixel group 12B comprises a blue dot 121B, a red dot 122B and a green dot 123B in sequence arranged in a 3×1 matrix.

Similarly, the first pixel groups 11B and the second pixel groups 12B are arranged alternately in the Y-axis direction. The first pixel groups 11B are disposed in odd row of the display 10B, and the second pixel groups 12B are disposed in even row of the display 10B. As shown in FIG. 1B, the dots of the first pixel groups 11B and the second pixel groups 12B are quadrate shaped.

Figure 2A:
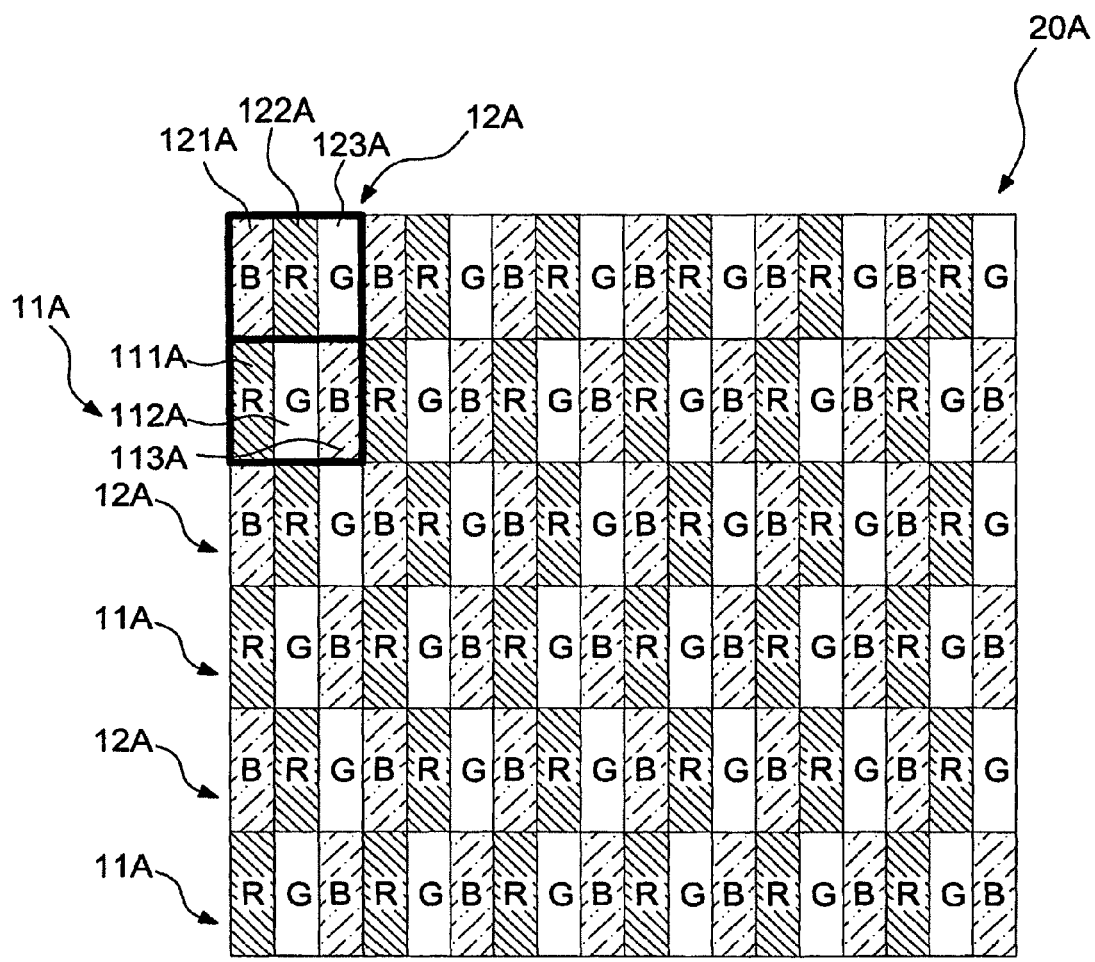
FIG. 2A shows an arrangement of stripe shaped pixel, according to a second embodiment of the invention.

Referring to FIG. 2A, according to a second embodiment of the invention, a display 20A comprises a plurality of first pixel groups 11A and a plurality of second pixel groups 12A.

The difference between the first embodiment and the second embodiment is that in the second embodiment, the first pixel groups 11A are disposed in even row of the display 20A, and the second pixel groups 12A are disposed in odd row of the display 20A. In the second embodiment, the dots of the first pixel groups 11A and the second pixel groups 12A are stripe shaped.

Figure 2B:
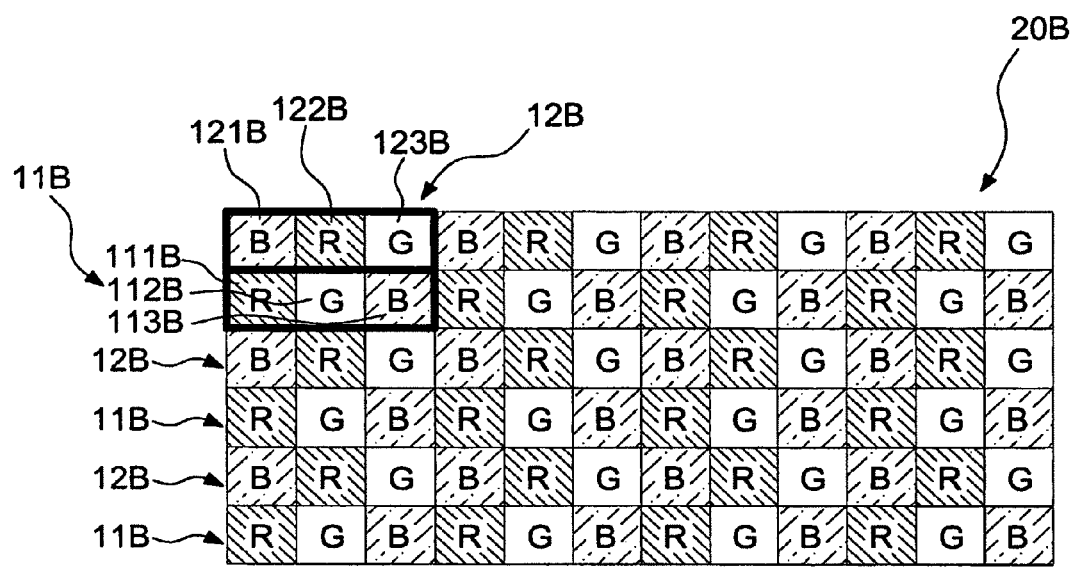
FIG. 2B shows an arrangement of quadrate shaped pixel, according to a second embodiment of the invention.

Referring to FIG. 2B, a display 20B comprises a plurality of first pixel groups 11B and a plurality of second pixel groups 12B. In the second embodiment, the first pixel groups 11B are disposed in even row of the display 20B, and the second pixel groups 12B are disposed in odd row of the display 20B. Besides, in the second embodiment, the dots of the first pixel groups 11B and the second pixel groups 12B are quadrate shaped.

Given the above, the first pixel group and the second pixel group do not limited to the above arrangement. Therefore, each the first pixel group may comprise a red dot, a green dot and a blue dot in sequence arranged in a matrix, and each second pixel group may comprise a green dot, a blue dot and a red dot in sequence arranged in a matrix. The first pixel groups and the second pixel groups are arranged alternately in the Y-axis direction. The first pixel groups may be disposed in odd row of the display, and the second pixel groups may be disposed in even row of the display. The first pixel groups can be disposed in even row of the display, and the second pixel groups can be disposed in odd row of the display.

Besides, each first pixel group may comprise a red dot, a blue dot and a green dot in sequence arranged in a matrix, and each second pixel group may comprise a blue dot, a green dot and a red dot in sequence arranged in a matrix. The first pixel groups and the second pixel groups are arranged alternately in the Y-axis direction. The first pixel groups may be disposed in odd row of the display, and the second pixel groups may be disposed in even row of the display. The first pixel groups can be disposed in even row of the display, and the second pixel groups can be disposed in odd row of the display.

Furthermore, each first pixel group may comprise a red dot, a blue dot and a green dot in sequence arranged in a matrix, and each second pixel group may comprise a green dot, a red dot and a blue dot in sequence arranged in a matrix. The first pixel groups and the second pixel groups are arranged alternately in the Y-axis direction. The first pixel groups may be disposed in odd row of the display, and the second pixel groups may be disposed in even row of the display. The first pixel groups can be disposed in even row of the display, and the second pixel groups can be disposed in odd row of the display.

Besides, each first pixel group may comprise a green dot, a blue dot and a red dot in sequence arranged in a matrix, and each second pixel group may comprise a blue dot, a red dot and a green dot in sequence arranged in a matrix. The first pixel groups and the second pixel groups are arranged alternately in the Y-axis direction. The first pixel groups may be disposed in odd row of the display, and the second pixel groups may be disposed in even row of the display. The first pixel groups can be disposed in even row of the display, and the second pixel groups can be disposed in odd row of the display.

Furthermore, each first pixel group may comprise a green dot, a red dot and a blue dot in sequence arranged in a matrix, and each second pixel group may comprise a blue dot, a green dot and a red dot in sequence arranged in a matrix. The first pixel groups and the second pixel groups are arranged alternately in the Y-axis direction. The first pixel groups may be disposed in odd row of the display, and the second pixel groups may be disposed in even row of the display. The first pixel groups can be disposed in even row of the display, and the second pixel groups can be disposed in odd row of the display.

Figure 3A:
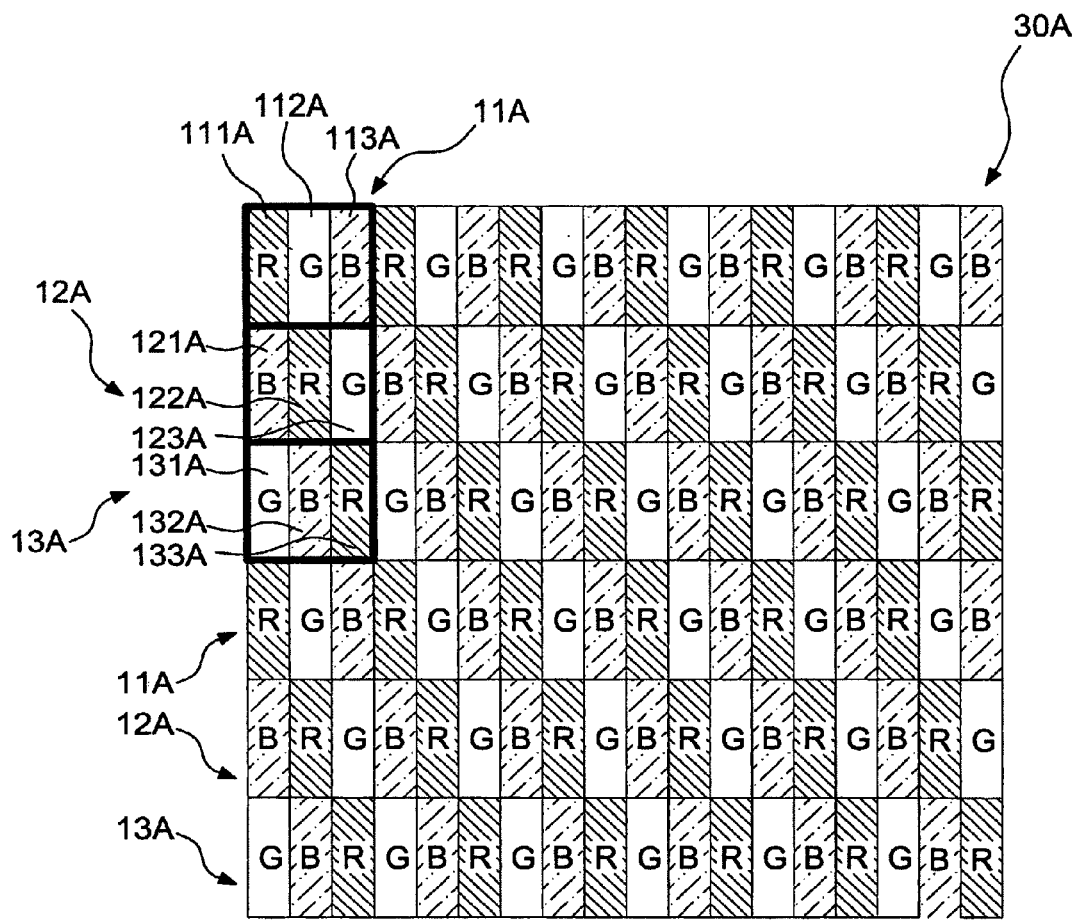
FIG. 3A shows an arrangement of stripe shaped pixel, according to a third embodiment of the invention.
Figures 1, 3A:
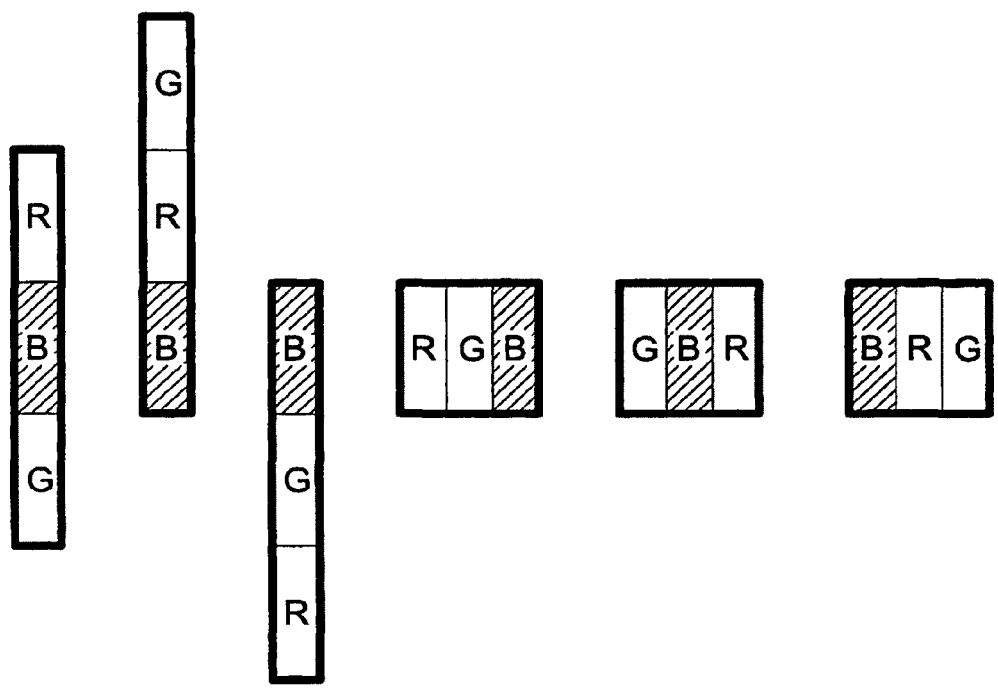

Referring to FIG. 3A, according to a third embodiment of the invention, a display 30A comprises a plurality of first pixel groups 11A, a plurality of second pixel groups 12A and a plurality of third pixel groups 13A. Each third pixel group 13A comprises a green dot 131A, a blue dot 132A and a red dot 133A in sequence arranged in a 3×1 matrix. The first pixel groups 11A, the second pixel groups 12A and the third pixel groups 13A are disposed in sequence along the Y-axis direction to form the display 30A. That is, the first pixel groups 11A are disposed in first row of the display 30A, the second pixel groups 12A are disposed in the second row of the display 30A, and the third pixel groups are disposed in the third row of the display 30A, in sequence. The first pixel groups 11A, the second pixel groups 12A and the third pixel groups 13A are stripe shaped.

According to FIG. 3A-1, the selected dot (B) and two neighboring dots form an overlapping full color dynamic pixel group, and there are six overlapping full color dynamic pixel groups shown in FIG. 3A-1. A first overlapping full color dynamic pixel group comprises the selected dot (B), the forward dot (R) and the backward dot (G); a second overlapping full color dynamic pixel group comprises the selected dot (B), the forward dot (R) and the next forward dot (G); a third overlapping full color dynamic pixel group comprises the selected dot (B), the backward dot (G) and the next backward dot (R); a fourth overlapping full color dynamic pixel group comprises the selected dot (B), the left dot (G) and the next left dot (R); a fifth overlapping full color dynamic pixel group comprises the selected dot (B), the left dot (G) and the right dot (R); and a sixth overlapping full color dynamic pixel group comprises the selected dot (B), the right dot (R) and the next right dot (G).

Figure 3B:
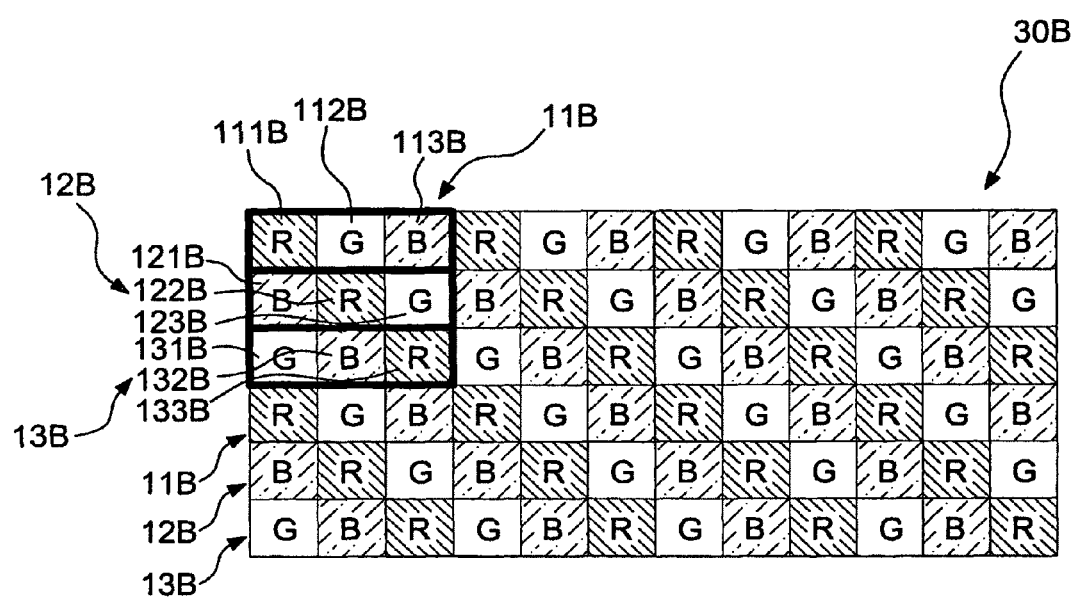
FIG. 3B shows an arrangement of quadrate shaped pixel, according to a third embodiment of the invention.

Referring to FIG. 3B, according to a third embodiment of the invention, a display 30B comprises a plurality of first pixel groups 11B, a plurality of second pixel groups 12B and a plurality of third pixel groups 13B. Each third pixel group 13B comprises a green dot 131B, a blue dot 132B and a red dot 133B in sequence arranged in a 3×1 matrix. The first pixel groups 11B, the second pixel groups 12B and the third pixel groups 13B are disposed in sequence along the Y-axis direction to form the display 30B. In the other word, the first pixel groups 11B are disposed in first row of the display 30B, the second pixel groups 12B are disposed in the second row of the display 30B, and the third pixel groups 13B are disposed in the third row of the display 30B, in sequence. The first pixel groups 11B, the second pixel groups 12B and the third pixel groups 13B are quadrate shaped.

Figure 4A:
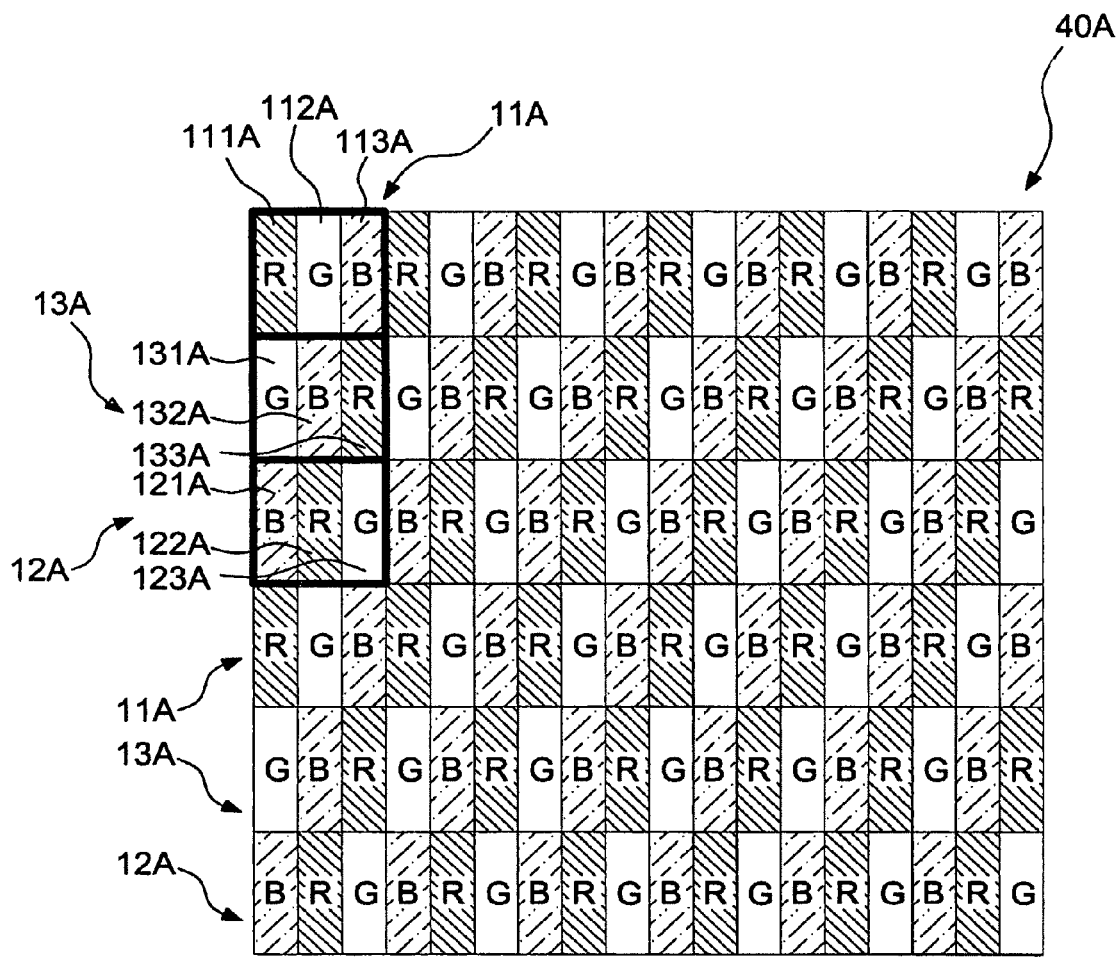
FIG. 4A shows an arrangement of stripe shaped pixel, according to a fourth embodiment of the invention.
Figures 1, 4A:
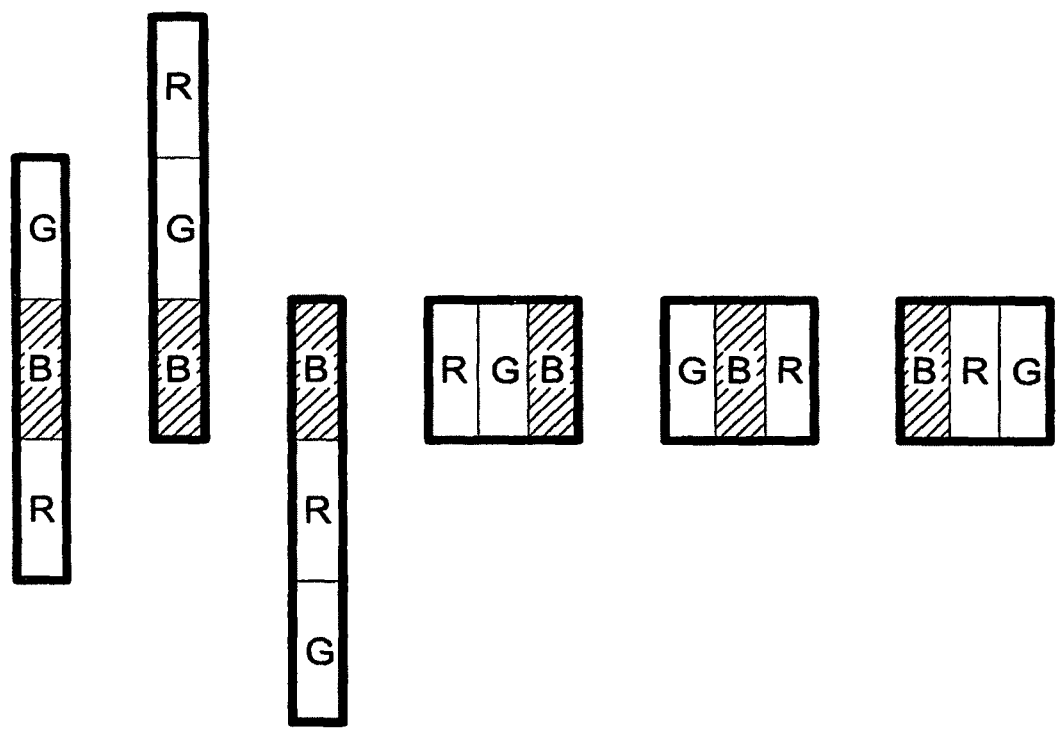

Referring to FIG. 4A, according to a fourth embodiment of the invention, a display 40A comprises a plurality of first pixel groups 11A, a plurality of second pixel groups 12A and a plurality of third pixel groups 13A. The first pixel groups 11A, the third pixel groups 13A and the second pixel groups 12A are disposed in sequence along the Y-axis direction to form the display 40A. That is, the first pixel groups 11A are disposed in first row of the display 40A, the third pixel groups are disposed in the second row of the display 40A, and the second pixel groups 12A are disposed in the third row of the display 40A, in sequence. The first pixel groups 11A, the second pixel groups 12A and the third pixel groups 13A are stripe shaped.

According to FIG. 4A-1, the selected dot (B) and two neighboring dots form an overlapping full color dynamic pixel group, and there are six overlapping full color dynamic pixel groups shown in FIG. 4A-1. A first overlapping full color dynamic pixel group comprises the selected dot (B), the forward dot (G) and the backward dot (R); a second overlapping full color dynamic pixel group comprises the selected dot (B), the forward dot (G) and the next forward dot (R); a third overlapping full color dynamic pixel group comprises the selected dot (B), the backward dot (R) and the next backward dot (G); a fourth overlapping full color dynamic pixel group comprises the selected dot (B), the left dot (G) and the next left dot (R); a fifth overlapping full color dynamic pixel group comprises the selected dot (B), the left dot (G) and the right dot (R); and a sixth overlapping full color dynamic pixel group comprises the selected dot (B), the right dot (R) and the next right dot (G).

Figure 4B:
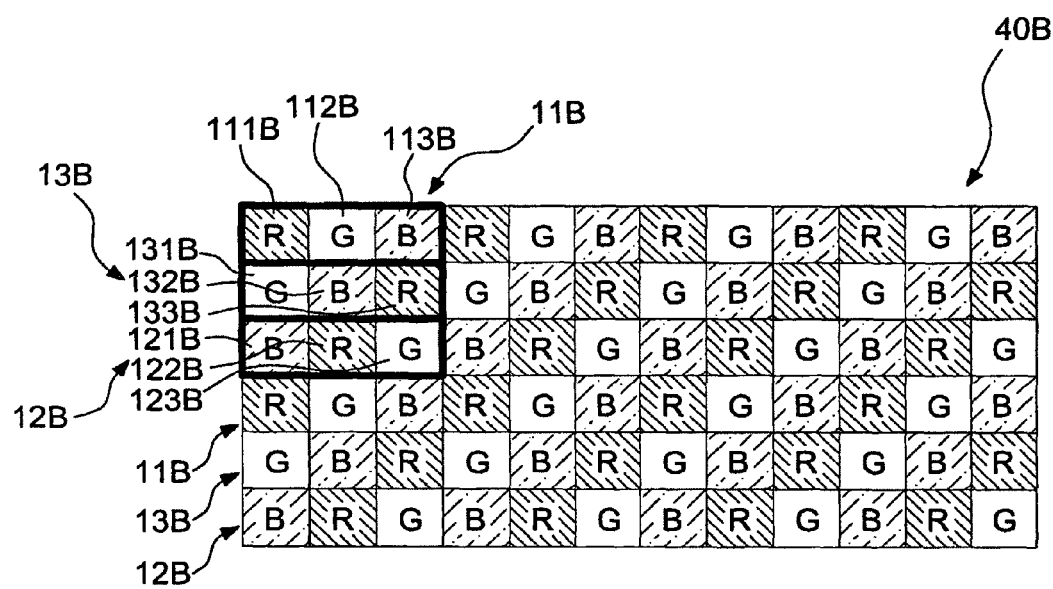
FIG. 4B shows an arrangement of quadrate shaped pixel, according to a fourth embodiment of the invention.

Referring to FIG. 4B, according to a fourth embodiment of the invention, a display 40B comprises a plurality of first pixel groups 11B, a plurality of second pixel groups 12B and a plurality of third pixel groups 13B. The first pixel groups 11B, the third pixel groups 13B and the second pixel groups 12B are disposed in sequence along the Y-axis direction to form the display 40B. That is, the first pixel groups 11B are disposed in first row of the display 40B, are the third pixel groups 13B disposed in the second row of the display 40B, and the second pixel groups 12B are disposed in the third row of the display 40B, in sequence. The first pixel groups 11B, the second pixel groups 12B and the third pixel groups 13B are quadrate shaped.

Figure 5A:
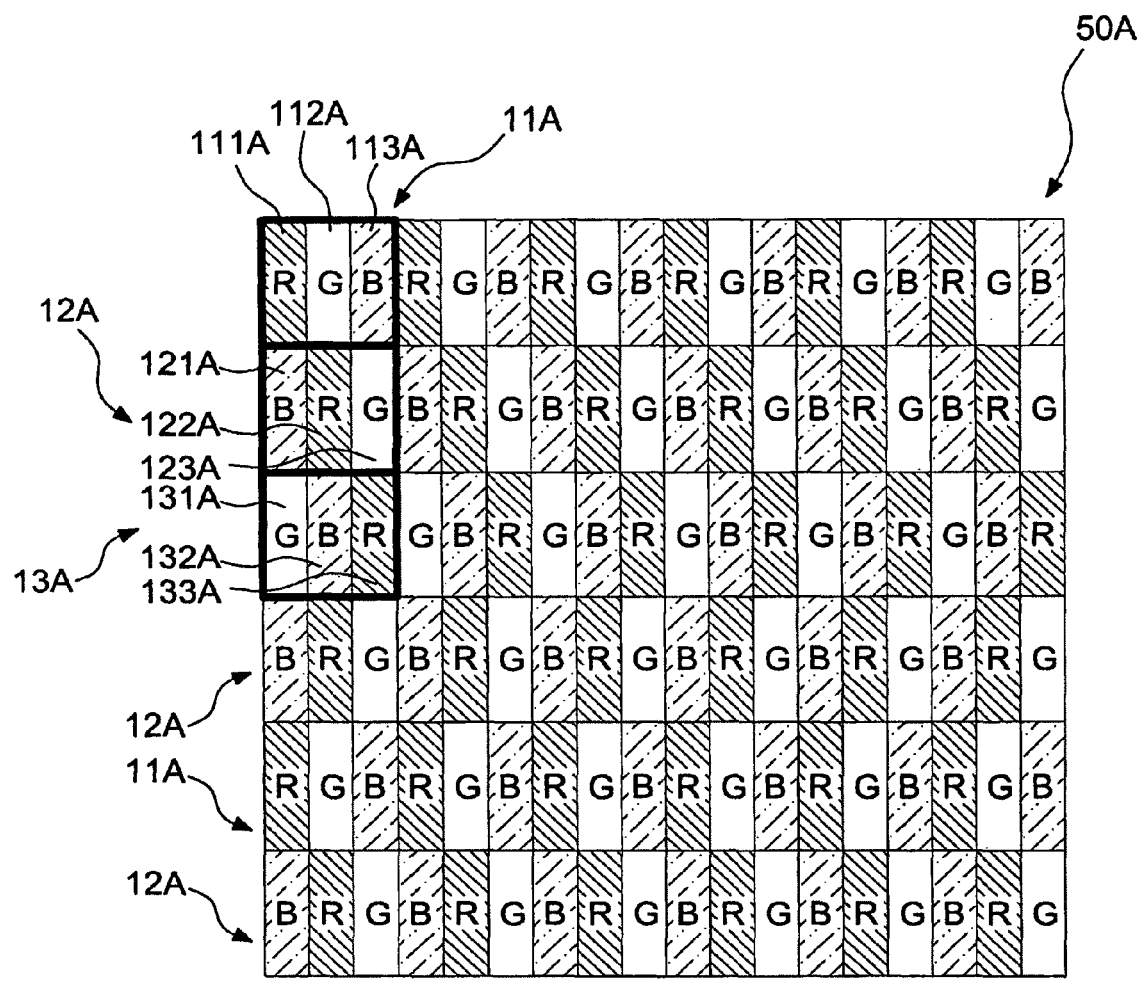
FIG. 5A shows an arrangement of stripe shaped pixel, according to a fifth embodiment of the invention.
Figures 1, 5A:
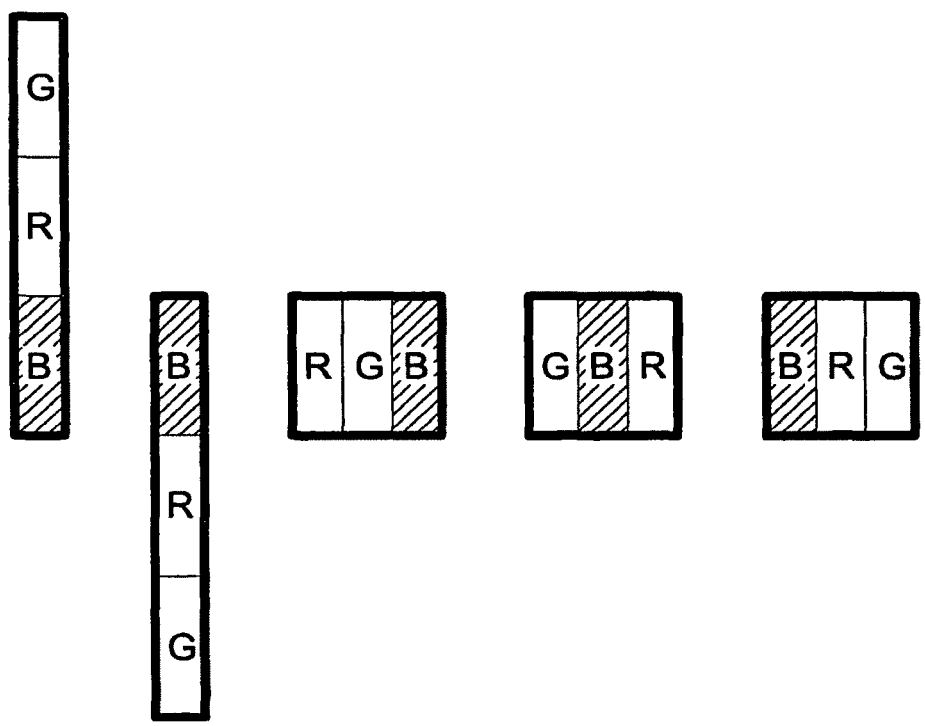

Referring to FIG. 5A, according to a fifth embodiment of the invention, a display 50A comprises a plurality of first pixel groups 11A, a plurality of second pixel groups 12A and a plurality of third pixel groups 13A. The first pixel groups 11A, the second pixel groups 12A, the third pixel groups 13A, the second pixel groups 12A, the first pixel groups 11A, and the second pixel groups 12A are disposed in sequence along the Y-axis direction to form the display 50A. That is, the first pixel groups 11A are disposed in first row of the display 50A, the second pixel groups 12A are disposed in the second row of the display 50A, the third pixel groups 13A are disposed in the third row of the display 50A, the second pixel groups 12A are disposed in the fourth row of the display 50A, the first pixel groups 11A are disposed in fifth row of the display 50A, the second pixel groups 12A are disposed in the sixth row of the display 50A, in sequence. The first pixel groups 11A, the second pixel groups 12A and the third pixel groups 13A are stripe shaped.

According to FIG. 5A-1, the selected dot (G) and two neighboring dots form an overlapping full color dynamic pixel group, and there are five overlapping full color dynamic pixel groups shown in FIG. 5A-1. A first overlapping full color dynamic pixel group comprises the selected dot (B), the forward dot (R) and the next forward dot (G); a second overlapping full color dynamic pixel group comprises the selected dot (B), the backward dot (R) and the next backward dot (G); a third overlapping full color dynamic pixel group comprises the selected dot (B), the left dot (G) and the next left dot (R); a fourth overlapping full color dynamic pixel group comprises the selected dot (B), the left dot (G) and the right dot (R); and a fifth overlapping full color dynamic pixel group comprises the selected dot (B), the right dot (R) and the next right dot (G).

Figure 5B:
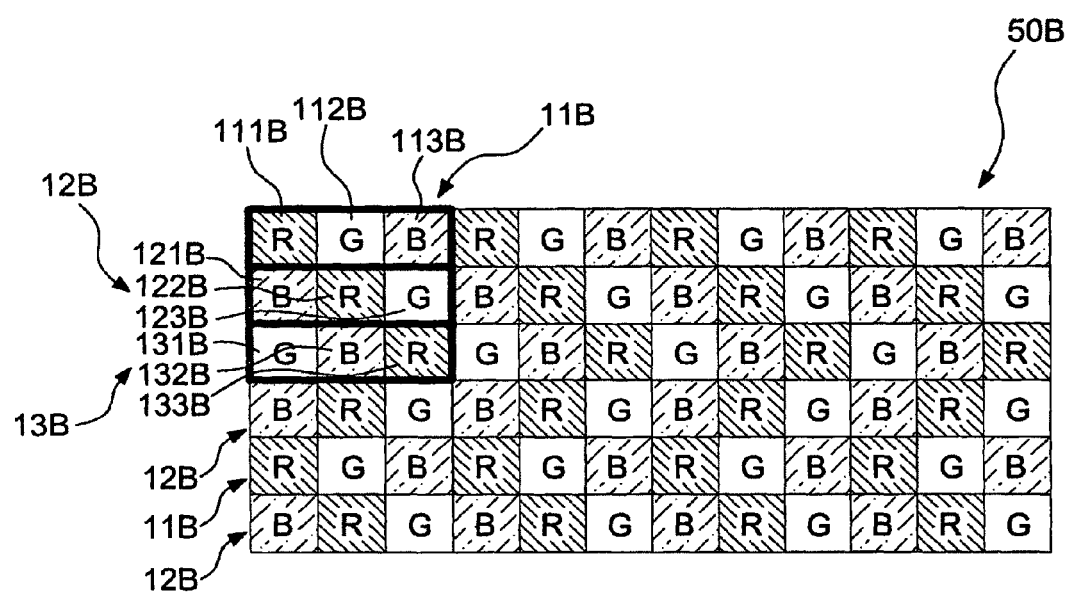
FIG. 5B shows an arrangement of quadrate shaped pixel, according to a fifth embodiment of the invention.

Referring to FIG. 5B, according to a fifth embodiment of the invention, a display 50B comprises a plurality of first pixel groups 11B, a plurality of second pixel groups 12B and a plurality of third pixel groups 13B. The first pixel groups 11B, the second pixel groups 12B, the third pixel groups 13B, the second pixel groups 12B, the first pixel groups 11B, and the second pixel groups 12B are disposed in sequence along the Y-axis direction to form the display 50B. That is, the first pixel groups 11B are disposed in first row of the display 50B, the second pixel groups 12B are disposed in the second row of the display 50B, the third pixel groups 13B are disposed in the third row of the display 50B, the second pixel groups 12B are disposed in the fourth row of the display 50B, the first pixel groups 11B are disposed in fifth row of the display 50B, the second pixel groups 12B are disposed in the sixth row of the display 50B, in sequence. The first pixel groups 11B, the second pixel groups 12B and the third pixel groups 13B are quadrate shaped.

Figure 6A:
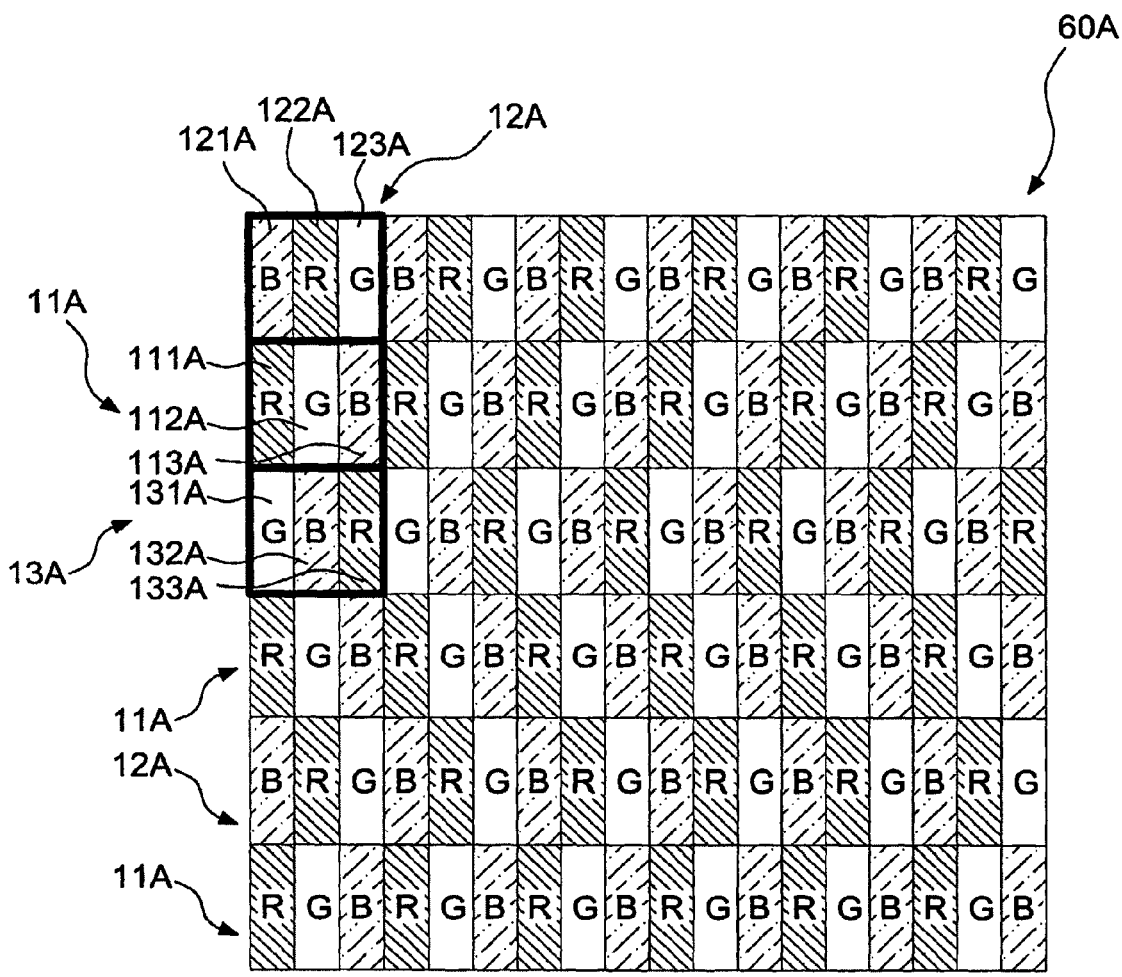
FIG. 6A shows an arrangement of stripe shaped pixel, according to a sixth embodiment of the invention.

Referring to FIG. 6A, according to a sixth embodiment of the invention, a display 60A comprises a plurality of first pixel groups 11A, a plurality of second pixel groups 12A and a plurality of third pixel groups 13A. The second pixel groups 12A, the first pixel groups 11A, the third pixel groups 13A, the first pixel groups 11A, the second pixel groups 12A, and the first pixel groups 11A are disposed in sequence along the Y-axis direction to form the display 60A. That is, the second pixel groups 12A are disposed in first row of the display 60A, the first pixel groups 11A are disposed in the second row of the display 60A, the third pixel groups 13A are disposed in the third row of the display 60A, the first pixel groups 11A are disposed in the fourth row of the display 60A, the second pixel groups 12A are disposed in fifth row of the display 60A, the first pixel groups 11A are disposed in the sixth row of the display 60A, in sequence. The first pixel groups 11A, the second pixel groups 12A and the third pixel groups 13A are stripe shaped.

Figure 6B:
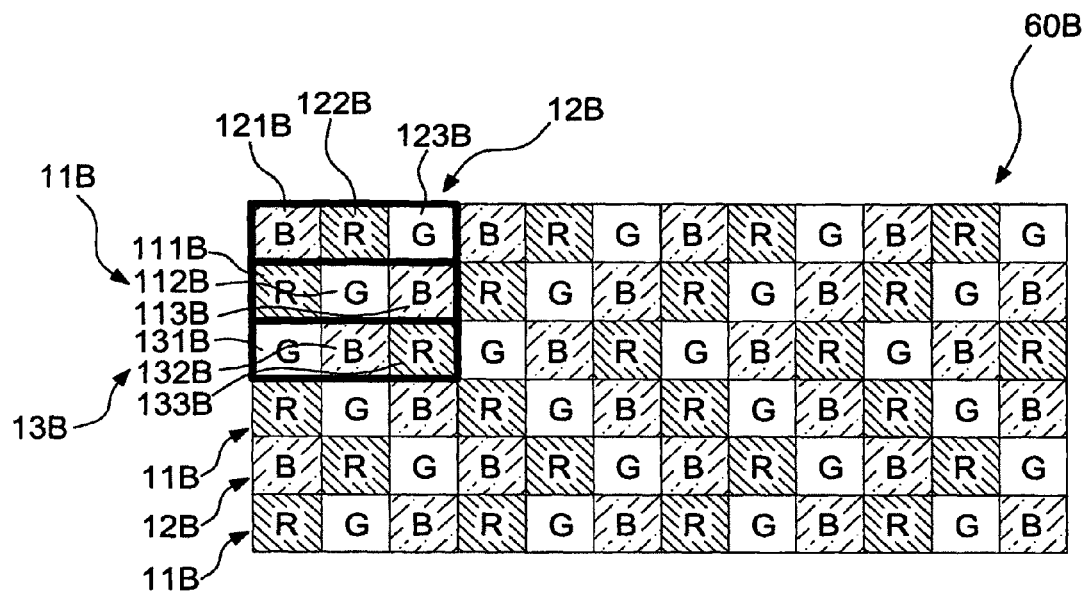
FIG. 6B shows an arrangement of quadrate shaped pixel, according to a sixth embodiment of the invention.

Referring to FIG. 6B, according to a sixth embodiment of the invention, a display 60B comprises a plurality of first pixel groups 11B, a plurality of second pixel groups 12B and a plurality of third pixel groups 13B. The second pixel groups 12B, the first pixel groups 11B, the third pixel groups 13B, the first pixel groups 11B, the second pixel groups 12B, and the first pixel groups 11B are disposed in sequence along the Y-axis direction to form the display 60B. That is, the second pixel groups 12B are disposed in first row of the display 60B, the first pixel groups 11B are disposed in the second row of the display 60B, the third pixel groups 13B are disposed in the third row of the display 60B, the first pixel groups 11B are disposed in the fourth row of the display 60B, the second pixel groups 12B are disposed in fifth row of the display 60B, the first pixel groups 11B are disposed in the sixth row of the display 60B, in sequence. The first pixel groups 11B, the second pixel groups 12B and the third pixel groups 13B are quadrate shaped.

Given the above, in the embodiments, the first pixel groups 11A or 11B, the second pixel groups 12A or 12B or the third pixel groups 13A or 13B are disposed in someone sequence along the Y-axis direction. However, according to the invention, the pixel groups can be disposed in someone sequence along the X-axis direction. Furthermore, in the embodiments, along the X-axis direction the pixel groups are the same, for example, in the first embodiment, the first pixel groups 11A are disposed repeatedly in the first row of the display 10A along the X-axis direction.

Figure 7:
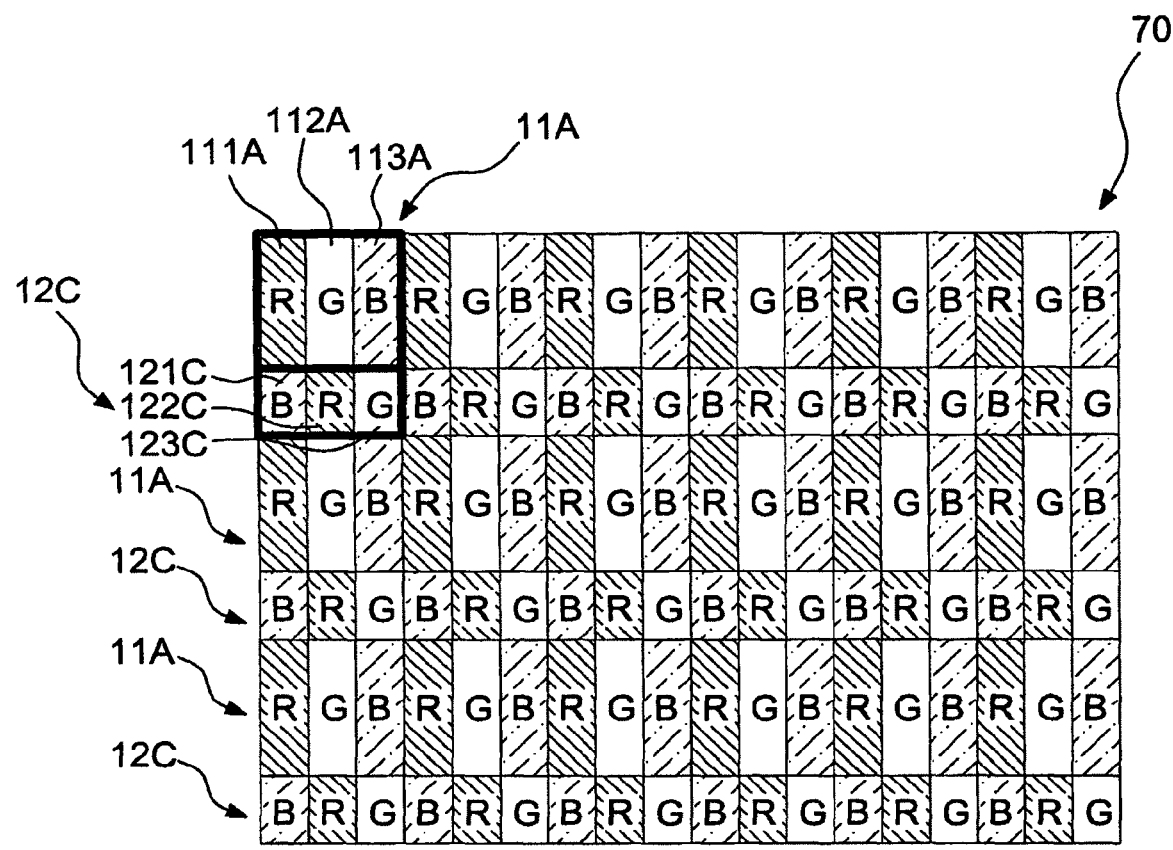
FIG. 7 shows an arrangement, according to a seventh embodiment of the invention.

Referring to FIG. 7, according to a seventh embodiment of the invention, a display 70 comprises a plurality of first pixel groups 11A, a plurality of second pixel groups 12C. The first pixel groups 11A and the second pixel groups 12C are disposed in sequence along the Y-axis direction to form the display 70. Each second pixel group 12C comprises a blue dot 121C, a red dot 122C and a green dot 123C in sequence arranged in a 3×1 matrix. Each dot of the first pixel group has a first height, and each dot of the second pixel group has a second height. The first height is different from the second height, and the first height is larger than the second height. As shown in FIG. 7, the second height is the half of the first height.

Figure 8A:
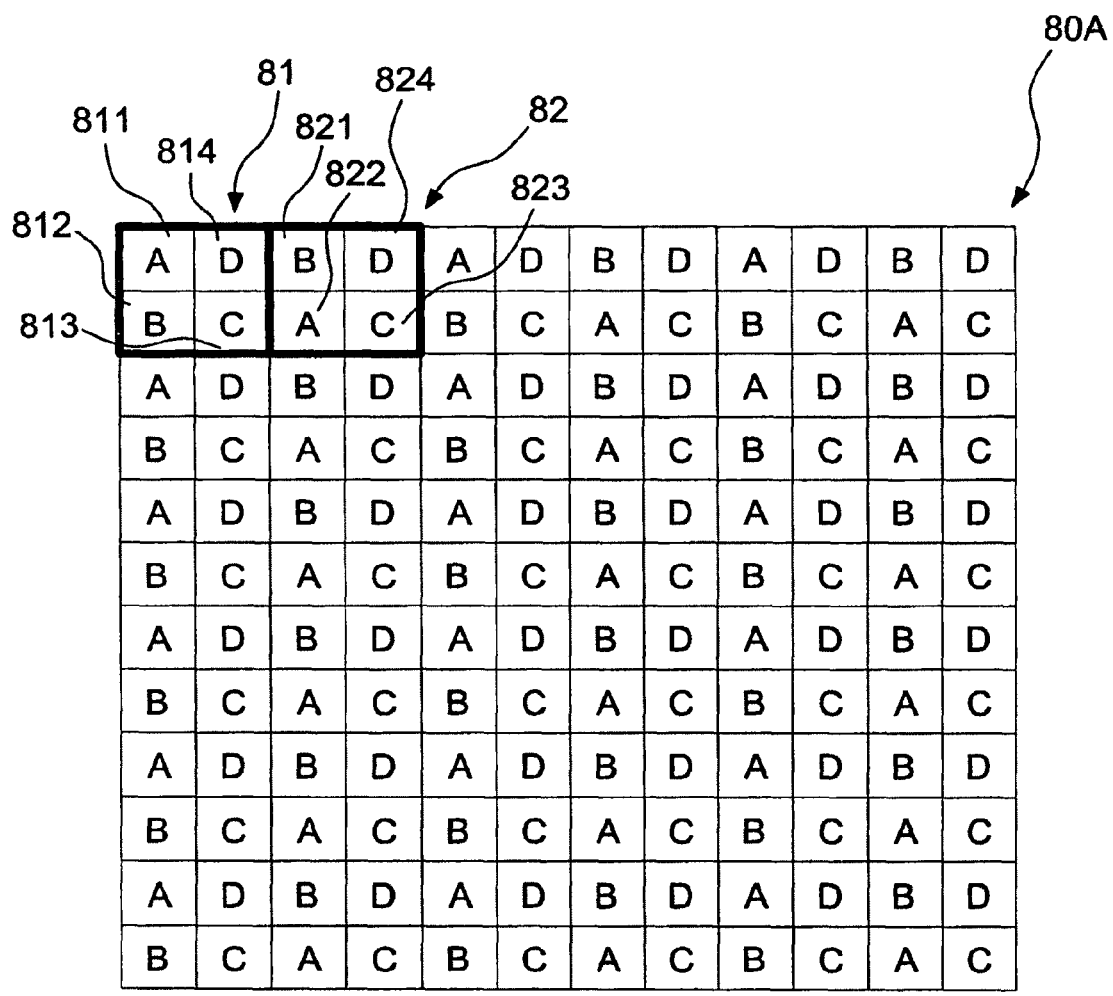
FIG. 8A to 8F show arrangements, according to a eighth embodiment of the invention.

Referring to FIG. 8A, according to a eighth embodiment of the invention, a display 80A comprises a plurality of first pixel groups 81 and a plurality of second pixel groups 82. Each first pixel group and second pixel group comprises four quadrate dots arranged in a 2×2 matrix. Each first pixel groups 81 comprises a first color dot 811 (A), a second color dot 812 (B), a third color dot 813 (C) and a fourth color dot 814 (D). Each second pixel groups 82 comprises a first color dot 821 (A), a second color dot 822 (B), a third color dot 823 (C) and a fourth color dot 824 (D). In detail, in the first pixel group, the first color dot 811 (A) and the second color dot 812 (B) in sequence are disposed on a first column of the first pixel group 811, and the fourth color dot 814 (D) and the third color dot (C) in sequence are disposed on a second column of the first pixel group 81. In the second pixel group 82, the second color dot 822 (B) and the first color dot 821 (A) in sequence are disposed on a first column of the second pixel group 82, and the fourth color dot 824 (D) and the third color dot 823 (C) in sequence are disposed on a second column of the second pixel group 82.

Therefore, according to FIG. 8A, the first column of the first pixel group 81 comprises two color dots (A) and (B) arranged in a first sequence, and a corresponding column (the first column) of the second pixel group 82 comprises two same color dots (A) and (B) arranged in a second sequence, the second sequence is reverse to the first sequence. In the first pixel group and the second pixel group, the first color dot (A) may be a red dot, the second color dot (B) may be a green dot, the third color dot (C) may be a blue dot, and the fourth color dot (D) may be a white dot. Furthermore, in the first pixel group and the second pixel group, the first color dot (A) may be a red dot, the second color dot (B) may be a white dot, the third color dot (C) may be a blue dot, and the fourth color dot (D) may be a green dot.

Referring to FIG. 8A-1, the selected dot (D) and three neighboring dots form an overlapping full color dynamic pixel group, and there are four overlapping full color dynamic pixel groups shown in FIG. 8A-1. A first overlapping full color dynamic pixel group comprises the selected dot (D), the left dot (A), the forward dot (C) and the left-forward dot (B); a second overlapping full color dynamic pixel group comprises the selected dot (D), the right dot (B), the forward dot (C) and the right-forward dot (A); a third overlapping full color dynamic pixel group comprises the selected dot (D), the left dot (A), the backward dot (C) and the left-backward dot (B); a fourth overlapping full color dynamic pixel group comprises the selected dot (D), the right dot (B), the backward dot (C) and a right-backward dot (A).

Figure 8B:
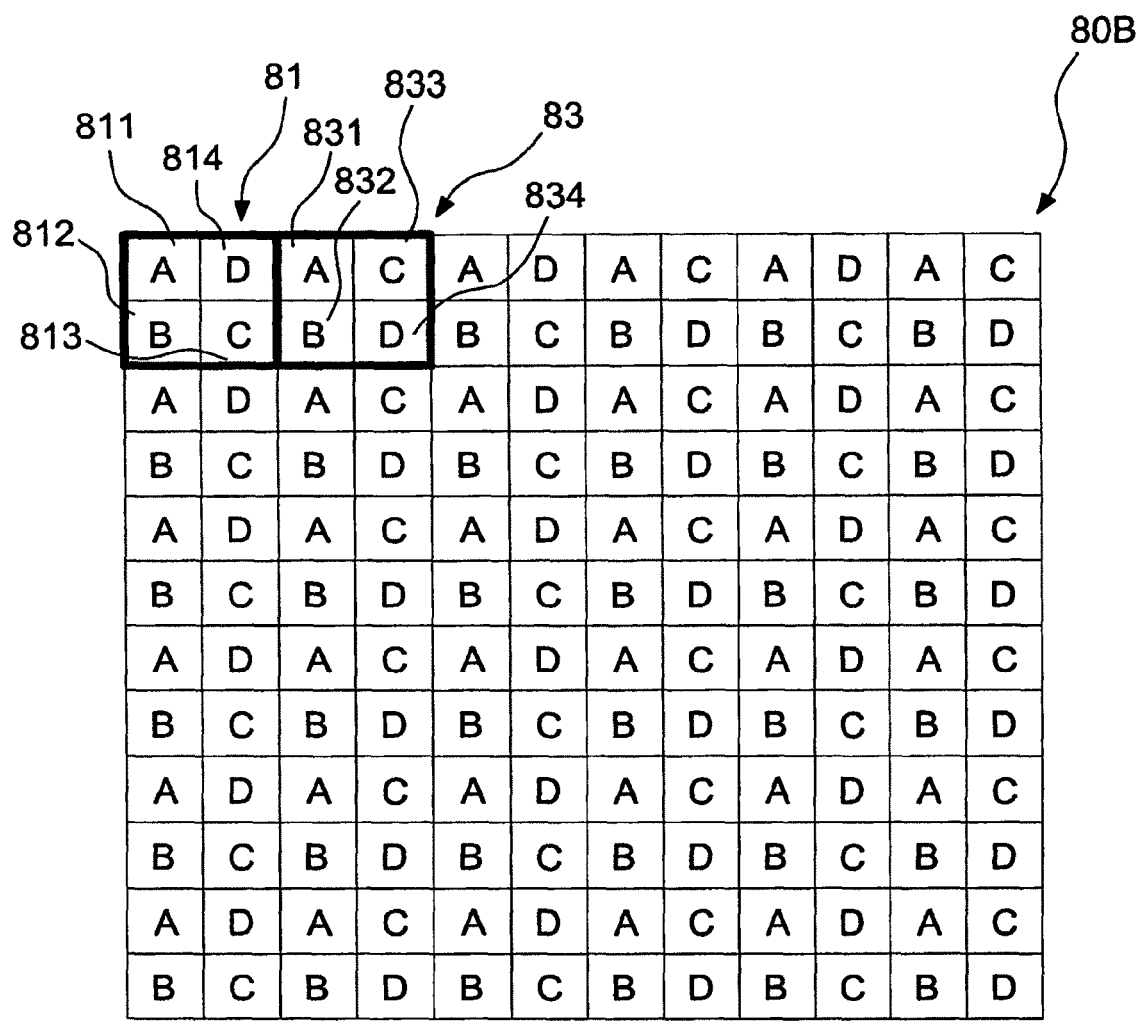

Referring to FIG. 8B, according to the eighth embodiment of the invention, a display 80B comprises a plurality of first pixel groups 81 and a plurality of third pixel groups 83. Each first pixel group and third pixel group comprises four quadrate dots arranged in a 2×2 matrix. Each third pixel groups 83 comprises a first color dot 831 (A), a second color dot 832 (B), a third color dot 833 (C) and a fourth color dot 834 (D). In the FIG. 8B, the second column of the first pixel group 81 comprises two color dots (C) and (D) arranged in a first sequence, and a corresponding column (the second column) of the third pixel group 83 comprises two same color dots (C) and (D) arranged in a second sequence, the second sequence is reverse to the first sequence. Therefore, according to the eighth embodiment of the invention, one of the two column of the first pixel group comprises two color dots arranged in a first sequence, and a corresponding column of the second pixel group comprises two same color dots arranged in a second sequence, the second sequence is reverse to the first sequence. Besides, one of the two row of the first pixel group comprises two color dots arranged in a first sequence, a corresponding row of the second pixel group comprises two same color dots arranged in a second sequence, the second sequence is reverse to the first sequence.

Referring to FIG. 8B-1, the selected dot (D) and three neighboring dots form an overlapping full color dynamic pixel group, and there are four overlapping full color dynamic pixel groups shown in FIG. 8B-1. A first overlapping full color dynamic pixel group comprises the selected dot (D), the left dot (A), the forward dot (C) and the left-forward dot (B); a second overlapping full color dynamic pixel group comprises the selected dot (D), the right dot (A), the forward dot (C) and the right-forward dot (B); a third overlapping full color dynamic pixel group comprises the selected dot (D), the left dot (A), the backward dot (C) and the left-backward dot (B); a fourth overlapping full color dynamic pixel group comprises the selected dot (D), the right dot (A), the backward dot (C) and a right-backward dot (B).

Figure 8C:
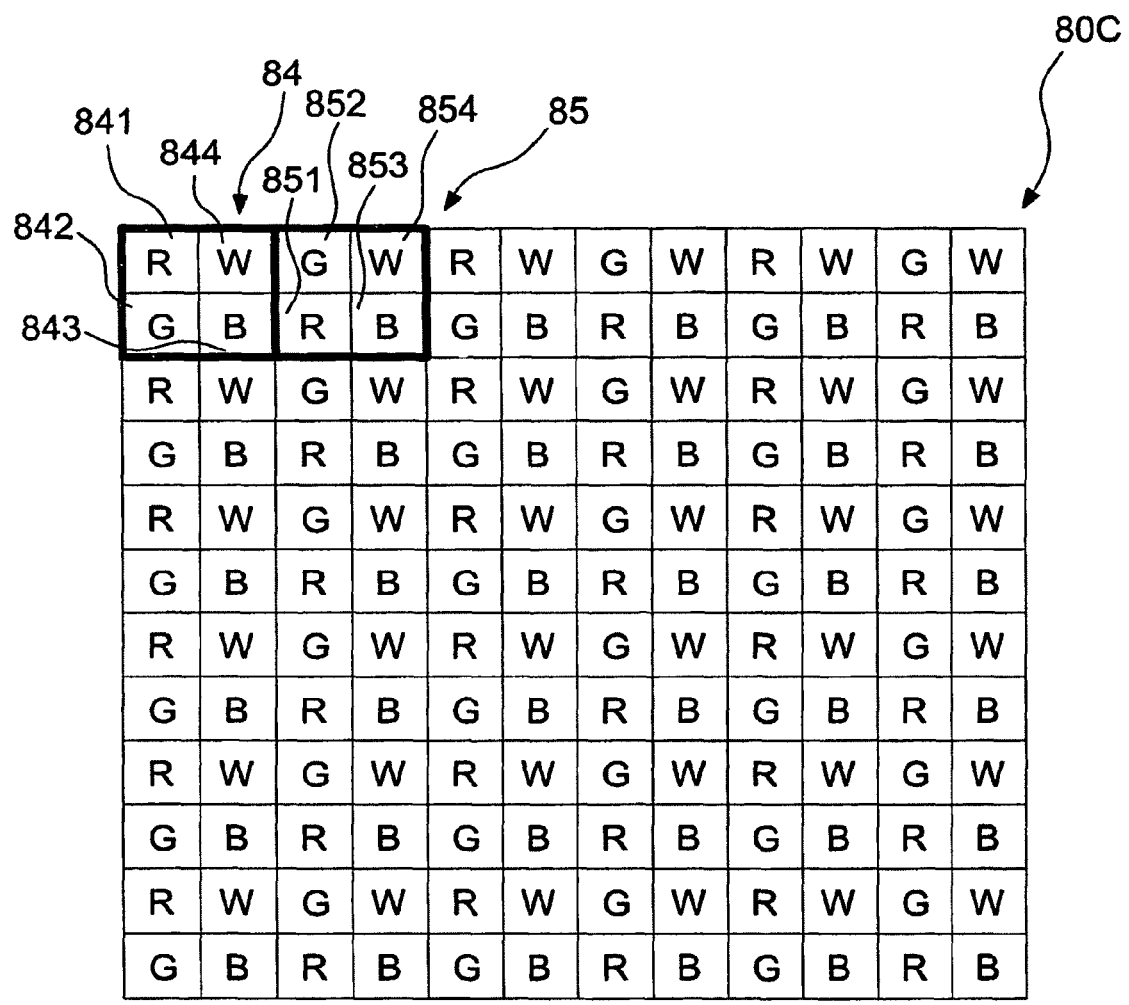

Referring to FIG. 8C, according to the eighth embodiment of the invention, a display 80C comprises a plurality of fourth pixel groups 84 and a plurality of fifth pixel groups 85. Each fourth pixel group and fifth pixel group comprises four quadrate dots arranged in a 2×2 matrix. Each fourth pixel groups 84 comprises a red color dot 841 (R), a green color dot 842 (G), a blue color dot 843 (B) and a white color dot 844 (W). Each fifth pixel groups 85 comprises a red color dot 851 (R), a green color dot 852 (G), a blue color dot 853 (B) and a white color dot 854 (W).

Referring to FIG. 8C-1, the selected dot (B) and three neighboring dots form an overlapping full color dynamic pixel group, and there are four overlapping full color dynamic pixel groups shown in FIG. 8C-1. A first overlapping full color dynamic pixel group comprises the selected dot (B), the left dot (G), the forward dot (W) and the left-forward dot (R); a second overlapping full color dynamic pixel group comprises the selected dot (B), the right dot (R), the forward dot (W) and the right-forward dot (G); a third overlapping full color dynamic pixel group comprises the selected dot (B), the left dot (G), the backward dot (W) and the left-backward dot (R); a fourth overlapping full color dynamic pixel group comprises the selected dot (B), the right dot (R), the backward dot (W) and a right-backward dot (G).

Figure 8D:
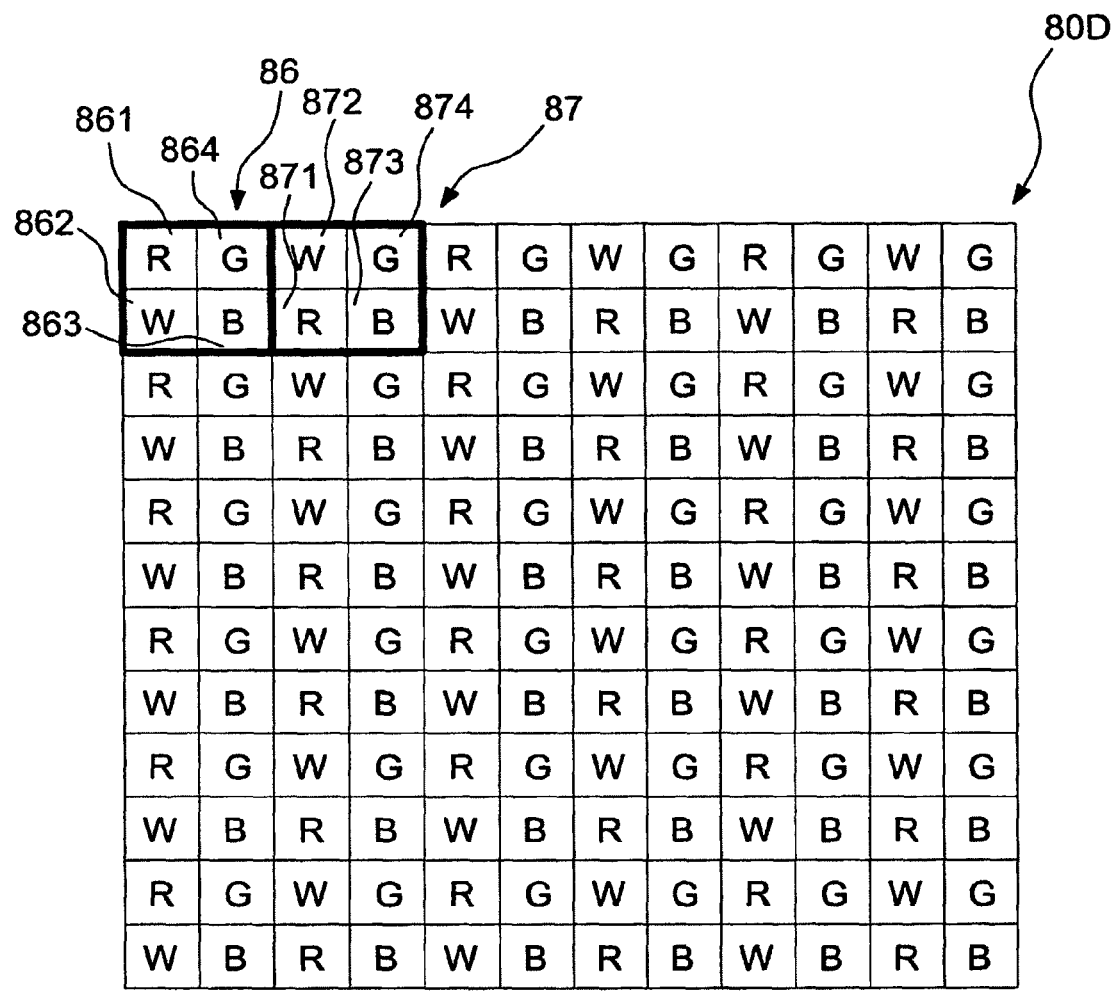

Referring to FIG. 8D, according to the eighth embodiment of the invention, a display 80D comprises a plurality of sixth pixel groups 86 and a plurality of seventh pixel groups 87. Each sixth pixel group and seventh pixel group comprises four quadrate dots arranged in a 2×2 matrix. Each sixth pixel groups 86 comprises a red color dot 861 (R), a white color dot 862 (W), a blue color dot 863 (B) and a green color dot 864 (G). Each seventh pixel groups 87 comprises a red color dot 871 (R), a white color dot 872 (W), a blue color dot 873 (B) and a green color dot 874 (G).

Referring to FIG. 8D-1, the selected dot (G) and three neighboring dots form an overlapping full color dynamic pixel group, and there are four overlapping full color dynamic pixel groups shown in FIG. 8D-1. A first overlapping full color dynamic pixel group comprises the selected dot (G), the left dot (R), the forward dot (B) and the left-forward dot (W); a second overlapping full color dynamic pixel group comprises the selected dot (G), the right dot (W), the forward dot (B) and the right-forward dot (R); a third overlapping full color dynamic pixel group comprises the selected dot (G), the left dot (R), the backward dot (B) and the left-backward dot (W); a fourth overlapping full color dynamic pixel group comprises the selected dot (G), the right dot (W), the backward dot (B) and a right-backward dot (R).

Figure 8E:
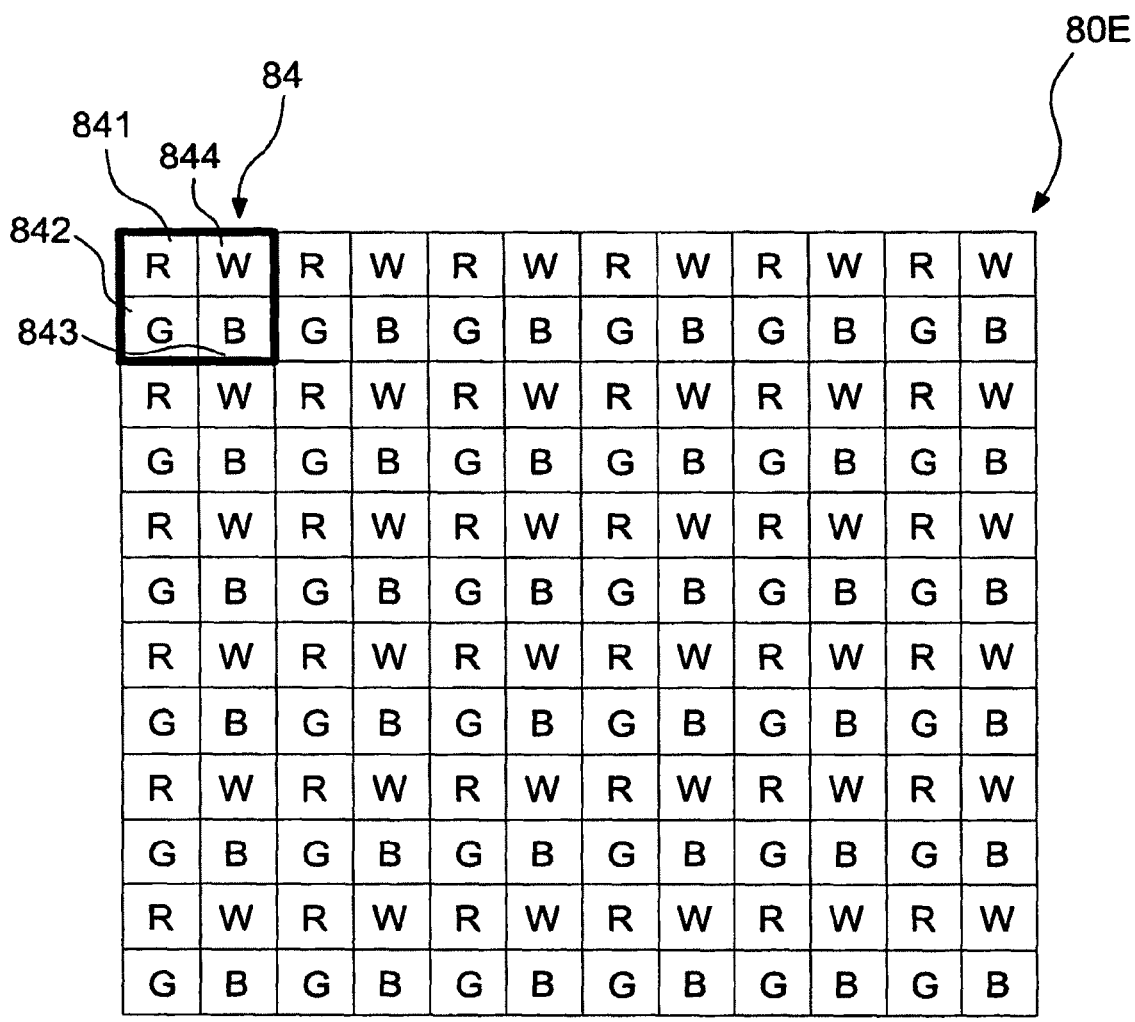

Referring to FIG. 8E, according to the eighth embodiment of the invention, a display 80E comprises a plurality of fourth pixel groups 84. Each fourth pixel group comprises four quadrate dots arranged in a 2×2 matrix. Each fourth pixel groups 84 comprises a red color dot 841 (R), a green color dot 842 (G), a blue color dot 843 (B) and a white color dot 844 (W).

Referring to FIG. 8E-1, the selected dot (G) and three neighboring dots form an overlapping full color dynamic pixel group, and there are four overlapping full color dynamic pixel groups shown in FIG. 8E-1. A first overlapping full color dynamic pixel group comprises the selected dot (G), the left dot (B), the forward dot (R) and the left-forward dot (W); a second overlapping full color dynamic pixel group comprises the selected dot (G), the right dot (B), the forward dot (R) and the right-forward dot (W); a third overlapping full color dynamic pixel group comprises the selected dot (G), the left dot (B), the backward dot (R) and the left-backward dot (W); a fourth overlapping full color dynamic pixel group comprises the selected dot (G), the right dot (B), the backward dot (R) and a right-backward dot (W).

Figure 8F:
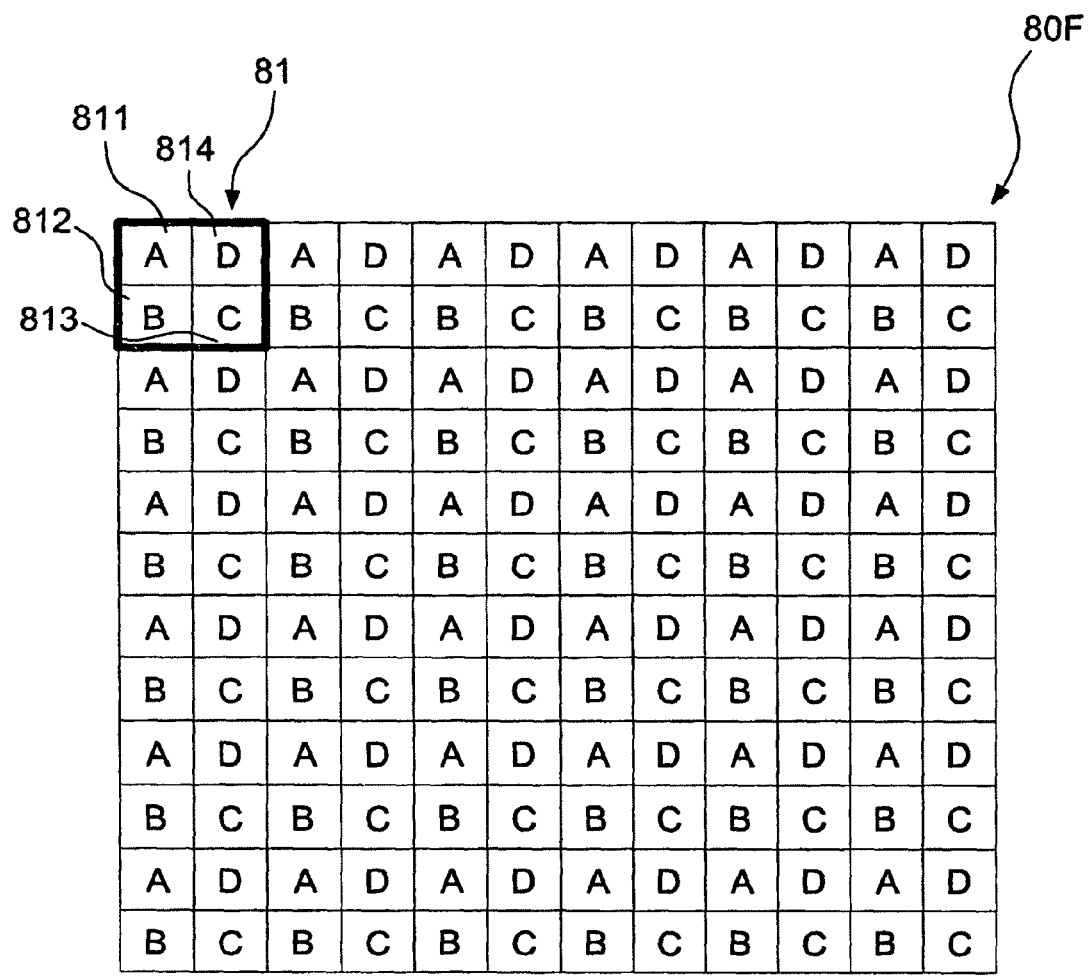
Figures 1, 8A:
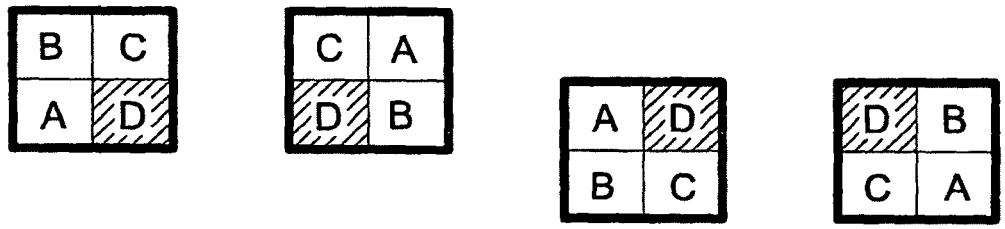
Figures 1, 8B:
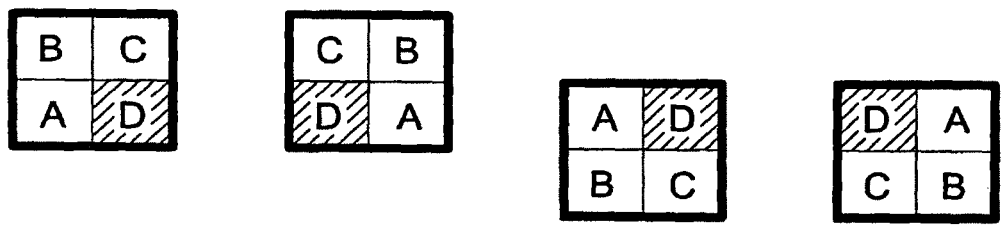
Figures 1, 8C:
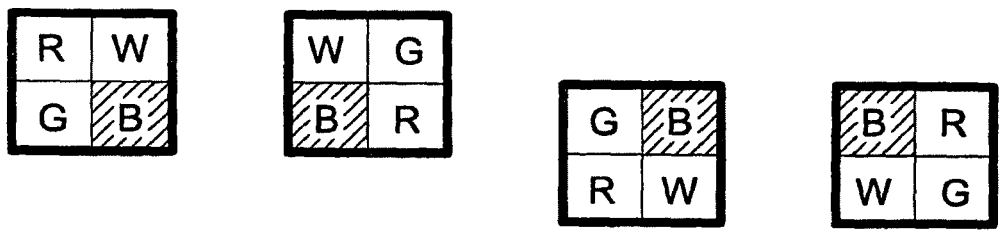
Figures 1, 8D:
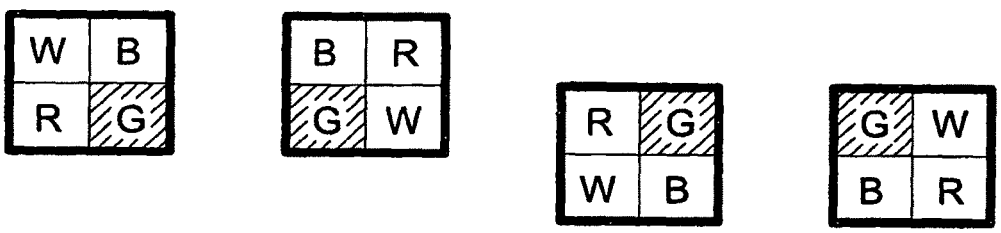
Figures 1, 8E:
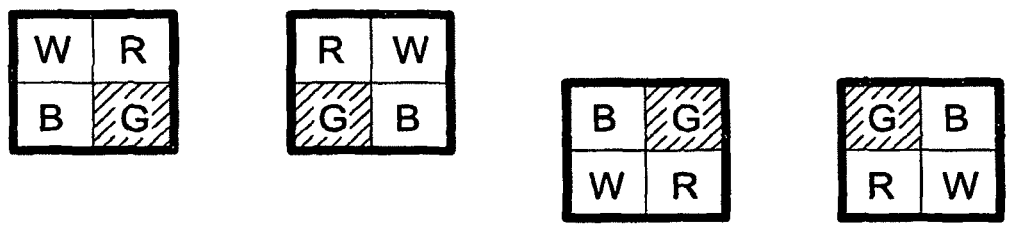
Figures 1, 8F:
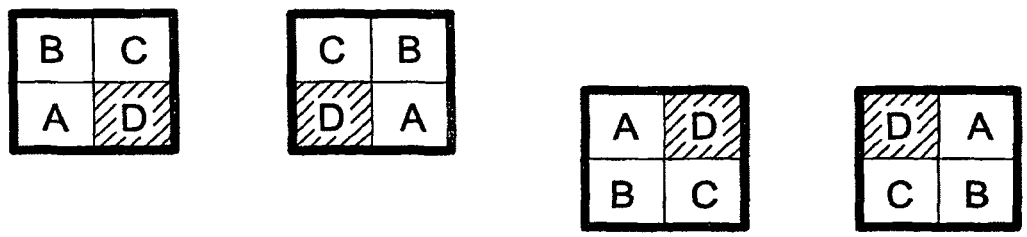

Referring to FIG. 8F, according to the eighth embodiment of the invention, a display 80F comprises a plurality of a plurality of first pixel groups 81. Each first pixel group comprises four quadrate dots arranged in a 2×2 matrix. Each first pixel groups 81 comprises a first color dot 811 (A), a second color dot 812 (B), a third color dot 813 (C) and a fourth color dot 814 (D).

Referring to FIG. 8F-1, the selected dot (D) and three neighboring dots form an overlapping full color dynamic pixel group, and there are four overlapping full color dynamic pixel groups shown in FIG. 8F-1. A first overlapping full color dynamic pixel group comprises the selected dot (D), the left dot (A), the forward dot (C) and the left-forward dot (B); a second overlapping full color dynamic pixel group comprises the selected dot (D), the right dot (A), the forward dot (C) and the right-forward dot (B); a third overlapping full color dynamic pixel group comprises the selected dot (D), the left dot (A), the backward dot (C) and the left-backward dot (B); a fourth overlapping full color dynamic pixel group comprises the selected dot (D), the right dot (A), the backward dot (C) and a right-backward dot (B).

Figure 9A:
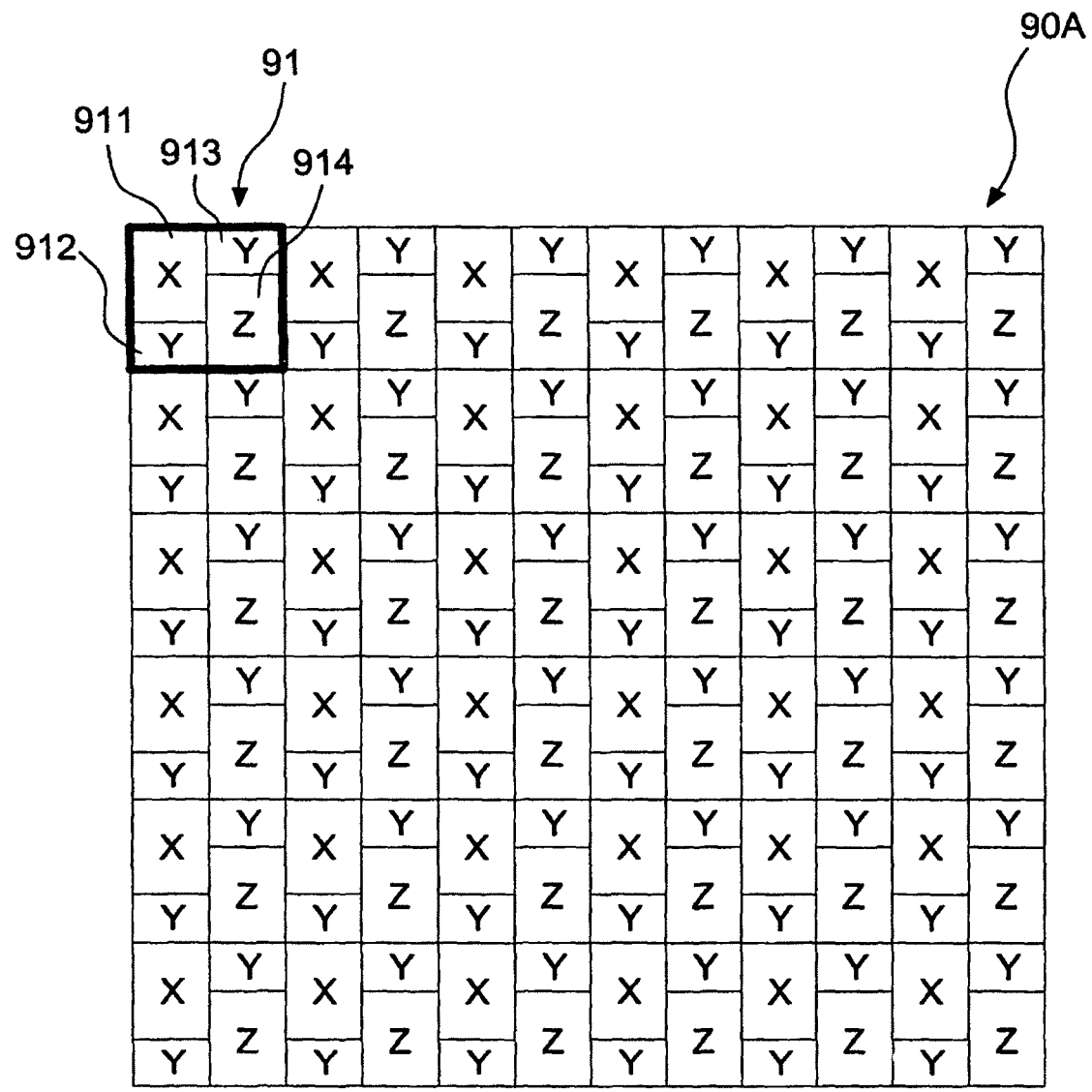
FIG. 9A to 9I show arrangements, according to a ninth embodiment of the invention.

Referring to FIG. 9A, according to a ninth embodiment of the invention, a display 90A comprises a plurality of first pixel groups 91. The first pixel groups 91 are quadrate shaped, and each pixel group 91 comprises four dots having a first color dot 911, two second color dot 912, 913 and a third color dot 914. The first color dot 911 (X) is disposed on a first row-first column position of the first pixel group 91, two second color dots 912 (Y) and 913 (Y) are disposed respectively on a first row-second column and a second row-first column positions of the first pixel group 91, the third color dot 914 (Z) is disposed on a second row-second column position of the first pixel group 91.

The area of the first color dot 911 is the same as that of the third color dot 914, the area of two second color dots 912 and 913 is the same as that of the third color dot 914. That is, the area of the second color dot 912 is the half of that of the first color dot 911. In the other word, the first color dot 911 has a first width (for example: 1.5) and a first height (for example: 2), the second color dot 912 has the first width and a second height (for example: 1), the third color dot 914 has the first width and the first height. Therefore, the second height (for example: 1) is the half of the first height (for example: 2), and the area of the second color dot 912 is the half of that of the first color dot 911.

Referring to FIG. 9A-1, the selected dot (Z) and three neighboring dots form an overlapping full color dynamic pixel group, and there are four overlapping full color dynamic pixel groups shown in FIG. 9A-1. A first overlapping full color dynamic pixel group comprises the selected dot (Z), the left dot (Y), the forward dot (Y) and the left-forward dot (X); a second overlapping full color dynamic pixel group comprises the selected dot (Z), the right dot (Y), the forward dot (Y) and the right-forward dot (X); a third overlapping full color dynamic pixel group comprises the selected dot (Z), the left dot (Y), the backward dot (Y) and the left-backward dot (X); a fourth overlapping full color dynamic pixel group comprises the selected dot (Z), the right dot (Y), the backward dot (Y) and a right-backward dot (X).

Figure 9B:
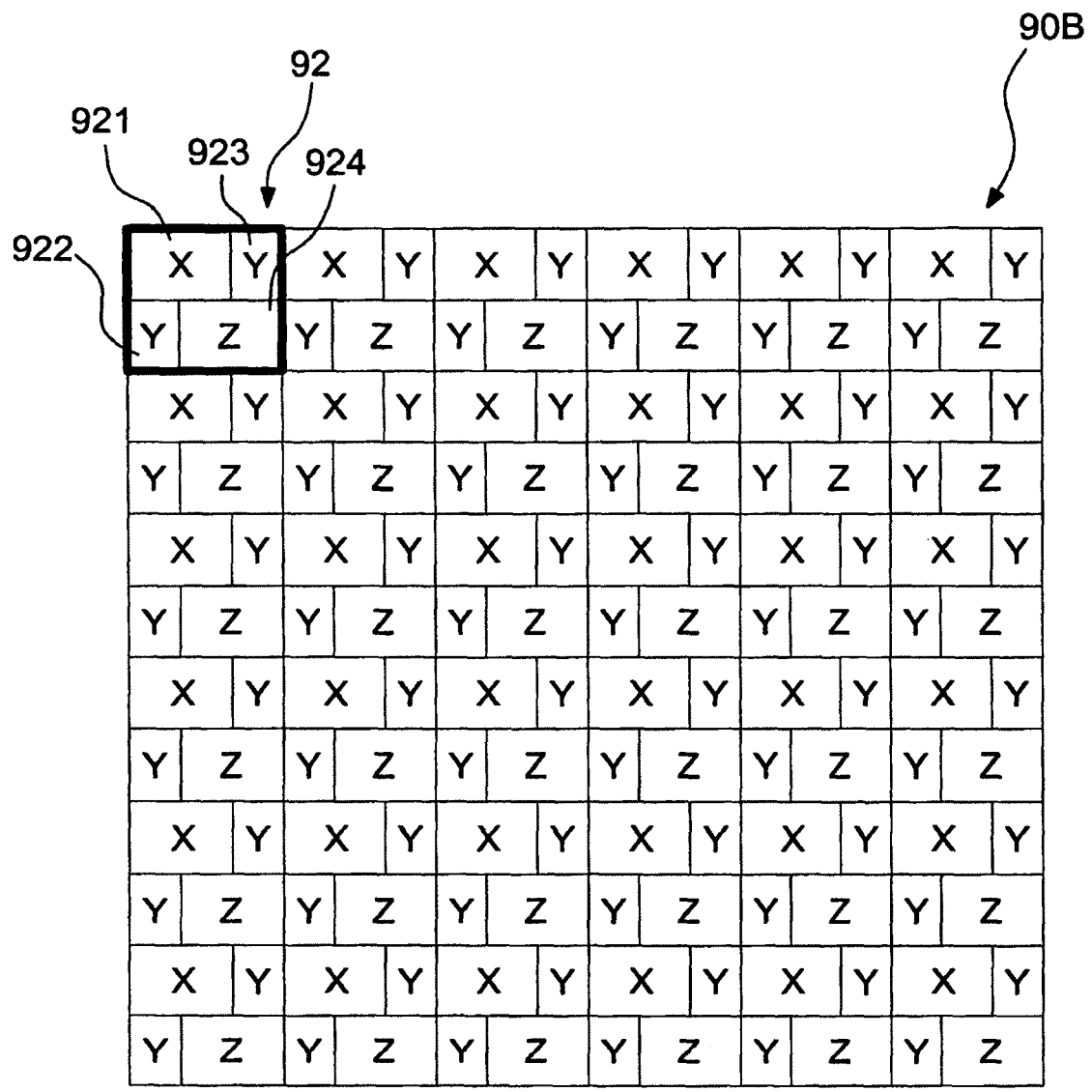

Referring to FIG. 9B, according to a ninth embodiment of the invention, a display 90B comprises a plurality of second pixel groups 92. The second pixel groups 92 are quadrate shaped, and each second pixel group 92 comprises four dots having a first color dot 921, two second color dot 922, 923 and a third color dot 924. The first color dot 921 (X) is disposed on a first row-first column position of the second pixel group 92, two second color dots 922 (Y) and 923 (Y) are disposed respectively on a first row-second column and a second row-first column positions of the second pixel group 92, the third color dot 924 (Z) is disposed on a second row-second column position of the second pixel group 92.

The area of the first color dot 921 is the same as that of the third color dot 924, the area of two second color dots 922 and 923 is the same as that of the third color dot 914. That is, the area of the second color dot 922 is the half of that of the first color dot 911. In the other word, the first color dot 921 has a first width (for example: 2) and a first height (for example: 1.5), the second color dot 922 has the second width (for example: 1) and the first height, the third color dot 924 has the first width and the first height. Therefore, the second width (for example: 1) is the half of the first width (for example: 2), and the area of the second color dot 922 is the half of that of the first color dot 921.

Referring to FIG. 9B-1, the selected dot (Z) and three neighboring dots form an overlapping full color dynamic pixel group, and there are four overlapping full color dynamic pixel groups shown in FIG. 9B-1. A first overlapping full color dynamic pixel group comprises the selected dot (Z), the left dot (Y), the forward dot (Y) and the left-forward dot (X); a second overlapping full color dynamic pixel group comprises the selected dot (Z), the right dot (Y), the forward dot (Y) and the right-forward dot (X); a third overlapping full color dynamic pixel group comprises the selected dot (Z), the left dot (Y), the backward dot (Y) and the left-backward dot (X); a fourth overlapping full color dynamic pixel group comprises the selected dot (Z), the right dot (Y), the backward dot (Y) and a right-backward dot (X).

Figure 9C:
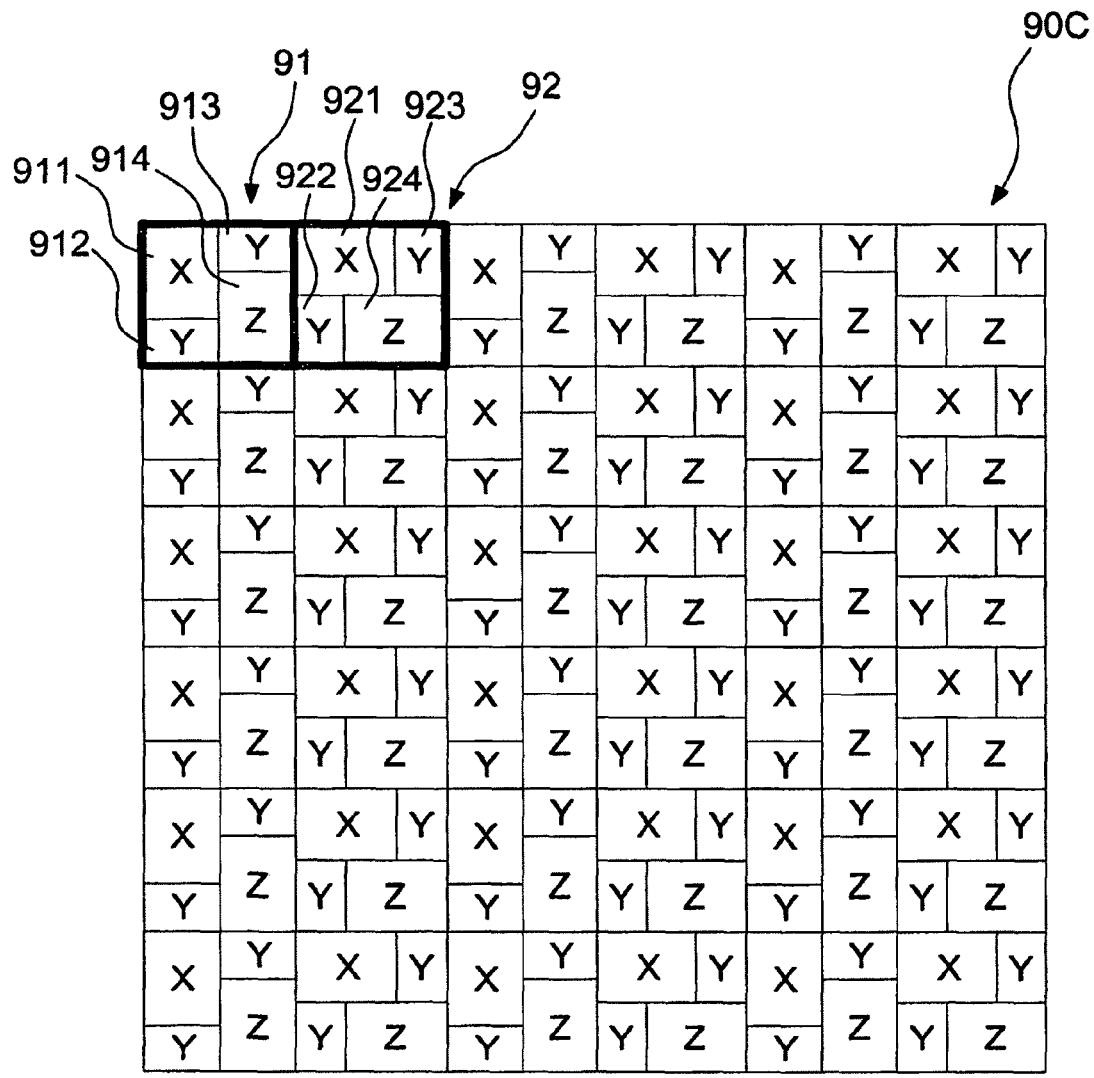

Referring to FIG. 9C, according to a ninth embodiment of the invention, a display 90C comprises a plurality of first pixel groups 91 and a plurality of second pixel groups 92. The first pixel groups 91 and the second pixel groups 92 are quadrate shaped. The first pixel groups 91 and the second pixel groups 92 are arranged alternately in the X-axis direction, as shown in FIG. 9C.

Referring to FIGS. 9A, 9B and 9C, the first color dot (X) may be a red dot, the second color dots (Y) may be green dots, and the third color dot (Z) may be a blue dot. Besides, the first color dot (X) may be a red dot, the second color dots (Y) may be blue dots, and the third color dot (Z) may be a green dot.

Furthermore, the first color dot (X) may be a green dot, the second color dots (Y) may be red dots, and the third color dot (Z) may be a blue dot. Additionally, the first color dot (X) may be a red dot, the second color dots (Y) may be white dots, and the third color dot (Z) may be a green dot.

Referring to FIG. 9C-1, the selected dot (Z) and three neighboring dots form an overlapping full color dynamic pixel group, and there are four overlapping full color dynamic pixel groups shown in FIG. 9C-1. A first overlapping full color dynamic pixel group comprises the selected dot (Z), the left dot (Y), the forward dot (Y) and the left-forward dot (X); a second overlapping full color dynamic pixel group comprises the selected dot (Z), the right dot (Y), the forward dot (Y) and the right-forward dot (X); a third overlapping full color dynamic pixel group comprises the selected dot (Z), the left dot (Y), the backward dot (Y) and the left-backward dot (X); a fourth overlapping full color dynamic pixel group comprises the selected dot (Z), the right dot (Y), the backward dot (Y) and a right-backward dot (X).

Figure 9D:
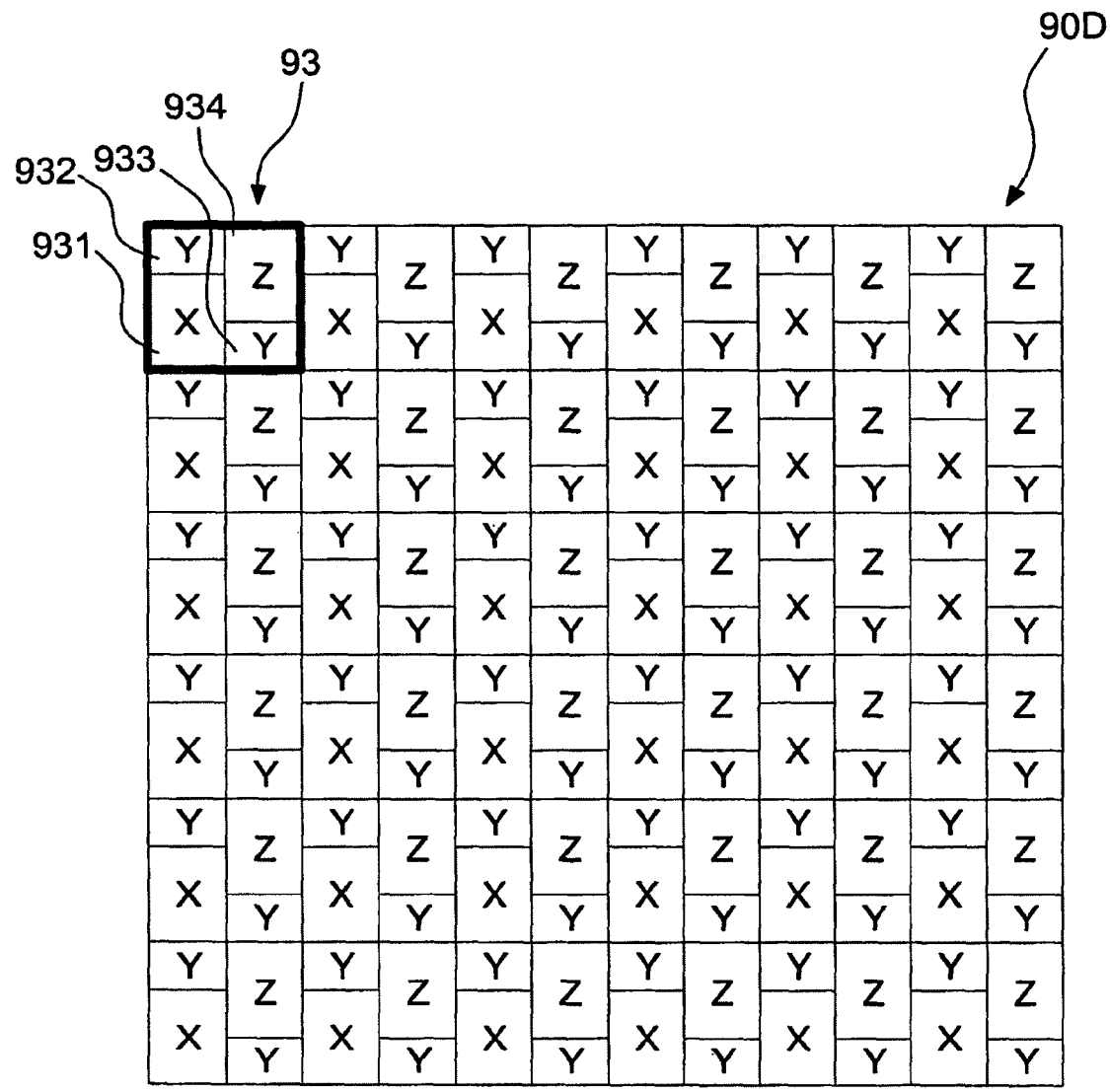

Referring to FIG. 9D, according to a ninth embodiment of the invention, a display 90A comprises a plurality of third pixel groups 93. The third pixel groups 93 are quadrate shaped, and each pixel group 93 comprises four dots having a first color dot 931, two second color dot 932, 933 and a third color dot 934. The first color dot 911 (X) is disposed on a second row-first column position of the third pixel group 93, two second color dots 932 (Y) and 933 (Y) are disposed respectively on a first row-first column and a second row-second column positions of the third pixel group 93, the third color dot 934 (Z) is disposed on a first row-second column position of the first pixel group 93.

The area of the first color dot 931 is the same as that of the third color dot 934, the area of two second color dots 932 and 933 is the same as that of the third color dot 934. That is, the area of the second color dot 932 is the half of that of the first color dot 931. In the other word, the first color dot 931 has a first width (for example: 1.5) and a first height (for example: 2), the second color dot 932 has the first width and a second height (for example: 1), the third color dot 934 has the first width and the first height. Therefore, the second height (for example: 1) is the half of the first height (for example: 2), and the area of the second color dot 932 is the half of that of the first color dot 931.

Referring to FIG. 9D-1, the selected dot (Z) and three neighboring dots form an overlapping full color dynamic pixel group, and there are four overlapping full color dynamic pixel groups shown in FIG. 9D-1. A first overlapping full color dynamic pixel group comprises the selected dot (Z), the left dot (Y), the forward dot (Y) and the left-forward dot (X); a second overlapping full color dynamic pixel group comprises the selected dot (Z), the right dot (Y), the forward dot (Y) and the right-forward dot (X); a third overlapping full color dynamic pixel group comprises the selected dot (Z), the left dot (Y), the backward dot (Y) and the left-backward dot (X); a fourth overlapping full color dynamic pixel group comprises the selected dot (Z), the right dot (Y), the backward dot (Y) and a right-backward dot (X).

Figure 9E:
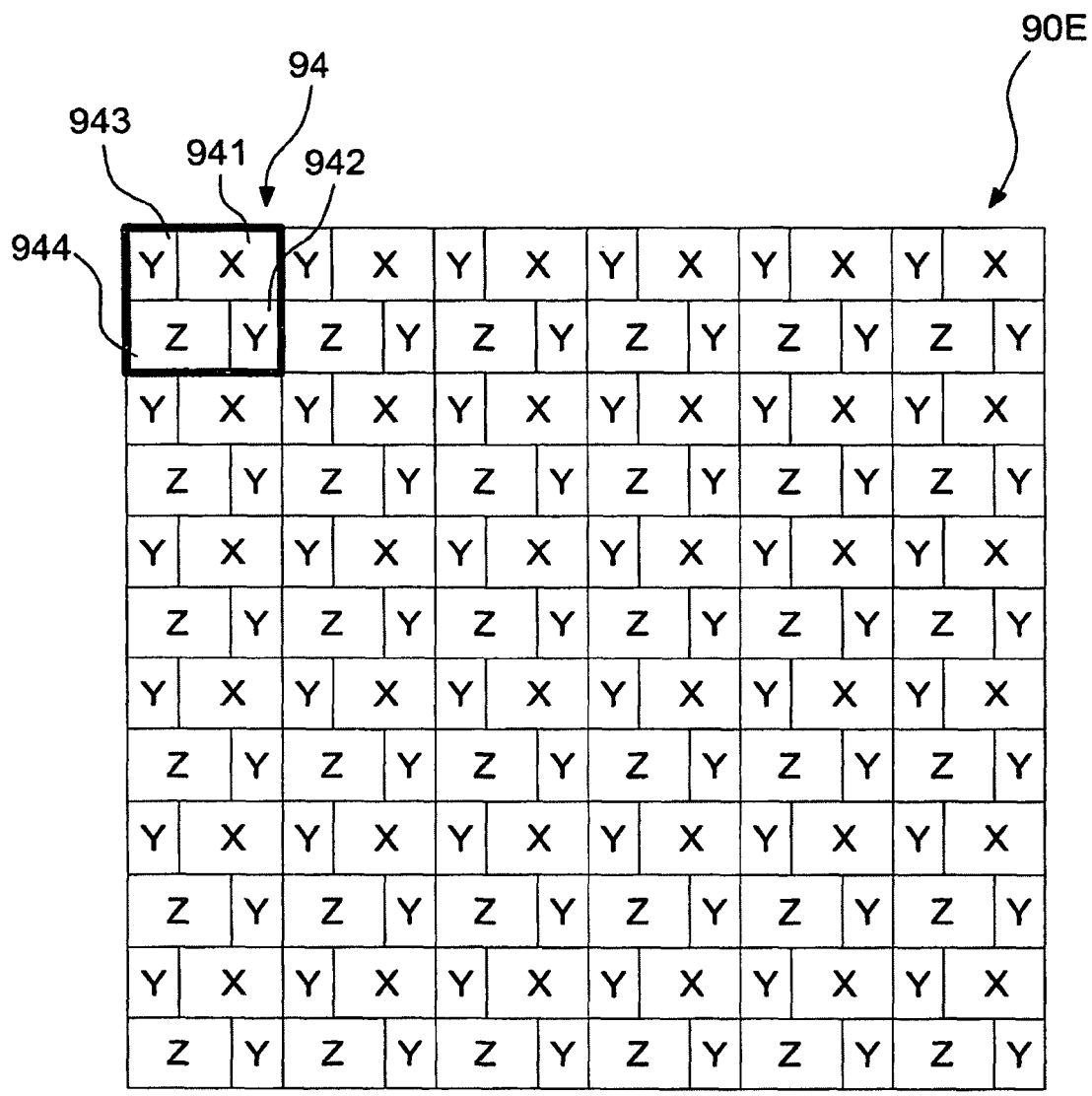

Referring to FIG. 9E, according to a ninth embodiment of the invention, a display 90E comprises a plurality of fourth pixel groups 94. The fourth pixel groups 94 are quadrate shaped, and each pixel group 94 comprises four dots having a first color dot 941, two second color dot 942, 943 and a third color dot 944. The first color dot 941 (X) is disposed on a first row-second column position of the fourth pixel group 94, two second color dots 942 (Y) and 943 (Y) are disposed respectively on a first row-first column and a second row-second column positions of the fourth pixel group 94, the third color dot 944 (Z) is disposed on a second row-first column position of the fourth pixel group 94.

The area of the first color dot 941 is the same as that of the third color dot 944, the area of two second color dots 942 and 943 is the same as that of the third color dot 944. That is, the area of the second color dot 942 is the half of that of the first color dot 941. In the other word, the first color dot 941 has a first width (for example: 2) and a first height (for example: 1.5), the second color dot 942 has the second width (for example: 1) and the first height, the third color dot 944 has the first width and the first height. Therefore, the second width (for example: 1) is the half of the first width (for example: 2), and the area of the second color dot 942 is the half of that of the first color dot 941.

Referring to FIG. 9E-1, the selected dot (X) and three neighboring dots form an overlapping full color dynamic pixel group, and there are four overlapping full color dynamic pixel groups shown in FIG. 9E-1. A first overlapping full color dynamic pixel group comprises the selected dot (X), the left dot (Y), the forward dot (Y) and the left-forward dot (Z); a second overlapping full color dynamic pixel group comprises the selected dot (X), the right dot (Y), the forward dot (Y) and the right-forward dot (Z); a third overlapping full color dynamic pixel group comprises the selected dot (X), the left dot (Y), the backward dot (Y) and the left-backward dot (Z); a fourth overlapping full color dynamic pixel group comprises the selected dot (X), the right dot (Y), the backward dot (Y) and a right-backward dot (Z).

Figure 9F:
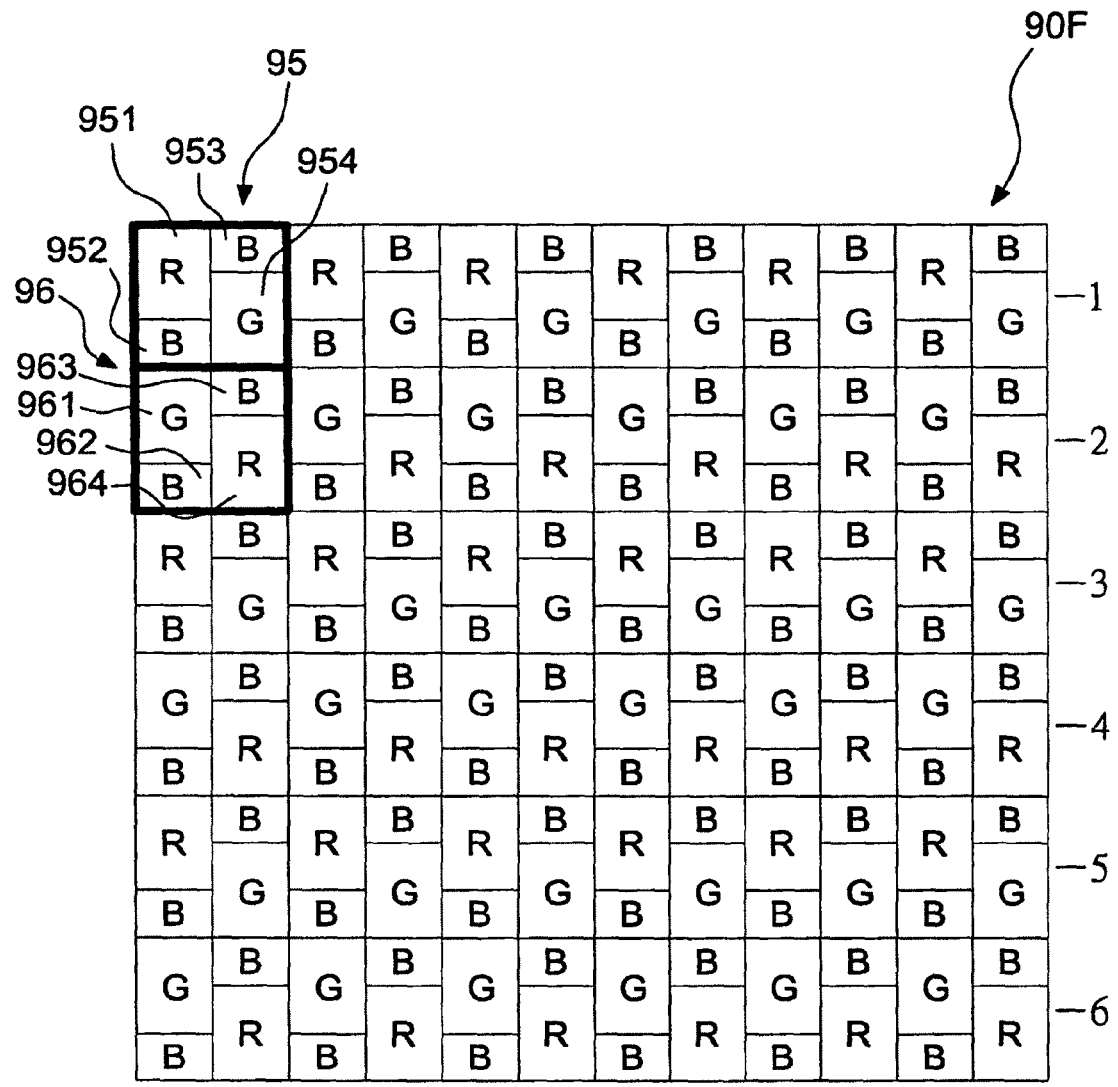

Referring to FIG. 9F, according to the ninth embodiment of the invention, a display 90F comprises a plurality of first pixel groups. The first pixel groups arrange in a matrix manner to form the display 90F, the display 90F comprises a plurality of odd row first pixel groups 95 and a plurality of even row first pixel groups 96. In the odd row first pixel groups 95, for example in the first row (R1), the first color dot 951 is a red dot (R), the second color dots 952 and 953 are blue dots (B), and the third color dot 954 is a green dot (G). In the even row first pixel groups 96, for example in the second row (R2), the first color dot 961 is a green dot (G), the second color dots 962 and 963 are blue dots (B), and the third color dot 964 is a red dot (R).

Referring to FIG. 9F-1, the selected dot (G) and three neighboring dots form an overlapping full color dynamic pixel group, and there are four overlapping full color dynamic pixel groups shown in FIG. 9F-1. A first overlapping full color dynamic pixel group comprises the selected dot (G), the left dot (B), the forward dot (B) and the left-forward dot (R); a second overlapping full color dynamic pixel group comprises the selected dot (G), the right dot (B), the forward dot (B) and the right-forward dot (R); a third overlapping full color dynamic pixel group comprises the selected dot (G), the left dot (B), the backward dot (B) and the left-backward dot (R); a fourth overlapping full color dynamic pixel group comprises the selected dot (G), the right dot (B), the backward dot (B) and a right-backward dot (R).

Figure 9G:
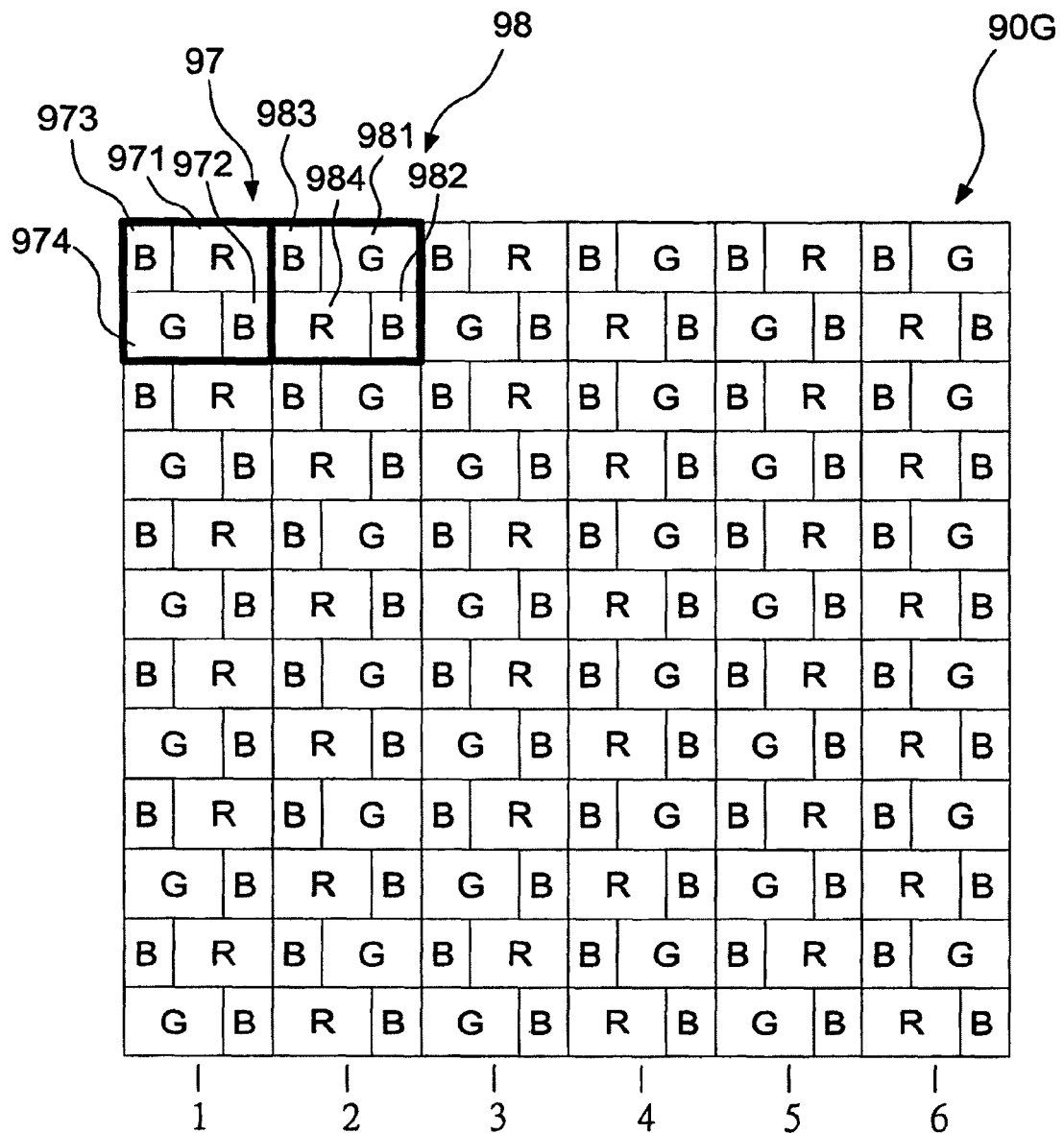

Referring to FIG. 9G, according to the ninth embodiment of the invention, a display 90G comprises a plurality of fourth pixel groups. The fourth pixel groups arrange in a matrix manner to form the display 90G, the display 90G comprises a plurality of odd column fourth pixel groups 97 and a plurality of even column fourth pixel groups 98. In the odd column fourth pixel groups 97, for example in the first column (C1), the first color dot 971 is a red dot (R), the second color dots 972 and 973 are blue dots (B), and the third color dot 974 is a green dot (G). In the even column fourth pixel groups 98, for example in the second column (C2), the first color dot 981 is a green dot (G), the second color dots 982 and 983 are blue dots (B), and the third color dot 984 is a red dot (R).

Referring to FIG. 9G-1, the selected dot (R) and three neighboring dots form an overlapping full color dynamic pixel group, and there are four overlapping full color dynamic pixel groups shown in FIG. 9G-1. A first overlapping full color dynamic pixel group comprises the selected dot (R), the left dot (B), the forward dot (B) and the left-forward dot (G); a second overlapping full color dynamic pixel group comprises the selected dot (R), the right dot (B), the forward dot (B) and the right-forward dot (G); a third overlapping full color dynamic pixel group comprises the selected dot (R), the left dot (B), the backward dot (B) and the left-backward dot (G); a fourth overlapping full color dynamic pixel group comprises the selected dot (R), the right dot (B), the backward dot (B) and a right-backward dot (G).

Figure 9H:
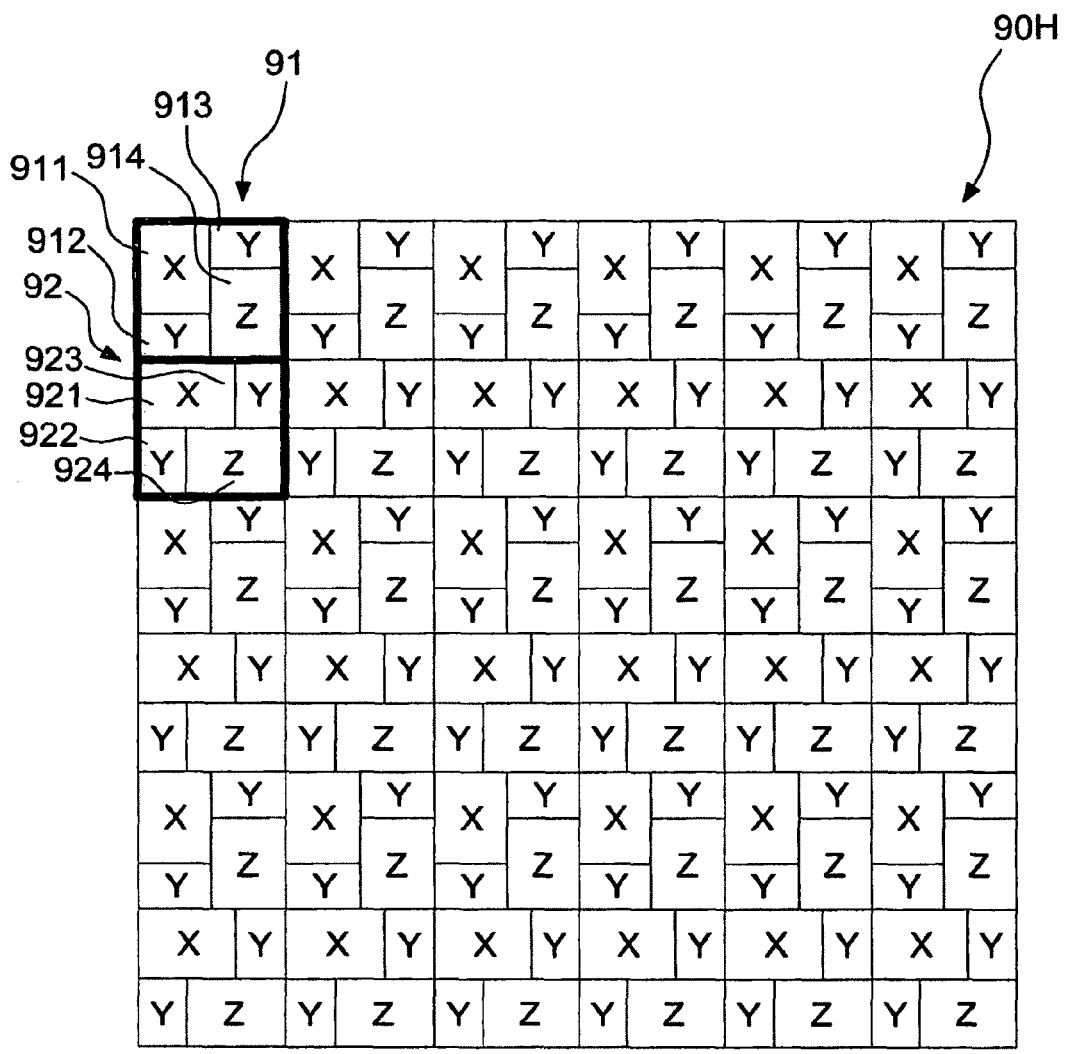

Referring to FIG. 9H, according to a ninth embodiment of the invention, a display 90H comprises a plurality of first pixel groups 91 and a plurality of second pixel groups 92. The first pixel groups 91 and the second pixel groups 92 are quadrate shaped. The first pixel groups 91 and the second pixel groups 92 are arranged alternately in the Y-axis direction, as shown in FIG. 9H.

Referring to FIG. 9H-1, the selected dot (Z) and three neighboring dots form an overlapping full color dynamic pixel group, and there are four overlapping full color dynamic pixel groups shown in FIG. 9H-1. A first overlapping full color dynamic pixel group comprises the selected dot (Z), the left dot (Y), the forward dot (Y) and the left-forward dot (X); a second overlapping full color dynamic pixel group comprises the selected dot (Z), the right dot (Y), the forward dot (Y) and the right-forward dot (X); a third overlapping full color dynamic pixel group comprises the selected dot (Z), the left dot (Y), the backward dot (Y) and the left-backward dot (X); a fourth overlapping full color dynamic pixel group comprises the selected dot (Z), the right dot (Y), the backward dot (Y) and a right-backward dot (X).

Figure 9I:
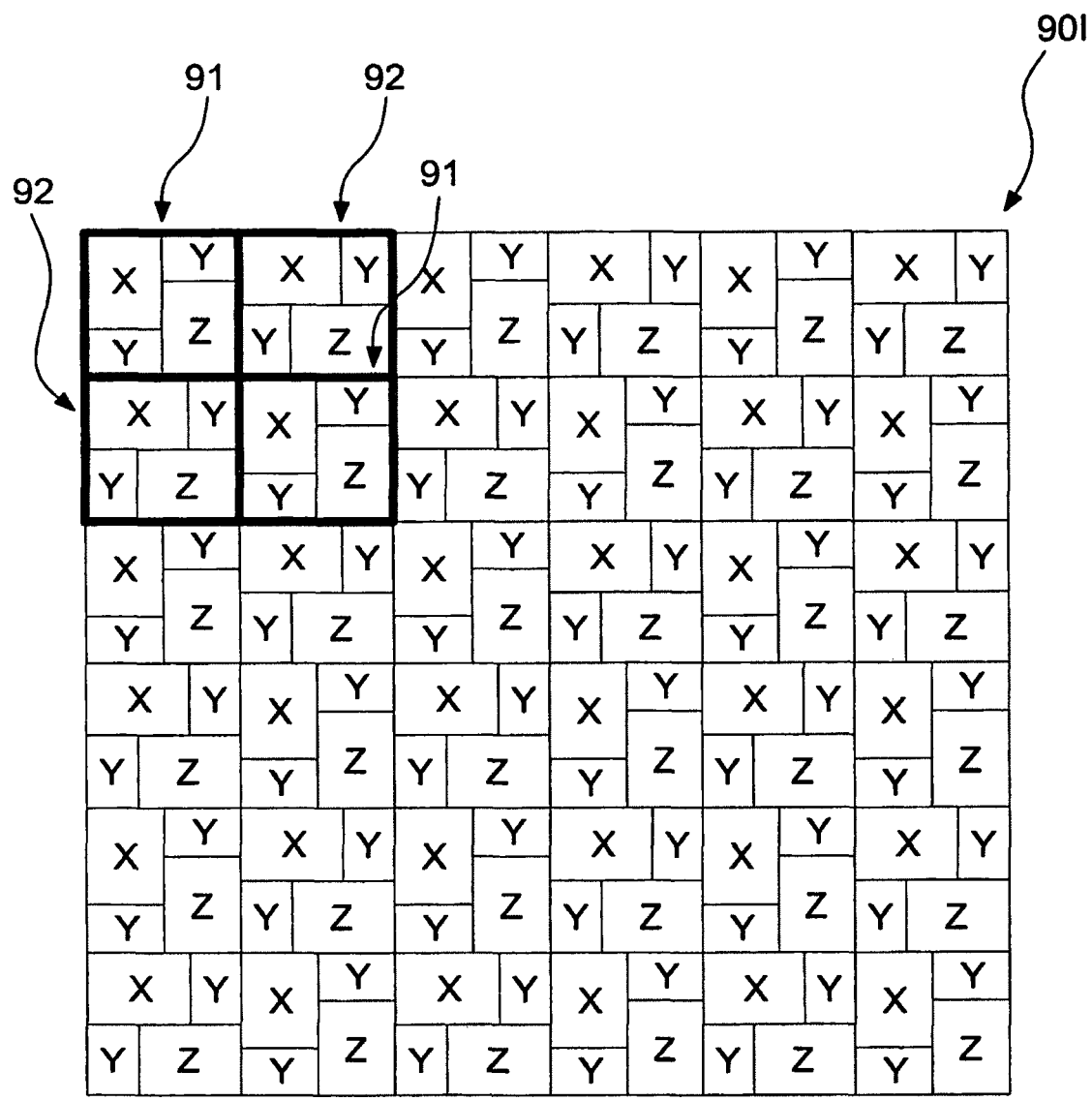

Referring to FIG. 9I, according to a ninth embodiment of the invention, a display 90I comprises a plurality of first pixel groups 91 and a plurality of second pixel groups 92. The first pixel groups 91 and the second pixel groups 92 are quadrate shaped. The first pixel groups 91 and the second pixel groups 92 are arranged alternately in the Y-axis direction, and the first pixel groups 91 and the second pixel groups 92 are arranged alternately in the X-axis direction, as shown in FIG. 9I.

Referring to FIG. 9I-1, the selected dot (Z) and three neighboring dots form an overlapping full color dynamic pixel group, and there are four overlapping full color dynamic pixel groups shown in FIG. 9I-1. A first overlapping full color dynamic pixel group comprises the selected dot (Z), the left dot (Y), the forward dot (Y) and the left-forward dot (X); a second overlapping full color dynamic pixel group comprises the selected dot (Z), the right dot (Y), the forward dot (Y) and the right-forward dot (X); a third overlapping full color dynamic pixel group comprises the selected dot (Z), the left dot (Y), the backward dot (Y) and the left-backward dot (X); a fourth overlapping full color dynamic pixel group comprises the selected dot (Z), the right dot (Y), the backward dot (Y) and a right-backward dot (X).

Figure 9J:
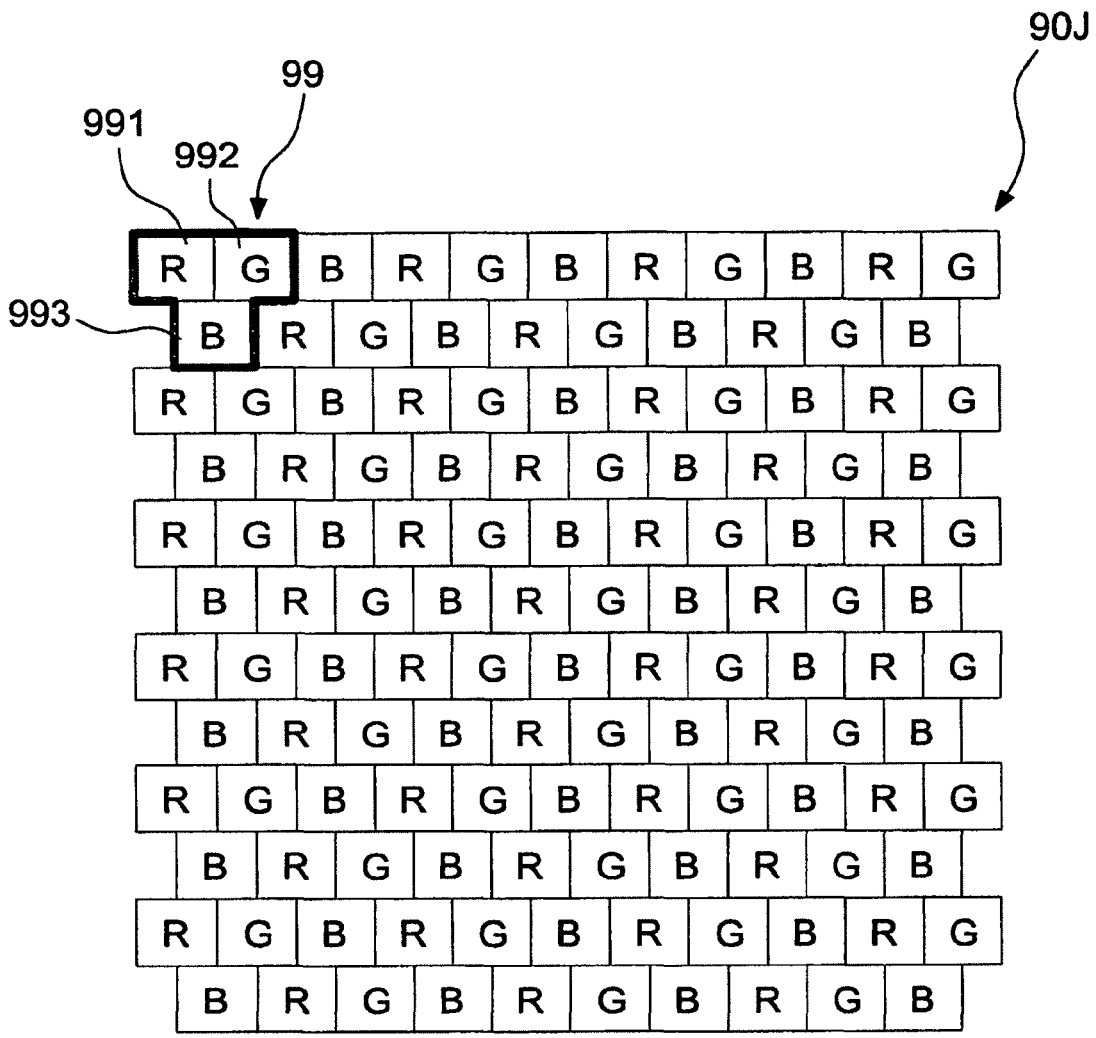
FIG. 9J shows the conventional delta arrangement.
Figures 1, 9A:
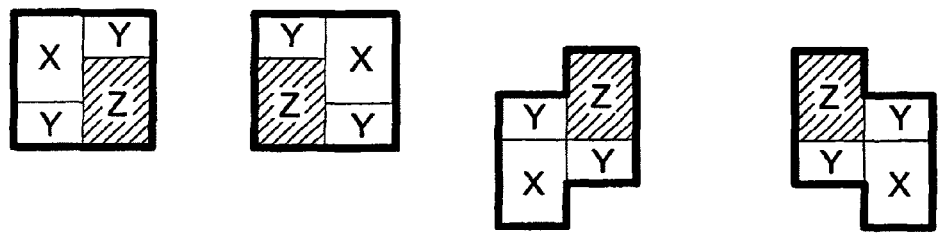
Figures 1, 9B:
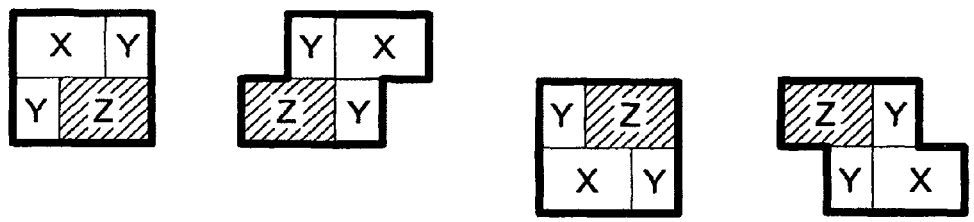
Figures 1, 9C:
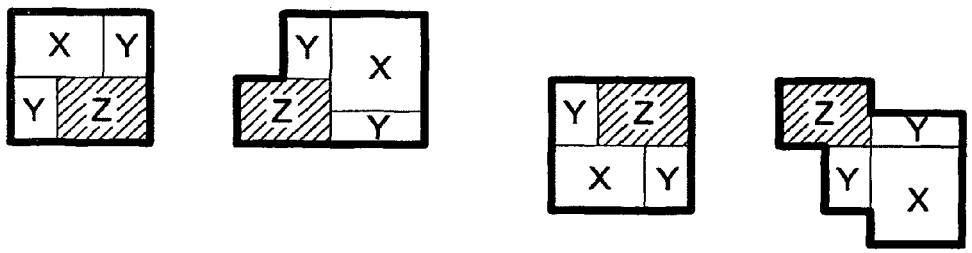
Figures 1, 9D:
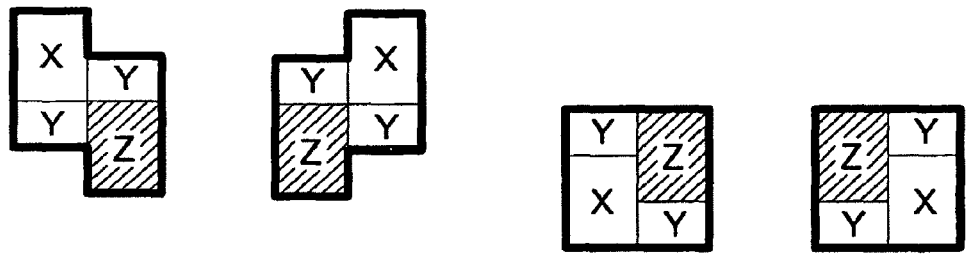
Figures 1, 9E:
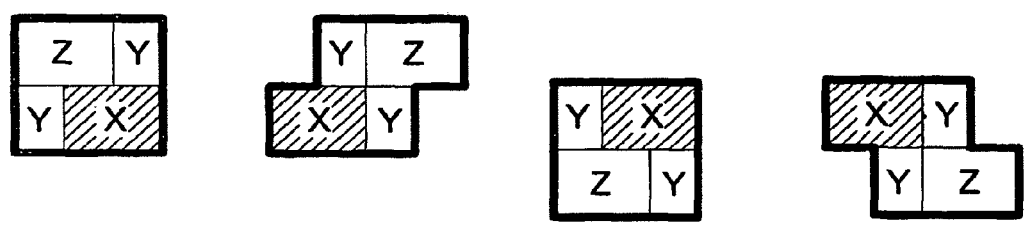
Figures 1, 9F:
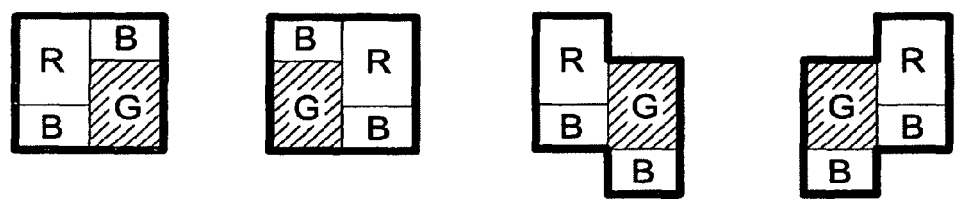
Figures 1, 9G:
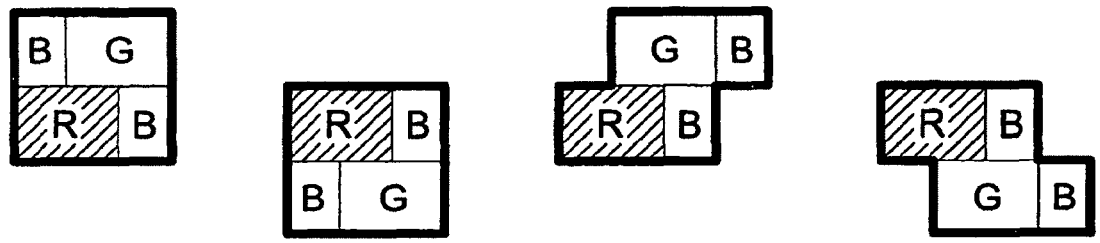
Figures 1, 9H:
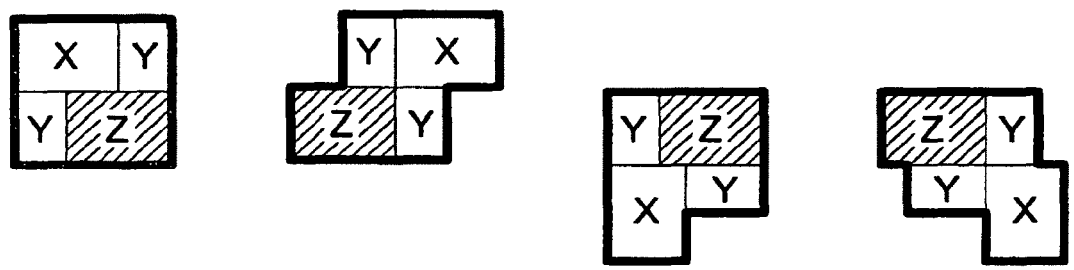
Figures 1, 9I:
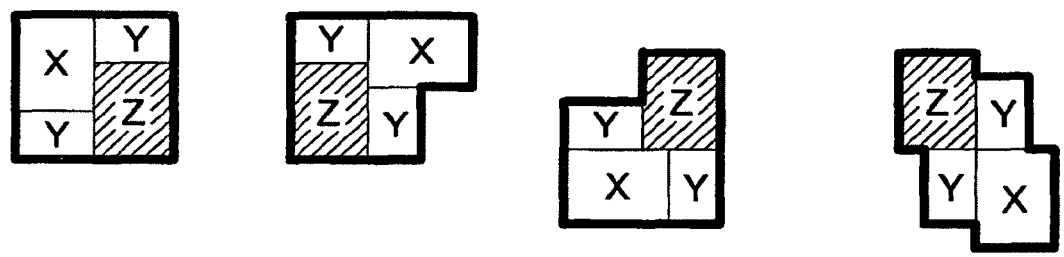
Figures 1, 9J:
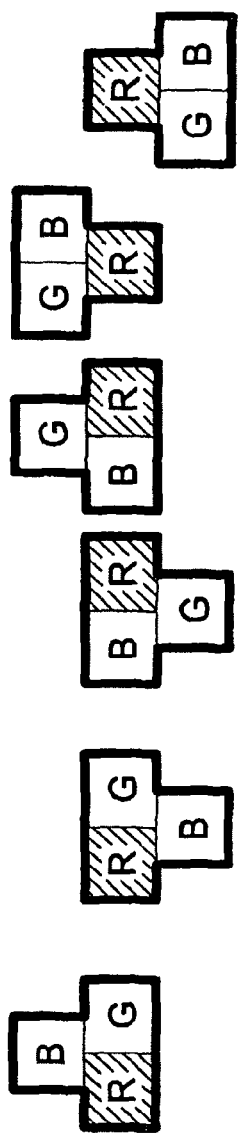
Figures 2, 9J:
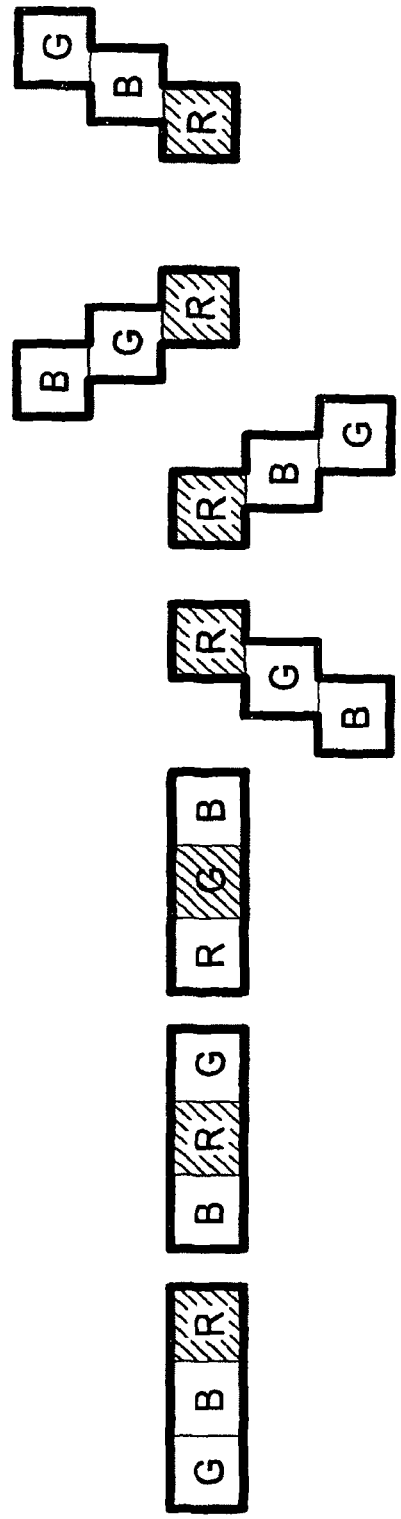

Referring to FIG. 9J, it shows a conventional Delta arrangement. The conventional Delta arrangement 90J comprises a plurality of delta pixel groups 99. Each delta pixel group comprises a first color dot 991, a second color dot 992 and a third color dot 993.

Referring to FIG. 9J-1, the selected dot (R) and two neighboring dots form an overlapping full color dynamic pixel group, and there are six overlapping full color dynamic pixel groups shown in FIG. 9J-1. A first overlapping full color dynamic pixel group comprises the selected dot (R), the right dot (G) and the right-forward dot (B); a second overlapping full color dynamic pixel group comprises the selected dot (R), the right dot (G) and the right-backward dot (B); a third overlapping full color dynamic pixel group comprises the selected dot (R), the left dot (B) and the left-backward dot (G); a fourth overlapping full color dynamic pixel group comprises the selected dot (R), the left dot (B) and the left-forward dot (G); a fifth overlapping full color dynamic pixel group comprises the selected dot (R), the left-forward dot (G) and the right-forward dot (B); and a sixth overlapping full color dynamic pixel group comprises the selected dot (R), the left-backward dot (G) and the right-backward dot (B).

According to FIG. 9J-2, the selected dot (R) and two neighboring dots form an overlapping full color dynamic pixel group, and there are six overlapping full color dynamic pixel groups shown in FIG. 9J-2. A first overlapping full color dynamic pixel group comprises the selected dot (R), the left dot (B) and the next left dot (G); a second overlapping full color dynamic pixel group comprises the selected dot (R), the left dot (B) and the right dot (G); and a third overlapping full color dynamic pixel group comprises the selected dot (R), the right dot (G) and the next right dot (B); a fourth overlapping full color dynamic pixel group comprises the selected dot (R), the left-backward dot (G) and the next left-backward dot (B); a fifth overlapping full color dynamic pixel group comprises the selected dot (R), the right-backward dot (B) and the next right-backward dot (G); a sixth overlapping full color dynamic pixel group comprises the selected dot (R), the left-forward dot (G) and the next left-forward dot (B); and a seventh overlapping full color dynamic pixel group comprises the selected dot (R), the right-forward dot (B) and the next right-forward dot (G).

Figure 10:
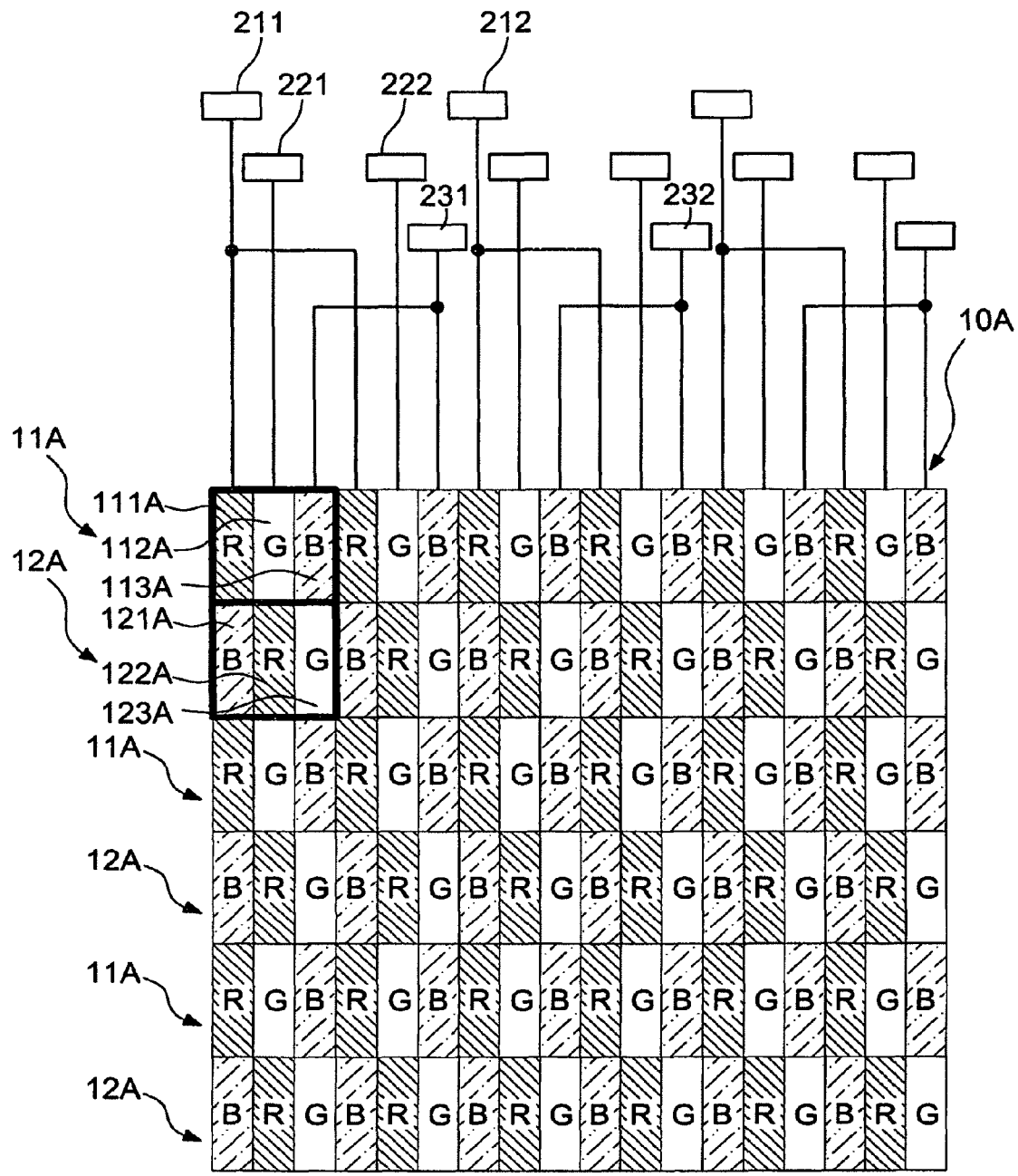
FIG. 10 shows an arrangement and drivers, according to the invention.
Figure 14:
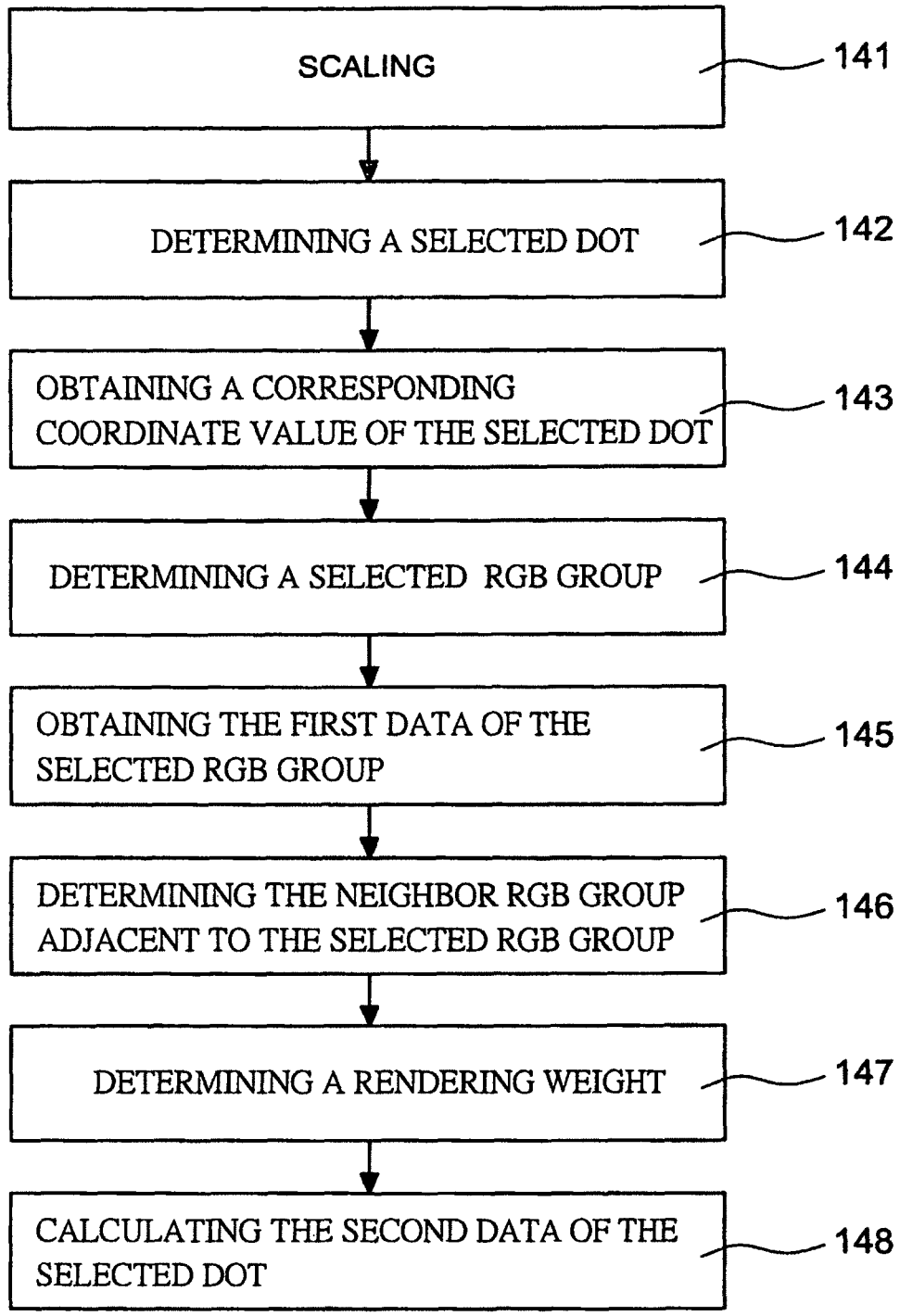
FIG. 14 shows a flow chart, according to the method of the invention.

Referring to FIG. 10, the display 10A further comprises a plurality of source drivers for providing data to the dots of the first pixel groups. The source drivers comprise a plurality of first source driver groups 211, 212, a plurality of second source driver groups 221, 222 and a plurality of third source driver groups 231 and 232. Each the first source driver groups provides data to two columns having red dots and blue dots, and each the second source driver groups provides data to one column having red dots and green dots. For example, the first source driver group 211 provides data to the first column and the fourth column having red dots and blue dots, and the second source driver group 221 provides data to the second column having red dots and green dots. And, each the first source driver groups provides the same data to two columns having red dots and blue dots. Therefore, the display of the invention can save drivers, and the cost can decrease.

Besides, each the third source driver groups provides the data to two columns having blue dots and green dots. For example, the third source driver group 231 provides the data to the third column and the sixth column having blue dots and green dots. Each the third source driver groups can provides the same data to two columns having blue dots and green dots.

Figure 11:
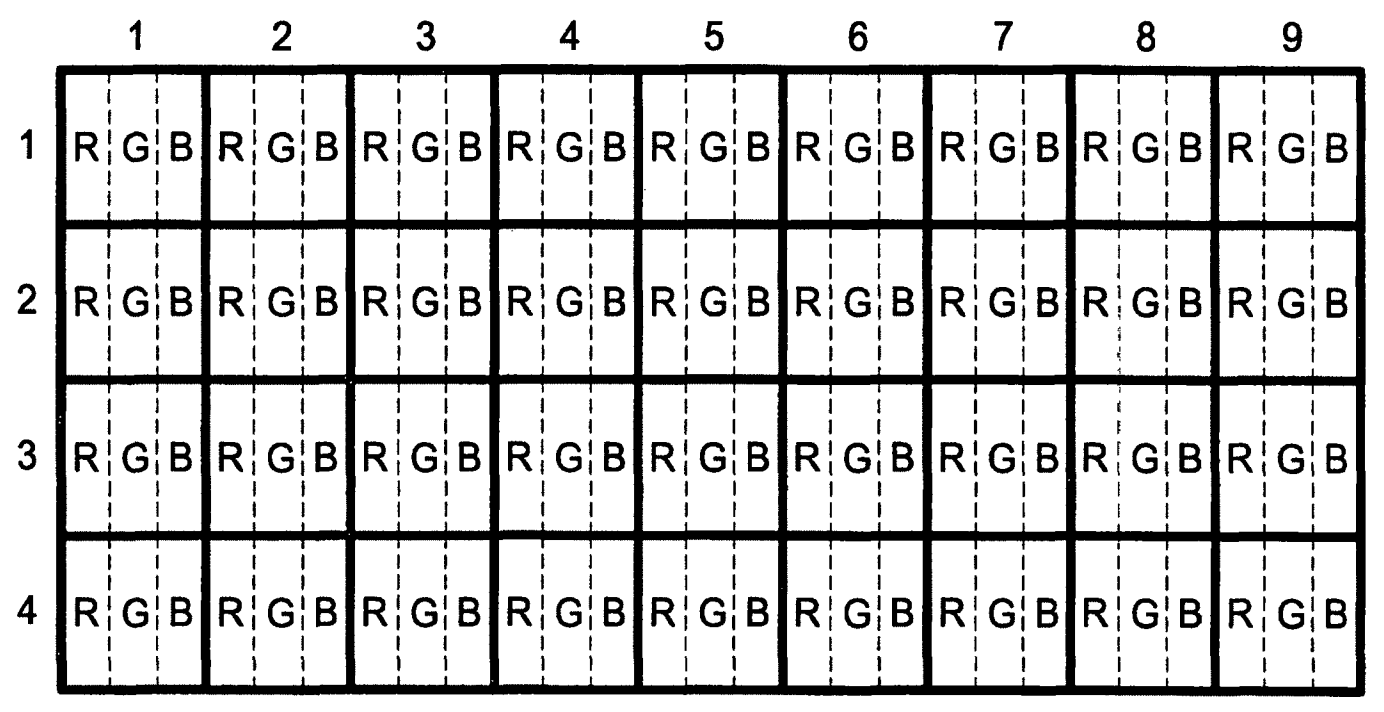

FIG. 11 shows a conventional arrangement (first arrangement) having a plurality of RGB groups. Each RGB group comprises three color dots and three first data representing three color dots. Each RGB group has a corresponding coordinate value, that is, a RGB group is disposed on a position of a coordinate value. For example, on a position of a coordinate value (5, 3) there is a RGB group having three color dots and three first data representing three color dots.

FIG. 12 shows a second arrangement according to the first embodiment of the invention. The second arrangement comprises a plurality of first pixel groups and a plurality of second pixel groups as described in FIG. 1B. The first pixel group comprises a red dot (R), a green dot (G) and a blue dot (B) in sequence arranged in a matrix. The second pixel group comprises a blue dot (B), a red dot (R) and a green dot (G) in sequence arranged in a matrix. Each color dot of the first pixel groups and the second pixel groups has a corresponding coordinate value, that is, a color dot is disposed on a position of a coordinate value. For example, on a position of a coordinate value (5, 3) there is a green dot (G). Each color dot has a second data representing the color dot.

Figures 13A, 13B:
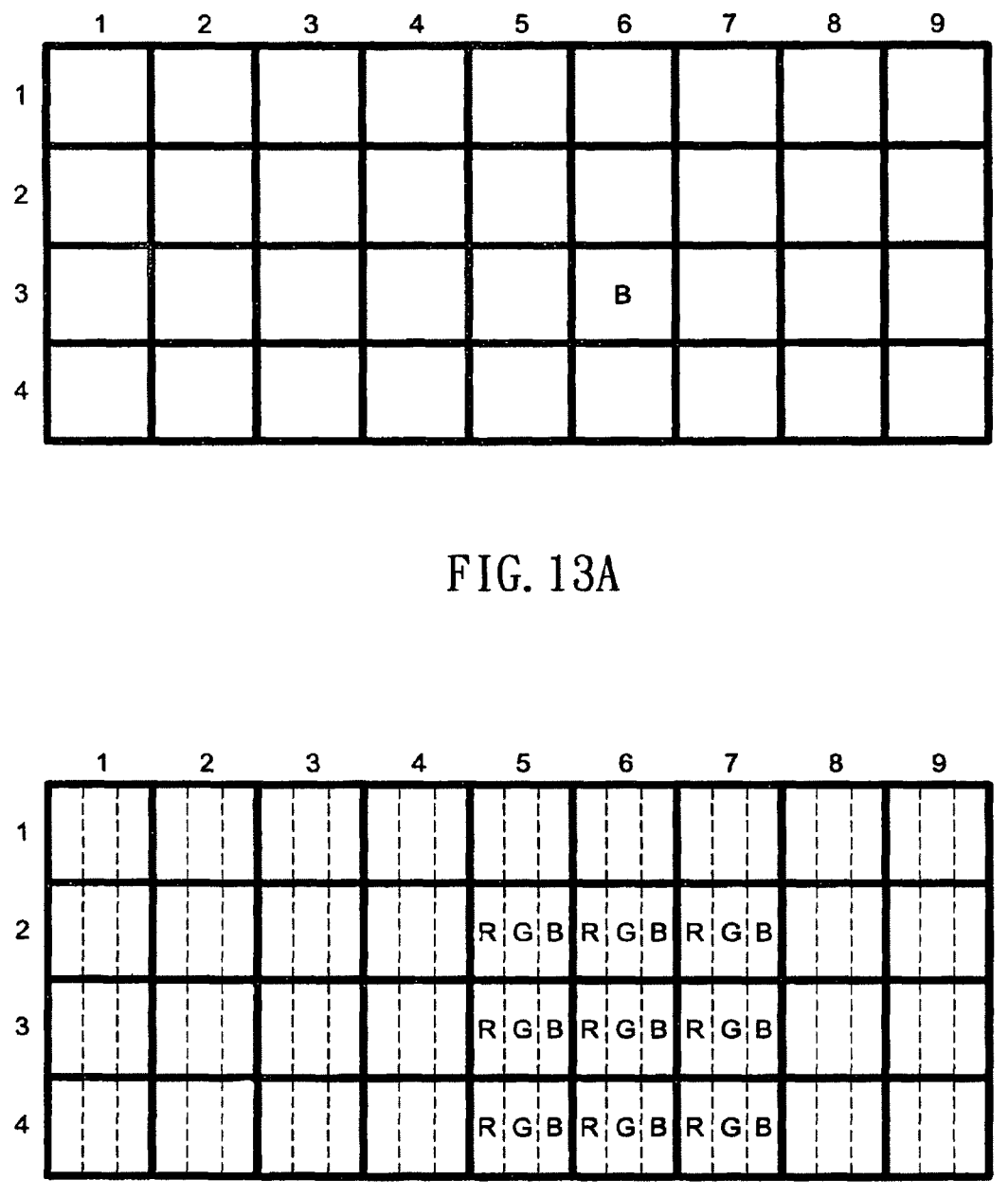

According to the invention, a method is provided for converting the first data of the first arrangement to the second data of the second arrangement. Firstly, a selected dot is determined. As shown in FIG. 13A, a blue dot (B) is selected from the second arrangement. Then, a corresponding coordinate value of the selected dot can be obtained, for example, the selected dot (B) is disposed on a position of a corresponding coordinate value (6, 3).

According to the corresponding coordinate value (6, 3), a selected RGB group can be determined from the first arrangement. As shown in FIG. 13B, a selected RGB group disposed on the corresponding coordinate value (6, 3) is determined from the first arrangement. The known first data of the selected RGB group can be obtained to calculate the second data of the selected dot (B) disposed on the corresponding coordinate value (6, 3). Because the selected dot is the blue dot (B), the second data of the selected dot (B) is equal to the first data of the blue color within the selected RGB group disposed on the corresponding coordinate value (6, 3).

Referring to FIGS. 13A and 13B, the method of the invention further comprises a step of determining a plurality of surrounding RGB groups near to the selected RGB group. The second data are calculated according to the first data of the selected RGB group and the surrounding RGB groups. Then, a rendering weight between 0% to 100% is determined, and the first data of the selected RGB group are multiplied by the rendering weight, and the first data of the surrounding RGB groups are multiplied respectively by a plurality of coefficients calculated from (100%−the rendering weight) so as to calculate the second data. The sum of the coefficients may be equal to (100%−the rendering weight). The coefficients may be the same.

Referring to FIGS. 13A and 13B, according to the second method of the invention, a left RGB group at the left of and adjacent to the selected RGB group along a X-axis direction is determined, and a right RGB group at the right of and adjacent to the selected RGB group along the X-axis direction is determined. Therefore, the left RGB group is disposed on the corresponding coordinate value (5, 3), and the right RGB group is disposed on the corresponding coordinate value (7, 3). The second data are calculated according to the first data of the selected RGB group on (6, 3), the left RGB group on (5, 3) and the right RGB group on (7, 3).

Furthermore, a rendering weight (W) between 0% to 100% is determined, wherein the first data of the selected RGB group are multiplied by the rendering weight (W), and the first data of the left RGB group and the right RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3)). The first coefficient and the second coefficient may be half of (100%—the rendering weight).

According to the third method of the invention, a forward RGB group at the front of and adjacent to the selected RGB group along a Y-axis direction is determined, and a backward RGB group at the back of and adjacent to the selected RGB group along the Y-axis direction is determined. Therefore, the forward RGB group is disposed on the corresponding coordinate value (6, 2), and the backward RGB group is disposed on the corresponding coordinate value (6, 4). The second data are calculated according to the first data of the selected RGB group, the forward RGB group and the backward RGB group.

Besides, a rendering weight between 0% to 100% is determined, wherein the first data of the selected RGB group are multiplied by the rendering weight, and the first data of the forward RGB group and the backward RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of forward RGB group on (6, 2))+(the second coefficient×the first data of the blue dot of the backward RGB group on (6, 4)). The first coefficient and the second coefficient may be half of (100%−the rendering weight).

According to the fourth method of the invention, a forward RGB group at the front of and adjacent to the selected RGB group along the Y-axis direction is determined, and a left RGB group at the left of and adjacent to the selected RGB group along the X-axis direction is determined. Therefore, the forward RGB group is disposed on the corresponding coordinate value (6, 2), and the left RGB group is disposed on the corresponding coordinate value (5, 3). The second data are calculated according to the first data of the selected RGB group, the forward RGB group and the left RGB group.

Furthermore, a rendering weight between 0% to 100% is determined, wherein the first data of the selected RGB group are multiplied by the rendering weight, and the first data of the forward RGB group and the left RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the forward RGB group on (6, 2))+(the second coefficient×the first data of the blue dot of the left RGB group on (5, 3)). The first coefficient and the second coefficient may be half of (100% —the rendering weight).

According to the fifth method of the invention, a forward RGB group at the front of and adjacent to the selected RGB group along the Y-axis direction is determined, and a right RGB group at the right of and adjacent to the selected RGB group along the X-axis direction is determined. Therefore, the forward RGB group is disposed on the corresponding coordinate value (6, 2), and the right RGB group is disposed on the corresponding coordinate value (7, 3). The second data are calculated according to the first data of the selected RGB group, the forward RGB group and the right RGB group.

Besides, a rendering weight between 0% to 100% is determined, wherein the first data of the selected RGB group are multiplied by the rendering weight, and the first data of the forward RGB group and the right RGB group are multiplied respectively by a first coefficient and a second coefficient calculated from (100% —the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the forward RGB group on (6, 2))+(the second coefficient×the first data of the blue dot of the right RGB group on (7, 3)). The first coefficient and the second coefficient may be half of (100%−the rendering weight).

According to the sixth method of the invention, a backward RGB group at the back of and adjacent to the selected RGB group along the Y-axis direction is determined, and a left RGB group at the left of and adjacent to the selected RGB group along a X-axis direction is determined. Therefore, the backward RGB group is disposed on the corresponding coordinate value (6, 4), and the left RGB group is disposed on the corresponding coordinate value (5, 3). The second data are calculated according to the first data of the selected RGB group, the backward RGB group and the left RGB group.

Furthermore, a rendering weight between 0% to 100% is determined, wherein the first data of the selected RGB group are multiplied by the rendering weight, and the first data of the backward RGB group and the left RGB group are multiplied respectively by a first coefficient and a second coefficient calculated from (100% —the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the backward RGB group on (6, 4))+(the second coefficient×the first data of the blue dot of the left RGB group on (5, 3)). The first coefficient and the second coefficient may be half of (100%−the rendering weight).

According to the seventh method of the invention, a backward RGB group at the back of and adjacent to the selected RGB group along the Y-axis direction is determined, and a right RGB group at the right of and adjacent to the selected RGB group along the X-axis direction is determined. Therefore, the backward RGB group is disposed on the corresponding coordinate value (6, 4), and the right RGB group is disposed on the corresponding coordinate value (7, 3). The second data are calculated according to the first data of the selected RGB group, the backward RGB group and the right RGB group.

Furthermore, a rendering weight between 0% to 100% is determined, wherein the first data of the selected RGB group are multiplied by the rendering weight, and the first data of the backward RGB group and the right RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the backward RGB group on (6, 4))+(the second coefficient×the first data of the blue dot of the right RGB group on (7, 3)). The first coefficient and the second coefficient may be half of (100%−the rendering weight).

According to the eighth method of the invention, a left-forward RGB group adjacent to both the left RGB group and the forward RGB group is determined, and a left-backward RGB group adjacent to both the left RGB group and the backward RGB group is determined. Therefore, the left-forward RGB group is disposed on the corresponding coordinate value (5, 2), and the left-backward RGB group is disposed on the corresponding coordinate value (5, 4). The second data are calculated according to the first data of the selected RGB group, the left-forward RGB group and the left-backward RGB group.

Furthermore, a rendering weight between 0% to 100% is determined, wherein the first data of the selected RGB group are multiplied by the rendering weight, and the first data of the left-forward RGB group and the left-backward RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left-forward RGB group on (5, 2))+(the second coefficient×the first data of the blue dot of the left-backward RGB group on (5, 4)). The first coefficient and the second coefficient may be half of (100%−the rendering weight).

According to the ninth method of the invention, a left-forward RGB group adjacent to both the left RGB group and the forward RGB group is determined, and a right-forward RGB group adjacent to both the right RGB group and the forward RGB group is determined. Therefore, the left-forward RGB group is disposed on the corresponding coordinate value (5, 2), and the right-forward RGB group is disposed on the corresponding coordinate value (7, 2). The second data are calculated according to the first data of the selected RGB group, the left-forward RGB group and the right-forward RGB group.

Besides, a rendering weight between 0% to 100% is determined, wherein the first data of the selected RGB group are multiplied by the rendering weight, and the first data of the left-forward RGB group and the right-forward RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left-forward RGB group on (5, 2))+(the second coefficient×the first data of the blue dot of the right-forward RGB group on (7, 2)). The first coefficient and the second coefficient may be half of (100%−the rendering weight).

According to the tenth method of the invention, a right-forward RGB group adjacent to both the right RGB group and the forward RGB group is determined, and a right-backward RGB group adjacent to both the right RGB group and the backward RGB group is determined. Therefore, the right-forward RGB group is disposed on the corresponding coordinate value (7, 2), and the right-backward RGB group is disposed on the corresponding coordinate value (7, 4). The second data are calculated according to the first data of the selected RGB group, the right-forward RGB group and the right-backward RGB group.

Besides, a rendering weight between 0% to 100% is determined, wherein the first data of the selected RGB group are multiplied by the rendering weight, and the first data of the right-forward RGB group and the right-backward RGB group are multiplied respectively by a first coefficient and a second coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the right-forward RGB group on (7, 2))+(the second coefficient×the first data of the blue dot of the right-backward RGB group on (7, 4)). The first coefficient and the second coefficient may be half of (100%−the rendering weight).

According to the eleventh method of the invention, a left-backward RGB group adjacent to both the left RGB group and the backward RGB group is determined, and a right-backward RGB group adjacent to both the right RGB group and the backward RGB group is determined. Therefore, the left-backward RGB group is disposed on the corresponding coordinate value (5, 4), and the right-backward RGB group is disposed on the corresponding coordinate value (7, 4). The second data are calculated according to the first data of the selected RGB group, the left-backward RGB group and the right-backward RGB group.

Furthermore, a rendering weight between 0% to 100% is determined, wherein the first data of the selected RGB group are multiplied by the rendering weight, and the first data of the left-backward RGB group and the right-backward RGB group are multiplied respectively by a first coefficient and a second coefficient calculated from (100%—the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left-backward RGB group on (5, 4))+(the second coefficient×the first data of the blue dot of the right-backward RGB group on (7, 4)). The first coefficient and the second coefficient may be half of (100%−the rendering weight).

According to the twelfth method of the invention, a left RGB group at the left of and adjacent to the selected RGB group along the X-axis direction is determined, a right RGB group at the right of and adjacent to the selected RGB group along the X-axis direction is determined, and a forward RGB group at the front of and adjacent to the selected RGB group along the Y-axis direction is determined. Therefore, the left RGB group is disposed on the corresponding coordinate value (5, 3), the right RGB group is disposed on the corresponding coordinate value (7, 3), and the forward RGB group is disposed on the corresponding coordinate value (6, 2). The second data are calculated according to the first data of the selected RGB group, the left RGB group, the right RGB group and the forward RGB group.

Besides, a rendering weight between 0% to 100% is determined, wherein the first data of the selected RGB group are multiplied by the rendering weight, and the first data of the left RGB group, the right RGB group and the forward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3))+(the third coefficient×the first data of the blue dot of the forward RGB group on (6, 2)). The first coefficient, the second coefficient and the third coefficient may be one third of (100%−the rendering weight).

According to the thirteenth method of the invention, a left RGB group at the left of and adjacent to the selected RGB group along a X-axis direction is determined, a right RGB group at the right of and adjacent to the selected RGB group along the X-axis direction is determined, and a backward RGB group at the back of and adjacent to the selected RGB group along a Y-axis direction is determined. Therefore, the left RGB group is disposed on the corresponding coordinate value (5, 3), the right RGB group is disposed on the corresponding coordinate value (7, 3), and the backward RGB group is disposed on the corresponding coordinate value (6, 4). The second data are calculated according to the first data of the selected RGB group, the left RGB group, the right RGB group and the backward RGB group.

Furthermore, a rendering weight between 0% to 100% is determined, wherein the first data of the selected RGB group are multiplied by the rendering weight, and the first data of the left RGB group, the right RGB group and the backward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3))+(the third coefficient×the first data of the blue dot of the backward RGB group on (6, 4)). The first coefficient, the second coefficient and the third coefficient may be one third of (100%−the rendering weight).

According to the fourteenth method of the invention, a left RGB group at the left of and adjacent to the selected RGB group along a X-axis direction is determined, a backward RGB group at the back of and adjacent to the selected RGB group along a Y-axis direction is determined, and a forward RGB group at the front of and adjacent to the selected RGB group along a Y-axis direction is determined. Therefore, the left RGB group is disposed on the corresponding coordinate value (5, 3), the backward RGB group is disposed on the corresponding coordinate value (6, 4), and the forward RGB group is disposed on the corresponding coordinate value (6, 2). The second data are calculated according to the first data of the selected RGB group, the left RGB group, the backward RGB group and the forward RGB group.

Besides, a rendering weight between 0% to 100% is determined, wherein the first data of the selected RGB group are multiplied by the rendering weight, and the first data of the left RGB group, the backward RGB group and the forward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the backward RGB group on (6, 4))+(the third coefficient×the first data of the blue dot of the forward RGB group on (6, 2)). The first coefficient, the second coefficient and the third coefficient may be one third of (100%−the rendering weight).

According to the fifteenth method of the invention, a right RGB group at the right of and adjacent to the selected RGB group along the X-axis direction is determined, a backward RGB group at the back of and adjacent to the selected RGB group along a Y-axis direction is determined, and a forward RGB group at the front of and adjacent to the selected RGB group along a Y-axis direction is determined. Therefore, the right RGB group is disposed on the corresponding coordinate value (7, 3), the backward RGB group is disposed on the corresponding coordinate value (6, 4), and the forward RGB group is disposed on the corresponding coordinate value (6, 2). The second data are calculated according to the first data of the selected RGB group, the right RGB group, the backward RGB group and the forward RGB group.

Furthermore, a rendering weight between 0% to 100% is determined, wherein the first data of the selected RGB group are multiplied by the rendering weight, and the first data of the right RGB group, the backward RGB group and the forward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the right RGB group on (7, 3))+(the second coefficient×the first data of the blue dot of the backward RGB group on (6, 4))+(the third coefficient×the first data of the blue dot of the forward RGB group on (6, 2)). The first coefficient, the second coefficient and the third coefficient may be one third of (100%−the rendering weight).

According to the sixteenth method of the invention, a left RGB group at the left of and adjacent to the selected RGB group along a X-axis direction is determined, a forward RGB group at the back of and adjacent to the selected RGB group along a Y-axis direction is determined, and a left-forward RGB group adjacent to both the left RGB group and the forward RGB group is determined. Therefore, the left RGB group is disposed on the corresponding coordinate value (5, 3), the forward RGB group is disposed on the corresponding coordinate value (6, 2), and the left-forward RGB group is disposed on the corresponding coordinate value (5, 2). The second data are calculated according to the first data of the selected RGB group, the left RGB group, the forward RGB group and the left-forward RGB group.

Besides, a rendering weight between 0% to 100% is determined, wherein the first data of the selected RGB group are multiplied by the rendering weight, and the first data of the left RGB group, the forward RGB group and the left-forward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the forward RGB group on (6, 2))+(the third coefficient×the first data of the blue dot of the left-forward RGB group on (5, 2)). The first coefficient, the second coefficient and the third coefficient may be one third of (100%−the rendering weight). For example, the rendering weight (W) may be $5/8$, the first coefficient may be $1/8$, the second coefficient may be $1/8$ and the third coefficient may be $1/8$. Additionally, the rendering weight (W) may be $7/16$, the first coefficient may be $3/16$, the second coefficient may be $3/16$ and the third coefficient may be $3/16$.

According to the seventeenth method of the invention, a right RGB group at the right of and adjacent to the selected RGB group along a X-axis direction is determined, a backward RGB group at the back of and adjacent to the selected RGB group along a Y-axis direction is determined, and a right-backward RGB group adjacent to both the right RGB group and the backward RGB group is determined. Therefore, the right RGB group is disposed on the corresponding coordinate value (7, 3), the backward RGB group is disposed on the corresponding coordinate value (6, 4), and the right-backward RGB group is disposed on the corresponding coordinate value (7, 4). The second data are calculated according to the first data of the selected RGB group, the right RGB group, the backward RGB group and the right-backward RGB group.

Furthermore, a rendering weight between 0% to 100% is determined, wherein the first data of the selected RGB group are multiplied by the rendering weight, and the first data of the right RGB group, the backward RGB group and the right-backward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the right RGB group on (7, 3))+(the second coefficient×the first data of the blue dot of the backward RGB group on (6, 4))+(the third coefficient×the first data of the blue dot of the right-backward RGB group on (7, 4)). The first coefficient, the second coefficient and the third coefficient may be one third of (100%−the rendering weight). For example, the rendering weight (W) may be $5/8$, the first coefficient may be $1/8$, the second coefficient may be $1/8$ and the third coefficient may be $1/8$. Additionally, the rendering weight (W) may be $7/16$, the first coefficient may be $3/16$, the second coefficient may be $3/16$ and the third coefficient may be $3/16$.

According to the eighteenth method of the invention, a right RGB group at the right of and adjacent to the selected RGB group along a X-axis direction is determined, a forward RGB group at the back of and adjacent to the selected RGB group along a Y-axis direction is determined, and a right-forward RGB group adjacent to both the right RGB group and the forward RGB group is determined. Therefore, the right RGB group is disposed on the corresponding coordinate value (7, 3), the forward RGB group is disposed on the corresponding coordinate value (6, 2), and the right-forward RGB group is disposed on the corresponding coordinate value (7, 2). The second data are calculated according to the first data of the selected RGB group, the right RGB group, the forward RGB group and the right-forward RGB group.

Besides, a rendering weight between 0% to 100% is determined, wherein the first data of the selected RGB group are multiplied by the rendering weight, and the first data of the right RGB group, the forward RGB group and the right-forward RGB group are multiplied respectively by a first coefficient, a second coefficient and a third coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the right RGB group on (7, 3))+(the second coefficient×the first data of the blue dot of the forward RGB group on (6, 2))+(the third coefficient×the first data of the blue dot of the right-forward RGB group on (7, 2)). The first coefficient, the second coefficient and the third coefficient may be one third of (100%−the rendering weight). For example, the rendering weight (W) may be $5/8$, the first coefficient may be $1/8$, the second coefficient may be $1/8$ and the third coefficient may be $1/8$. Additionally, the rendering weight (W) may be $7/16$, the first coefficient may be $3/16$, the second coefficient may be $3/16$ and the third coefficient may be $3/16$.

According to the nineteenth method of the invention, a left RGB group at the left of and adjacent to the selected RGB group along a X-axis direction is determined, a backward RGB group at the back of and adjacent to the selected RGB group along a Y-axis direction is determined, and a left-backward RGB group adjacent to both the left RGB group and the backward RGB group is determined. Therefore, the left RGB group is disposed on the corresponding coordinate value (5, 3), the backward RGB group is disposed on the corresponding coordinate value (6, 4), and the left-backward RGB group is disposed on the corresponding coordinate value (5, 4). The second data are calculated according to the first data of the selected RGB group, the left RGB group, the backward RGB group and the left-backward RGB group.

Furthermore, a rendering weight between 0% to 100% is determined, wherein the first data of the selected RGB group are multiplied by the rendering weight, and the first data of the left RGB group, the backward RGB group and the left-backward RGB group are multiplied respectively by a first coefficient, a second coefficient and a third coefficient calculated from (100%–the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the backward RGB group on (6, 4))+(the third coefficient×the first data of the blue dot of the left-backward RGB group on (5, 4)). The first coefficient, the second coefficient and the third coefficient may be one third of (100%–the rendering weight). For example, the rendering weight (W) may be ⅝, the first coefficient may be ⅛, the second coefficient may be ⅛ and the third coefficient may be ⅛. Additionally, the rendering weight (W) may be 7/16, the first coefficient may be 3/16, the second coefficient may be 3/16 and the third coefficient may be 3/16.

According to the twentieth method of the invention, a left RGB group at the left of and adjacent to the selected RGB group along a X-axis direction is determined, a left-forward RGB group adjacent to both the left RGB group and the forward RGB group is determined, and a left-backward RGB group adjacent to both the left RGB group and the backward RGB group is determined. Therefore, the left RGB group is disposed on the corresponding coordinate value (5, 3), the left-forward RGB group is disposed on the corresponding coordinate value (5, 2), and the left-backward RGB group is disposed on the corresponding coordinate value (5, 4). The second data are calculated according to the first data of the selected RGB group, the left RGB group, the left-forward RGB group and the left-backward RGB group.

Furthermore, a rendering weight between 0% to 100% is determined, wherein the first data of the selected RGB group are multiplied by the rendering weight, and the first data of the left RGB group, the left-forward RGB group and the left-backward RGB group are multiplied respectively by a first coefficient, a second coefficient and a third coefficient calculated from (100%–the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the left-forward RGB group on (5, 2))+(the third coefficient×the first data of the blue dot of the left-backward RGB group on (5, 4)). The first coefficient, the second coefficient and the third coefficient may be one third of (100%–the rendering weight).

According to the twenty-first method of the invention, a right RGB group at the right of and adjacent to the selected RGB group along the X-axis direction is determined, a right-forward RGB group adjacent to both the right RGB group and the forward RGB group is determined, and a right-backward RGB group adjacent to both the right RGB group and the backward RGB group is determined. Therefore, the right RGB group is disposed on the corresponding coordinate value (7, 3), the right-forward RGB group is disposed on the corresponding coordinate value (7, 2), and the right-backward RGB group is disposed on the corresponding coordinate value (7, 4). The second data are calculated according to the first data of the selected RGB group, the right RGB group, the right-forward RGB group and the right-backward RGB group.

Besides, a rendering weight between 0% to 100% is determined, wherein the first data of the selected RGB group are multiplied by the rendering weight, and the first data of the right RGB group, the right-forward RGB group and the right-backward RGB group are multiplied respectively by a first coefficient, a second coefficient and a third coefficient calculated from (100%–the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the right RGB group on (7, 3))+(the second coefficient×the first data of the blue dot of the right-forward RGB group on (7, 2))+(the third coefficient×the first data of the blue dot of the right-backward RGB group on (7, 4)). The first coefficient, the second coefficient and the third coefficient may be one third of (100%–the rendering weight).

According to the twenty-second method of the invention, a forward RGB group at the front of and adjacent to the selected RGB group along a Y-axis direction is determined, a left-forward RGB group adjacent to both the left RGB group and the forward RGB group is determined, and a right-forward RGB group adjacent to both the right RGB group and the forward RGB group is determined. Therefore, the forward RGB group is disposed on the corresponding coordinate value (6, 2), the left-forward RGB group is disposed on the corresponding coordinate value (5, 2), and the right-forward RGB group is disposed on the corresponding coordinate value (7, 2). The second data are calculated according to the first data of the selected RGB group, the forward RGB group, the left-forward RGB group and the right-forward RGB group.

Furthermore, a rendering weight between 0% to 100% is determined, wherein the first data of the selected RGB group are multiplied by the rendering weight, and the first data of the forward RGB group, the left-forward RGB group and the right-forward RGB group are multiplied respectively by a first coefficient, a second coefficient and a third coefficient calculated from (100%–the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the forward RGB group on (6, 2))+(the second coefficient×the first data of the blue dot of the left-forward RGB group on (5, 2))+(the third coefficient×the first data of the blue dot of the right-forward RGB group on (7, 2)). The first coefficient, the second coefficient and the third coefficient may be one third of (100—the rendering weight).

According to the twenty-third method of the invention, a backward RGB group at the back of and adjacent to the selected RGB group along a Y-axis direction is determined, a right-backward RGB group adjacent to both the right RGB group and the backward RGB group is determined, and a left-backward RGB group adjacent to both the left RGB group and the backward RGB group is determined. Therefore, the backward RGB group is disposed on the corresponding coordinate value (6, 4), the right-backward RGB group is disposed on the corresponding coordinate value (7, 4), and the left-backward RGB group is disposed on the corresponding coordinate value (5, 4). The second data are calculated according to the first data of the selected RGB group, the backward RGB group, the right-backward RGB group and the left-backward RGB group.

Furthermore, a rendering weight between 0% to 100% is determined, wherein the first data of the selected RGB group are multiplied by the rendering weight, and the first data of the backward RGB group, the right-backward RGB group and the left-backward RGB group are multiplied respectively by a first coefficient, a second coefficient and a third coefficient calculated from (100%–the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the backward RGB group on (6, 4))+(the second coefficient×the first data of the blue dot of the right-backward RGB group on (7, 4))+(the third coefficient× the first data of the blue dot of the left-backward RGB group on (5, 4)). The first coefficient, the second coefficient and the third coefficient may be one third of (100%—the rendering weight).

According to the twenty-fourth method of the invention, a left RGB group at the left of and adjacent to the selected RGB group along a X-axis direction is determined, a right RGB group at the right of and adjacent to the selected RGB group along the X-axis direction is determined, a forward RGB group at the front of and adjacent to the selected RGB group along a Y-axis direction is determined, and a backward RGB group at the back of and adjacent to the selected RGB group along the Y-axis direction is determined. Therefore, the left RGB group is disposed on the corresponding coordinate value (5, 3), the right RGB group is disposed on the corresponding coordinate value (7, 3), the forward RGB group is disposed on the corresponding coordinate value (6, 2), and the backward RGB group is disposed on the corresponding coordinate value (6, 4). The second data are calculated according to the first data of the selected RGB group, the left RGB group, the right RGB group, the forward RGB group and the backward RGB group.

Furthermore, a rendering weight between 0% to 100% is determined, wherein the first data of the selected RGB group are multiplied by the rendering weight, and the first data of the left RGB group, the right RGB group, the forward RGB group and the backward RGB group are multiplied respectively by a first coefficient, a second coefficient, a third coefficient and a fourth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3))+(the third coefficient×the first data of the blue dot of the forward RGB group on (6, 2))+(the fourth coefficient×the first data of the blue dot of the backward RGB group on (6, 4)). The first coefficient, the second coefficient, the third coefficient and the fourth coefficient may be one fourth of (100%−the rendering weight). For example, the rendering weight (W) may be ⅘, the first coefficient may be ⅛, the second coefficient may be ⅛, the third coefficient may be ⅛ and the fourth coefficient may be ⅛. Additionally, the rendering weight (W) may be ⅝, the first coefficient may be ⅛, the second coefficient may be ⅛, the third coefficient may be 1/16 and the fourth coefficient may be 1/16.

According to the twenty-fifth method of the invention, a left-forward RGB group adjacent to both the left RGB group and the forward RGB group is determined, a left-backward RGB group adjacent to both the left RGB group and the backward RGB group is determined, a right-forward RGB group adjacent to both the right RGB group and the forward RGB group is determined, and a right-backward RGB group adjacent to both the right RGB group and the backward RGB group is determined. Therefore, the left-forward RGB group is disposed on the corresponding coordinate value (5, 2), the left-backward RGB group is disposed on the corresponding coordinate value (5, 4), the right-forward RGB group is disposed on the corresponding coordinate value (7, 2), and the right-backward RGB group is disposed on the corresponding coordinate value (7, 4). The second data are calculated according to the first data of the selected RGB group, the left-forward RGB group, the left-backward RGB group, the right-forward RGB group and the right-backward RGB group.

Besides detail, a rendering weight between 0% to 100% is determined, wherein the first data of the selected RGB group are multiplied by the rendering weight, and the first data of the left-forward RGB group, the left-backward RGB group, the right-forward RGB group and the right-backward RGB group are multiplied respectively by a first coefficient, a second coefficient, a third coefficient and a fourth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left-forward RGB group on (5, 2))+(the second coefficient×the first data of the blue dot of the left-backward RGB group on (5, 4))+(the third coefficient× the first data of the blue dot of the right-forward RGB group on (7, 2))+(the fourth coefficient×the first data of the blue dot of the right-backward RGB group on (7, 4)). The first coefficient, the second coefficient, the third coefficient and the fourth coefficient may be one fourth of (100%−the rendering weight). For example, the rendering weight (W) may be ⅘, the first coefficient may be ⅛, the second coefficient may be ⅛, the third coefficient may be ⅛ and the fourth coefficient may be ⅛.

According to the twenty-sixth method of the invention, a left RGB group at the left of and adjacent to the selected RGB group along the X-axis direction is determined, a right RGB group at the right of and adjacent to the selected RGB group along the X-axis direction is determined, a forward RGB group at the front of and adjacent to the selected RGB group along the Y-axis direction is determined, a left-forward RGB group adjacent to both the left RGB group and the forward RGB group is determined, and a right-forward RGB group adjacent to both the right RGB group and the forward RGB group is determined. Therefore, the left RGB group is disposed on the corresponding coordinate value (5, 3), the right RGB group is disposed on the corresponding coordinate value (7, 3), the forward RGB group is disposed on the corresponding coordinate value (6, 2), the left-forward RGB group is disposed on the corresponding coordinate value (5, 2), and the right-forward RGB group is disposed on the corresponding coordinate value (7, 2). The second data are calculated according to the first data of the selected RGB group, the left RGB group, the right RGB group, the forward RGB group, the left-forward RGB group and the right-forward RGB group.

Furthermore, a rendering weight between 0% to 100% is determined, wherein the first data of the selected RGB group are multiplied by the rendering weight, and the first data of the left RGB group, the right RGB group, the forward RGB group, the left-forward RGB group and the right-forward RGB group are multiplied respectively by a first coefficient, a second coefficient, a third coefficient, a fourth coefficient and a fifth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3))+(the third coefficient×the first data of the blue dot of the forward RGB group on (6, 2))+(the fourth coefficient×the first data of the blue dot of the left-forward RGB group on (5, 2))+(the fifth coefficient×the first data of the blue dot of the right-forward RGB group on (7, 2)). The first coefficient, the second coefficient, the third coefficient, the fourth coefficient and the fifth coefficient may be one fifth of (100%−the rendering weight).

According to the twenty-seventh method of the invention, a left RGB group at the left of and adjacent to the selected RGB group along a X-axis direction is determined, a right RGB group at the right of and adjacent to the selected RGB group along the X-axis direction is determined, a backward RGB group at the back of and adjacent to the selected RGB group along a Y-axis direction is determined, a left-backward RGB group adjacent to both the left RGB group and the backward RGB group is determined, and a right-backward RGB group adjacent to both the right RGB group and the backward RGB group is determined. Therefore, the left RGB group is disposed on the corresponding coordinate value (5, 3), the right RGB group is disposed on the corresponding coordinate value (7, 3), the backward RGB group is disposed on the corresponding coordinate value (6, 4), the left-backward RGB group is disposed on the corresponding coordinate value (5, 4), and the right-backward RGB group is disposed on the corresponding coordinate value (7, 4). The second data are calculated according to the first data of the selected RGB group, the left RGB group, the right RGB group, the backward RGB group, the left-backward RGB group and the right-backward RGB group.

Besides, a rendering weight between 0% to 100% is determined, wherein the first data of the selected RGB group are multiplied by the rendering weight, and the first data of the left RGB group, the right RGB group, the backward RGB group, the left-backward RGB group and the right-backward RGB group are multiplied respectively by a first coefficient, a second coefficient, a third coefficient, a fourth coefficient and a fifth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3))+(the third coefficient×the first data of the blue dot of the backward RGB group on (6, 4))+(the fourth coefficient×the first data of the blue dot of the left-backward RGB group on (5, 4))+(the fifth coefficient×the first data of the blue dot of the right-backward RGB group on (7, 4)). The first coefficient, the second coefficient, the third coefficient, the fourth coefficient and the fifth coefficient may be one fifth of (100%−the rendering weight).

According to the twenty-eighth method of the invention, a forward RGB group at the front of and adjacent to the selected RGB group along a Y-axis direction is determined, a backward RGB group at the back of and adjacent to the selected RGB group along the Y-axis direction is determined, a left RGB group at the left of and adjacent to the selected RGB group along a X-axis direction is determined, a left-forward RGB group adjacent to both the left RGB group and the forward RGB group is determined, and a left-backward RGB group adjacent to both the left RGB group and the backward RGB group is determined. Therefore, the forward RGB group is disposed on the corresponding coordinate value (6, 2), the backward RGB group is disposed on the corresponding coordinate value (6, 4), the left RGB group is disposed on the corresponding coordinate value (5, 3), the left-forward RGB group is disposed on the corresponding coordinate value (5, 2), and the left-backward RGB group is disposed on the corresponding coordinate value (5, 4). The second data are calculated according to the first data of the selected RGB group, the forward RGB group, the backward RGB group, the left RGB group, the left-forward RGB group and the left-backward RGB group.

Furthermore, a rendering weight between 0% to 100% is determined, wherein the first data of the selected RGB group are multiplied by the rendering weight, and the first data of the forward RGB group, the backward RGB group, the left RGB group, the left-forward RGB group and the left-backward RGB group are multiplied respectively by a first coefficient, a second coefficient, a third coefficient, a fourth coefficient and a fifth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the forward RGB group on (6, 2))+(the second coefficient×the first data of the blue dot of the backward RGB group on (6, 4))+(the third coefficient×the first data of the blue dot of the left RGB group on (5, 3))+(the fourth coefficient×the first data of the blue dot of the left-forward RGB group on (5, 2))+(the fifth coefficient×the first data of the blue dot of the left-backward RGB group on (5, 4)). The first coefficient, the second coefficient, the third coefficient, the fourth coefficient and the fifth coefficient may be one fifth of (100%−the rendering weight).

According to the twenty-ninth method of the invention, a forward RGB group at the front of and adjacent to the selected RGB group along a Y-axis direction is determined, a backward RGB group at the back of and adjacent to the selected RGB group along the Y-axis direction is determined, a right RGB group at the right of and adjacent to the selected RGB group along a X-axis direction is determined, a right-forward RGB group adjacent to both the right RGB group and the forward RGB group is determined, and a right-backward RGB group adjacent to both the right RGB group and the backward RGB group is determined. Therefore, the forward RGB group is disposed on the corresponding coordinate value (6, 2), the backward RGB group is disposed on the corresponding coordinate value (6, 4), the right RGB group is disposed on the corresponding coordinate value (7, 3), the right-forward RGB group is disposed on the corresponding coordinate value (7, 2), and the right-backward RGB group is disposed on the corresponding coordinate value (7, 4). The second data are calculated according to the first data of the selected RGB group, the forward RGB group, the backward RGB group, the right RGB group, the right-forward RGB group and the right-backward RGB group.

Besides, a rendering weight between 0% to 100% is determined, wherein the first data of the selected RGB group are multiplied by the rendering weight, and the first data of the forward RGB group, the backward RGB group, the right RGB group, the right-forward RGB group and the right-backward RGB group are multiplied respectively by a first coefficient, a second coefficient, a third coefficient, a fourth coefficient and a fifth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the forward RGB group on (6, 2))+(the second coefficient×the first data of the blue dot of the backward RGB group on (6, 4))+(the third coefficient×the first data of the blue dot of the right RGB group on (7, 3))+(the fourth coefficient×the first data of the blue dot of the right-forward RGB group on (7, 2))+(the fifth coefficient×the first data of the blue dot of the right-backward RGB group on (7, 4)). The first coefficient, the second coefficient, the third coefficient, the fourth coefficient and the fifth coefficient may be one fifth of (100%−the rendering weight).

According to the thirtieth method of the invention, a left RGB group at the left of and adjacent to the selected RGB group along a X-axis direction is determined, a right RGB group at the right of and adjacent to the selected RGB group along the X-axis direction is determined, a forward RGB group at the front of and adjacent to the selected RGB group along a Y-axis direction is determined, a backward RGB group at the back of and adjacent to the selected RGB group along the Y-axis direction is determined, a left-forward RGB group adjacent to both the left RGB group and the forward RGB group is determined, a left-backward RGB group adjacent to both the left RGB group and the backward RGB group is determined, a right-forward RGB group adjacent to both the right RGB group and the forward RGB group is determined, and a right-backward RGB group adjacent to both the right RGB group and the backward RGB group is determined. Therefore, the left RGB group is disposed on the corresponding coordinate value (5, 3), the right RGB group is disposed on the corresponding coordinate value (7, 3), the forward RGB group is disposed on the corresponding coordinate value (6, 2), the backward RGB group is disposed on the corresponding coordinate value (6, 4), the left-forward RGB group is disposed on the corresponding coordinate value (5, 2), the left-backward RGB group is disposed on the corresponding coordinate value (5, 4), the right-forward RGB group is disposed on the corresponding coordinate value (7, 2), and the right-backward RGB group is disposed on the corresponding coordinate value (7, 4). The second data are calculated according to the first data of the selected RGB group, the left RGB group, the right RGB group, the forward RGB group, the backward RGB group, the left-forward RGB group, the left-backward RGB group, the right-forward RGB group and the right-backward RGB group.

Furthermore, a rendering weight between 0% to 100% is determined, wherein the first data of the selected RGB group are multiplied by the rendering weight, and the first data of the left RGB group, the right RGB group, the forward RGB group, the backward RGB group, the left-forward RGB group, the left-backward RGB group, the right-forward RGB group and the right-backward RGB group are multiplied respectively by a first coefficient, a second coefficient, a third coefficient, a fourth coefficient, a fifth coefficient, a sixth coefficient, a seventh coefficient and a eighth coefficient calculated from (100%−the rendering weight) so as to calculate the second data. In detail, the second data of the selected dot (B) on (6, 3) is equal to (W×the first data of the blue dot of the selected RGB group on (6, 3))+(the first coefficient×the first data of the blue dot of the left RGB group on (5, 3))+(the second coefficient×the first data of the blue dot of the right RGB group on (7, 3))+(the third coefficient×the first data of the blue dot of the forward RGB group on (6, 2))+(the fourth coefficient×the first data of the blue dot of the backward RGB group on (6, 4))+(the fifth coefficient×the first data of the blue dot of the left-forward RGB group on (5, 2))+(the sixth coefficient×the first data of the blue dot of the left-backward RGB group on (5, 4))+(the seventh coefficient×the first data of the blue dot of the right-forward RGB group on (7, 2))+(the eighth coefficient×the first data of the blue dot of the right-backward RGB group on (7, 4)). For example, the rendering weight (W) may be $5/8$, the first coefficient may be $1/16$, the second coefficient may be $1/16$, the third coefficient may be $1/16$, the fourth coefficient may be $1/16$, the fifth coefficient may be $1/32$, the sixth coefficient may be $1/32$, the seventh coefficient may be $1/32$ and the eighth coefficient may be $1/32$.

According to the above method of the invention, the rendering weight is between 0% to 100%, and the rendering weight is derived from a first numerator and a first denominator. The first denominator is selected from one of $2^n$ groups, for example: 2, 4, 8, 16, etc. Besides, a second rendering weight being equal to (100%−the rendering weight), and the second rendering weight is derived from a second numerator and a second denominator. The second denominator is selected from one of $2^n$ groups, for example: 2, 4, 8, 16, etc. The coefficients in the above method of the invention are calculated from the second rending weight. Therefore, in calculation, that the first data of the selected RGB group are multiplied by the rendering weight can be easily calculated by shifting the binary value of the first data of the selected RGB group. The same calculating process can be applied to the second rending weight and the coefficients.

The coefficients in the above method of the invention can be calculated for considering the factors of the area neighboring the selected dot and the distance to the selected dot. For example, if the dots of the second arrangement are quadrate shaped as shown in FIG. 1B, the area between the neighbor dots and the selected dot are the same. The coefficients are the same. In the twenty-fourth method of the invention, the rendering weight (W) may be $4/8$, the first coefficient may be $1/8$, the second coefficient may be $1/8$, the third coefficient may be $1/8$ and the fourth coefficient may be $1/8$.

If the dots of the second arrangement are stripe shaped as shown in FIG. 1A, the area between the neighbor dots and the selected dot are different. The coefficients are different. Therefore, in the twenty-fourth method of the invention, the rendering weight (W) may be $5/8$, the first coefficient may be $1/8$, the second coefficient may be $1/8$, the third coefficient may be $1/16$ and the fourth coefficient may be $1/16$. The third coefficient and the fourth coefficient are smaller than the first coefficient and the second coefficient.

The above method of the invention can be utilized to calculation the second data of the dot in the second arrangement. The second arrangement may be one of the arrangements in FIGS. 1A to 10 of the invention. However, the second arrangement does not limited to the arrangements of the invention. The pixel arrangement as shown in FIGS. 8B to 8C comprises four dots with four colors, typically Red, Green, Blue and White. Since the color White in a four dots group will increase the light intensity of the said group, special attention is made to avoid the color shifting by balancing the white with the R, G and B color in the said pixel. The simplest method is to assigned a gray level for the White dot less or equal to the minimum gray level of the RGB dots in the said RGBW pixel so that White is only on if R or G or B is not 0 because the white balance is calibrated as gray level of R=gray level of G=gray level of B. In all black state or in pure primary color state of only Red, or only Green or only Blue, white dots stay in off condition and because for LCD with backlight and no color pigment at white dots color filter position, white light leakage from the backlight may render the black screen not so black and pure primary color not so pure, a gray pigment should be applied to the position of the white dots to compensate the white light leakage and the gray level value of White should be chosen less than then minimum of R,G,B of the corresponding RGBW dot in order minimize the color shifting due to white light.

In FIG. 8B, the first color dot (A) may be a red dot, the second color dot (B) may be a green dot, the third color dot (C) may be a blue dot, and the fourth color dot (D) may be a white dot. Therefore, the arrangement of FIG. 8B comprises a plurality of white dots. In calculating the second data of the selected white dot, because there is no white dot in the conventional RGB group, the second data of the selected white dot is smaller or equal to a minimal value among the first data of the selected RGB group. For example, if the first data of the selected RGB group are R=20, G=50, B=40, the second data of the selected white dot is smaller than 20, or the second data of the selected white dot is equal to 20.

In each quad pixel of 4 dots of equal light emitting area, each single color dot has ¼ light emitting area of the said pixel while in the 3 dots pixel like RGB stripe pixel, each dot has ⅓ light emitting area of the said 3 dots pixel so that in order to compensate the reduced light emitting area of each dot in the quad pixel, light intensity of each dot should be enhanced to 4/3 times to match with the bigger light emitting area of each dot in the 3 dots pixel.

According to the second arrangement having a plurality of white dots, after the second data of the second arrangement are calculated, the method of the invention further comprises a color enhancing step. Firstly, a maximum value among the second data of a selected pixel group is obtained, and the maximum value compares with a gray level coefficient. The gray level coefficient is equal to a maximum gray level multiplied by a first ratio. For example, in the pixel group 84 of FIG. 8C, the second data of the red color dot 841 is equal to 180, the second data of the green color dot 842 is equal to 150, the second data of the blue color dot 843 is equal to 130, and the second data of the white color dot 844 is equal to 120. The maximum value among the second data of the pixel group 84 is equal to 180. If the maximum gray level is equal to 255 and the first ratio is equal to ¾, the gray level coefficient is equal to 191 (255×¾). The maximum value 180 compares with the gray level coefficient 191.

When the maximum value is smaller than or equal to the gray level coefficient, an enhancing second data of each dot in the selected pixel group is calculated by multiplying the second data of each dot in the selected pixel group by a second ratio. The second ratio is a reverse ratio of the first ratio. According to the above example, because the maximum value 180 is smaller than the gray level coefficient 191, the enhancing second data of each dot in the selected pixel group is calculated. The second ratio is equal to 4/3 in the example. Therefore, the enhancing second data of the red color dot 841 is equal to 180×4/3, the enhancing second data of the green color dot 842 is equal to 150×4/3, the enhancing second data of the blue color dot 843 is equal to 130×4/3, and the enhancing second data of the white color dot 844 is equal to 120×4/3.

If the maximum value is larger than the gray level coefficient, an enhancing second data of each dot in the selected pixel group is calculated by multiplying the second data of each dot in the selected pixel group by a third ratio. The third ratio is a ratio of the maximum gray level to the maximum value. For example, If the maximum value is equal to 230, the maximum value is larger than the gray level coefficient 191. The third ratio is equal to 255/230. Each the second data of each dot in the selected pixel group is multiplied by the third ratio so as to prevent the enhancing second data from exceeding the maximum gray level.

If the first data of the first arrangement with a first resolution of X1-RGB-Y1, and the second data of the second arrangement with a third resolution of X2-DOT-Y2, X1 is not equal to X2, and Y1 is not equal to Y2, the method of the invention further comprises a scaling step. The scaling step is used for scaling the first data of the first arrangement with the first resolution of X1-RGB-Y1 to a second resolution of X2-RGB-Y2so as to match with the second data of the second arrangement with the third resolution of X2-DOT-Y2, wherein the RGB is equal to three DOTs.

The invention comprises but not limits to the following display technologies: Cathode Ray Tube (CRT), Field Emission Display (FED), Vacuum Florescent Display (VFD), Plasma Display Panel (PDP), Liquid Crystal Display (LCD), Liquid Crystal on Silicon (LCoS), Light Emitting Diode (LED), Organic Light Emitting Diode (OLED), Polymer Light Emitting Diode (PLED), Electroluminescence (EL), Electronic inks, Surface Emitting Display (SED), Digital Light Processing (DLP), Electro-mechanics, Phototronics, Biotronics and any light sources known or invented in the future as well as a method for controlling the (said) display.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. A display, comprising:
   a plurality of pixel groups,
   wherein each of the pixel groups has four color dots arranged in a predetermined identical matrix form, at least a first one of the color dots has a first color, at least a second one of the color dots has a second color, and at least a third one of the color dots has a third color, the first color dot, the second color dot, and the third color dot having colors that are different from each other,
   wherein the pixel groups are arranged in a matrix manner so as to form the display,
   wherein each of the four color dots has a plurality of sides adjacent to others of the color dots with a different color, and each of the color dots represents a luminance and a chrominance of a corresponding full color pixel data by grouping with neighboring color dots to form a plurality of overlapping full color dynamics pixel groups,
   wherein a selected one of the color dots is determined from the color dots of the display, and
   the neighboring color dots are selected from a group of
   a left dot located at a left of and adjacent to the selected dot along a X-axis direction,
   a right dot located at a right of and adjacent to the selected dot along the X-axis direction,
   a forward dot located at a front of and adjacent to the selected dot along a Y-axis direction,
   a backward dot located at a back of and adjacent to the selected dot along the Y-axis direction, a next left dot at the left of and adjacent to the left dot along the X-axis direction,
   a next right dot located at the right of and adjacent to the right dot along the X-axis direction,
   a next forward dot located at the front of and adjacent to the forward dot along the Y-axis direction,
   a next backward dot located at the back of and adjacent to the backward dot along the Y-axis direction,
   a left-forward dot located adjacent to both the left dot and the forward dot,
   a left-backward dot located adjacent to both the left dot and the backward dot,
   a right-forward dot located adjacent to both the right dot and the forward dot, and
   a right-backward dot located adjacent to both the right dot and the backward dot.

2. The display according to claim 1, wherein the pixel groups comprises a plurality of first pixel groups and a plurality of second pixel groups, each of the first pixel groups and the second pixel groups comprising a plurality of color dots arranged in a matrix, the first pixel groups and the second pixel groups arranged in the matrix manner so as to form the display.

3. The display according to claim 2, wherein the color dots of the first pixel groups and the second pixel groups are stripe shape.

4. The display according to claim 2, wherein the dots of the first pixel groups and the second pixel groups are quadrate shape.

5. The display according to claim 2, wherein each of the first pixel groups comprises a red dot, a green dot and a blue dot in sequence arranged in a matrix, each of the second pixel groups comprises a blue dot, a red dot and a green dot in sequence arranged in a matrix, the first pixel groups and the second pixel groups are arranged alternately in the Y-axis direction.

6. The display according to claim 5, wherein a first overlapping full color dynamics pixel group comprises the selected dot, the left dot, the right dot, the forward dot and the backward dot; a second overlapping full color dynamics pixel group comprises the selected dot, the right dot, the next right dot, the right-forward dot and the right-backward dot; a third overlapping full color dynamics pixel group comprises the selected dot, the left dot, the next left dot, the left-forward dot and the left-backward dot; a fourth overlapping full color dynamics pixel group comprises the selected dot, the left-forward dot, the right-forward dot, the forward dot and the next forward dot; and a fifth overlapping full color dynamics pixel group comprises the selected dot, the left-backward dot, the right-backward dot, the backward dot and the next backward dot.

7. The display according to claim 5, wherein a first overlapping full color dynamics pixel group comprises the selected dot, the forward dot and the left-forward dot; a second overlapping full color dynamics pixel group comprises the selected dot, the left dot and the left-forward dot; a third overlapping full color dynamics pixel group comprises the selected dot, the backward dot and the left-backward dot; a fourth overlapping full color dynamics pixel group comprises the selected dot, the right dot and the backward dot; and a fifth overlapping full color dynamics pixel group comprises the selected dot, the left dot and the left-backward dot.

8. The display according to claim 5, wherein a first overlapping full color dynamics pixel group comprises the selected dot, the left dot and the right dot; a second overlapping full color dynamics pixel group comprises the selected dot, the right dot and the next right dot; a third overlapping full color dynamics pixel group comprises the selected dot, the left dot and the next left dot.

9. The display according to claim 5, wherein the first pixel groups are disposed in odd rows of the display, the second pixel groups are disposed in even rows of the display.

10. The display according to claim 5, wherein the first pixel groups are disposed in even rows of the display, and the second pixel groups are disposed in odd rows of the display.

11. The display according to claim 2, wherein each of the first pixel groups comprises a red dot, a green dot and is a blue dot in sequence arranged in a matrix, each of the second pixel groups comprises a blue dot, a red dot and is a green dot in sequence arranged in a matrix, the display further comprises a plurality of third pixel groups, each third pixel group comprises a green dot, a blue dot and a red dot in sequence arranged in a matrix.

12. The display according to claim 11, wherein the first pixel groups, the second pixel groups and the third pixel groups are disposed in sequence along the Y-axis direction to form the display.

13. The display according to claim 12, wherein a first overlapping full color dynamics pixel group comprises the selected dot, the forward dot and the backward dot; a second overlapping full color dynamics pixel group comprises the selected dot, the forward dot and the next forward dot; a third overlapping full color dynamics pixel group comprises the selected dot, the backward dot and the next backward dot; a fourth overlapping full color dynamics pixel group comprises the selected dot, the left dot and the next left dot; a fifth overlapping full color dynamics pixel group comprises the selected dot, the left dot and the right dot; and a sixth overlapping full color dynamics pixel group comprises the selected dot, the right dot and the next right dot.

14. The display according to claim 11, wherein the first pixel groups, the third pixel groups and the second pixel groups are disposed in sequence along the Y-axis direction to form the display.

15. The display according to claim 14, wherein a first overlapping full color dynamics pixel group comprises the selected dot, the forward dot and the backward dot; a second overlapping full color dynamics pixel group comprises the selected dot, the forward dot and the next forward dot; a third overlapping full color dynamics pixel group comprises the selected dot, the backward dot and the next backward dot; a fourth overlapping full color dynamics pixel group comprises the selected dot, the left dot and the next left dot; a fifth overlapping full color dynamics pixel group comprises the selected dot, the left dot and the right dot; and a sixth overlapping full color dynamics pixel group comprises the selected dot, the right dot and the next right dot.

16. The display according to claim 11, wherein the first pixel groups, the second pixel groups, the third pixel groups, the second pixel groups, the first pixel groups and the second pixel groups are disposed in sequence along the Y-axis direction to form the display.

17. The display according to claim 16, wherein a first overlapping full color dynamics pixel group comprises the selected dot, the forward dot and the next forward dot; a second overlapping full color dynamics pixel group comprises the selected dot, the backward dot and the next backward dot; a third overlapping full color dynamics pixel group comprises the selected dot, the left dot and the next left dot; a fourth overlapping full color dynamics pixel group comprises the selected dot, the left dot and the right dot; and a fifth overlapping full color dynamics pixel group comprises the selected dot, the right dot and the next right dot.

18. The display according to claim 11, wherein the second pixel groups, the first pixel groups, the third pixel groups, the first pixel groups, the second pixel groups and the first pixel groups are disposed in sequence along the Y-axis direction to form the display.

19. The display according to claim 2, wherein each of the first pixel groups comprises a red dot, a green dot and a blue dot in sequence arranged in a matrix, each second pixel group comprises a green dot, a blue dot and a red dot in sequence arranged in a matrix, the first pixel groups and the second pixel groups are arranged alternately in the Y-axis direction.

20. The display according to claim 19, wherein the first pixel groups are disposed in odd rows of the display, the second pixel groups are disposed in even rows of the display.

21. The display according to claim 19, wherein the first pixel groups are disposed in even rows of the display, the second pixel groups are disposed in odd rows of the display.

22. The display according to claim 2, wherein each of the first pixel groups comprises a red dot, a blue dot and a green dot in sequence arranged in a matrix, each second pixel group comprises a blue dot, a green dot and a red dot in sequence arranged in a matrix, the first pixel groups and the second pixel groups are arranged alternately in the Y-axis direction.

23. The display according to claim 22, wherein the first pixel groups are disposed in odd rows of the display, the second pixel groups are disposed in even rows of the display.

24. The display according to claim 22, wherein the first pixel groups are disposed in even rows of the display, the second pixel groups are disposed in odd rows of the display.

25. The display according to claim 2, wherein each of the first pixel groups comprises a red dot, a blue dot and a green dot in sequence arranged in a matrix, each second pixel group comprises a green dot, a red dot and a blue dot in sequence arranged in a matrix, the first pixel groups and the second pixel groups are arranged alternately in the Y-axis direction.

26. The display according to claim 25, wherein the first pixel groups are disposed in odd rows of the display, the second pixel groups are disposed in even rows of the display.

27. The display according to claim 25, wherein the first pixel groups are disposed in even rows of the display, the second pixel groups are disposed in odd rows of the display.

28. The display according to claim 2, wherein each of the first pixel groups comprises a green dot, a blue dot and a red dot in sequence arranged in a matrix, each second pixel group comprises a blue dot, a red dot and a green dot in sequence arranged in a matrix, the first pixel groups and the second pixel groups are arranged alternately in the Y-axis direction.

29. The display according to claim 28, wherein the first pixel groups are disposed in odd rows of the display, the second pixel groups are disposed in even rows of the display.

30. The display according to claim 28, wherein the first pixel groups are disposed in even rows of the display, the second pixel groups are disposed in odd rows of the display.

31. The display according to claim 2, wherein each of the first pixel groups comprises a green dot, a red dot and a blue dot in sequence arranged in a matrix, each second pixel group comprises a blue dot, a green dot and a red dot in sequence arranged in a matrix, the first pixel groups and the second pixel groups are arranged alternately in the Y-axis direction.

32. The display according to claim 31, wherein the first pixel groups are disposed in odd rows of the display, the second pixel groups are disposed in even rows of the display.

33. The display according to claim 31, wherein the first pixel groups are disposed in even rows of the display, the second pixel groups are disposed in odd rows of the display.

34. The display according to claim 2, wherein each of the color dots of the first pixel groups has a first height, each of the color dots of the second pixel group has a second height, and the first height is different from the second height.

35. The display according to claim 34, wherein the first height is larger than the second height.

36. The display according to claim 35, wherein the second height is the half of the first height.

37. The display according to claim 5, further comprising:
a plurality of source drivers for providing data to the dots of the first pixel groups, the source drivers having a plurality of first source driver groups, a plurality of second source driver groups, and a plurality of third source driver groups, each of the first source driver groups providing data to two columns having red dots and blue dots, each of the second source driver groups providing data to one of the columns having red dots and green dots.

38. The display according to claim 37, wherein each of the first source driver groups provides equal data to two of the columns having red dots and blue dots.

39. The display according to claim 37, wherein each of the third source driver groups provides equal data to two of the columns having blue dots and green dots.

40. The display according to claim 39, wherein each of the third source driver groups provides equal data to two of the columns having blue dots and green dots.

41. The display according to claim 1,
wherein the first color dot has an area that is the same an area of the third color dot, and
the two second color dots have a combined area that is equal to an area of the third color dot.

42. The display according to claim 41, wherein the area of each of the second color dots is half of the area of the first color dot.

43. The display according to claim 42, wherein each of the pixel groups comprises a plurality of first pixel groups, the first color dot is disposed on a first row-first column position of the first pixel group, two second color dots are disposed respectively on a first row-second column and a second row-first column positions of the first pixel group, the third color dot is disposed on a second row-second column position of the first pixel group, the first color dot has a first width and a first height, the second color dot has the first width and a second height, the third color dot has the first width and the first height, the second height is the half of the first height.

44. The display according to claim 43, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

45. The display according to claim 43, wherein the first color dot is a red dot, the second color dots are blue dots, and the third color dot is a green dot.

46. The display according to claim 43, wherein the first pixel groups are arranged in the matrix manner to form the display, and the display comprises:
a plurality of odd row first pixel groups and a plurality of even row first pixel groups, in the odd row first pixel groups, the first color dot is a red dot, the second color dots are blue dots, and the third color dot is a green dot; in the even row first pixel groups, the first color dot is a green dot, the second color dots are blue dots, and the third color dot is a red dot.

47. The display according to claim 46, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

48. The display according to claim 43, wherein the first pixel groups are arranged in the matrix manner to form the display, the display comprises a plurality of odd row first pixel groups and a plurality of even row first pixel groups; in the odd row first pixel groups, the first color dot is a green dot, the second color dots are blue dots, and the third color dot is a red dot; in the even row first pixel groups, the first color dot is a red dot, the second color dots are blue dots, and the third color dot is a green dot.

49. The display according to claim 48, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

50. The display according to claim 43, wherein each of the pixel groups comprises a plurality of second pixel groups, the first color dot is disposed on a first row-first column position of the second pixel group, two second color dots are disposed respectively on a first row-second column and a second row-first column positions of the second pixel group, the third color dot is disposed on a second row-second column position of the second pixel group, the first color dot has a first width and a first height, the second color dot has a second width and the first height, the third color dot has the first width and the first height, the second width is the half of the first width.

51. The display according to claim 50, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

52. The display according to claim 51, wherein the first pixel groups and the second pixel groups are arranged alternately in the X-axis direction.

53. The display according to claim 52, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

54. The display according to claim 51, wherein the first pixel groups and the second pixel groups are arranged alternately in the Y-axis direction.

55. The display according to claim 54, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

56. The display according to claim 51, wherein the first pixel groups and the second pixel groups are arranged alternately in the X-axis direction, and the first pixel groups and the second pixel groups are arranged alternately in the Y-axis direction.

57. The display according to claim 56, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

58. The display according to claim 42, wherein the pixel groups comprises a plurality of third pixel groups, the first color dot is disposed on a second row-first column position of the third pixel group, two second color dots are disposed respectively on a first row-first column and a second row-second column positions of the third pixel group, the third color dot is disposed on a first row-second column position of the third pixel group, the first color dot has a first width and a first height, the second color dot has the first width and a second height, the third color dot has the first width and the first height, the second height is the half of the first height.

59. The display according to claim 58, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

60. The display according to claim 42, wherein each of the pixel groups comprises a plurality of fourth pixel groups, the first color dot is disposed on a first row-second column position of the fourth pixel group, two second color dots are disposed respectively on a first row-first column and a second row-second column positions of the fourth pixel group, the third color dot is disposed on a second row-first column position of the fourth pixel group, the first color dot has a first width and a first height, the second color dot has a second width and the first height, the third color dot has the first width and the first height, the second width is the half of the first width.

61. The display according to claim 60, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

62. The display according to claim 60, wherein the fourth pixel groups are arranged in the matrix manner to form the display, the display comprises a plurality of odd column fourth pixel groups and a plurality of even column fourth pixel groups; in the odd column fourth pixel groups, the first color dot is a red dot, the second color dots are blue dots, and the third color dot is a green dot; in the even column fourth pixel groups, the first color dot is a green dot, the second color dots are blue dots, and the third color dot is a red dot.

63. The display according to claim 62, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

64. The display according to claim 60, wherein the fourth pixel groups are arranged in the matrix manner to form the display, the display comprises a plurality of odd column fourth pixel groups and a plurality of even column fourth pixel groups; in the odd column fourth pixel groups, the first color dot is a green dot, the second color dots are blue dots, and the third color dot is a red dot; in the even column fourth pixel groups, the first color dot is a red dot, the second color dots are blue dots, and the third color dot is a green dot.

65. The display according to claim 64, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

66. The display according to claim 42, wherein the first color dot is a red dot, the second color dots are green dots, and the third color dot is a blue dot.

67. The display according to claim 42, wherein the first color dot is a green dot, the second color dots are red dots, and the third color dot is a blue dot.

68. The display according to claim 1, wherein each of the plurality of pixel groups comprises a plurality of first pixel groups and a plurality of second pixel groups,
    each of the first pixel groups and each of second pixel groups comprises:
    four quadrate color dots arranged in a 2×2 matrix, each of the first pixel groups and each of second pixel groups having a first color dot, a second color dot, a third color dot and a fourth color dot,
    each of the second pixel groups is adjacent to one or more of the first pixel groups, one of two rows of each of the first pixel groups comprises two of the color dots arranged in a first sequence, and
    a corresponding row of each of the second pixel groups comprises two color dots with a same color arranged in a second sequence, the second sequence is reverse to the first sequence.

69. The display according to claim 66, wherein a first overlapping full color dynamics pixel group comprises the selected dot, the left dot, the forward dot and the left-forward dot; a second overlapping full color dynamics pixel group comprises the selected dot, the right dot, the forward dot and the right-forward dot; a third overlapping full color dynamics pixel group comprises the selected dot, the left dot, the backward dot and the left-backward dot; a fourth overlapping full color dynamics pixel group comprises the selected dot, the right dot, the backward dot and a right-backward dot.

70. The display according to claim 1, wherein the plurality of pixel groups comprises a plurality of first pixel groups and a plurality of second pixel groups,
    each of the first pixel groups and each of the second pixel groups comprises four quadrate color dots arranged in a 2×2 matrix,
    each of the first pixel groups and each of the second pixel groups having a first color dot, a second color dot, a third color dot and a fourth color dot,
    each of the second pixel groups is adjacent to one or more the first pixel groups, one of two columns of each of the first pixel groups comprises two of the color dots arranged in a first sequence, and
    a corresponding column of each of the second pixel groups comprises two color dots having a same color arranged in a second sequence, the second sequence is reverse to the first sequence.

71. The display according to claim 70, wherein a first overlapping full color dynamics pixel group comprises the selected dot, the left dot, the forward dot and the left-forward dot;
    a second overlapping full color dynamics pixel group comprises the selected dot, the right dot, the forward dot and the right-forward dot;
    a third overlapping full color dynamics pixel group comprises the selected dot, the left dot, the backward dot and the left-backward dot; and
    a fourth overlapping full color dynamics pixel group comprises the selected dot, the right dot, the backward dot and a right-backward dot.

72. The display according to claim 71, wherein the first color dot is a red dot, the second color dot is a green dot, the third color dot is a blue dot, and the fourth color dot is a white dot.

73. The display according to claim 71, wherein the first color dot is a green dot, the second color dot is a red dot, the third color dot is a white dot, and the fourth color dot is a blue dot.

74. The display according to claim 71, wherein the first color dot is a green dot, the second color dot is a red dot, the third color dot is a blue dot, and the fourth color dot is a white dot.

75. The display according to claim 71, wherein the first color dot is a red dot, the second color dot is a green dot, the third color dot is a white dot, and the fourth color dot is a blue dot.

76. The display according to claim 71, wherein the first color dot is a white dot, the second color dot is a blue dot, the third color dot is a green dot, and the fourth color dot is a red dot.

77. The display according to claim 71, wherein the first color dot is a blue dot, the second color dot is a white dot, the third color dot is a green dot, and the fourth color dot is a red dot.

78. The display according to claim 71, wherein the first color dot is a blue dot, the second color dot is a white dot, the third color dot is a red dot, and the fourth color dot is a green dot.

79. The display according to claim 71, wherein the first color dot is a white dot, the second color dot is a blue dot, the third color dot is a red dot, and the fourth color dot is a green dot.

80. A display, comprising:
    a plurality of pixel groups,
    wherein each of the pixel groups has four color dots arranged in a predetermined identical matrix form, at least a first one of the color dots has a first color, at least a second one of the color dots has a second color, and at least a third one of the color dots has a third color, the first color dot, the second color dot, and the third color dot having colors that are different from each other,
    wherein the pixel groups are arranged in a matrix manner so as to form the display,
    wherein each of the four color dots has a plurality of sides adjacent to others of the color dots with a different color, and each of the color dots represents a luminance and a chrominance of a corresponding full color pixel data by grouping with neighboring color dots to form a plurality of overlapping full color dynamics pixel groups,
    wherein a selected one of the color dots is determined from the color dots of the display, and
    the neighboring color dots are selected from a group of
    a left dot located at a left of and adjacent to the selected dot along a X-axis direction, a right dot located at a right of and adjacent to the selected dot along the X-axis direction,
a forward dot located at a front of and adjacent to the selected dot along a Y-axis direction,
a backward dot located at a back of and adjacent to the selected dot along the Y-axis direction, a next left dot at the left of and adjacent to the left dot along the X-axis direction,
a next right dot located at the right of and adjacent to the right dot along the X-axis direction,
a next forward dot located at the front of and adjacent to the forward dot along the Y-axis direction,
a next backward dot located at the back of and adjacent to the backward dot along the Y-axis direction,
a left-forward dot located adjacent to both the left dot and the forward dot,
a left-backward dot located adjacent to both the left dot and the backward dot,
a right-forward dot located adjacent to both the right dot and the forward dot, and
a right-backward dot located adjacent to both the right dot and the backward dot,
wherein the plurality of overlapping full color dynamics pixel groups include:
a first overlapping full color dynamics pixel group comprising the selected dot, the left dot, the forward dot and the left-forward dot;
a second overlapping full color dynamics pixel group comprising the selected dot, the right dot, the forward dot and the right-forward dot;
a third overlapping full color dynamics pixel group comprising the selected dot, the left dot, the backward dot and the left-backward dot; and
a fourth overlapping full color dynamics pixel group comprising the selected dot, the right dot, the backward dot and a right-backward dot.

81. The display according to claim 1, wherein among the four color dots in each of the pixel groups, one of the first color dot, or the second color dot, or the third color dot has a color that is the same color of a fourth color dot.

82. The display according to claim 1, wherein among the four color dots in each of the pixel groups, only the first color dot, the second color dot, and the third color dot have colors that are different from each other.

83. The display according to claim 80, wherein among the four color dots in each of the pixel groups, one of the first color dot, or the second color dot, or the third color dot has a color that is the same color of a fourth color dot.

84. The display according to claim 80, wherein among the four color dots in each of the pixel groups, only the first color dot, the second color dot, and the third color dot have colors that are different from each other.

* * * * *